(12) United States Patent
Tsibulevskiy et al.

(10) Patent No.: US 11,083,344 B2
(45) Date of Patent: Aug. 10, 2021

(54) PARTITION TECHNOLOGIES

(71) Applicants: Roman Tsibulevskiy, East Brunswick, NJ (US); Barry Greenbaum, Bergenfield, NJ (US)

(72) Inventors: Roman Tsibulevskiy, East Brunswick, NJ (US); Barry Greenbaum, Bergenfield, NJ (US)

( * ) Notice: Subject to any disclaimer, the term of this patent is extended or adjusted under 35 U.S.C. 154(b) by 0 days.

(21) Appl. No.: 16/409,817

(22) Filed: May 12, 2019

(65) Prior Publication Data

US 2019/0274485 A1 Sep. 12, 2019

Related U.S. Application Data

(63) Continuation of application No. 15/367,522, filed on Dec. 2, 2016, now Pat. No. 10,292,538, which is a
(Continued)

(51) Int. Cl.
*A47K 3/36* (2006.01)
*G02F 1/01* (2006.01)
*H04N 5/225* (2006.01)
*A47K 3/28* (2006.01)
*H02K 7/00* (2006.01)
(Continued)

(52) U.S. Cl.
CPC ............... *A47K 3/36* (2013.01); *A45D 42/16* (2013.01); *A45D 42/24* (2013.01); *A47K 3/281* (2013.01); *A47K 3/38* (2013.01); *E03C 1/0408* (2013.01); *G02F 1/0121* (2013.01); *H02K 7/00* (2013.01); *H04N 5/2257* (2013.01); *H04R 1/028* (2013.01); *F21V 33/004* (2013.01); *G02B 5/08* (2013.01)

(58) Field of Classification Search
CPC ........................................................ A47K 3/36
USPC .......... 4/557–614; D05/11; 160/330, 2, 405; 16/108; 211/86.01–87.01; 52/301; 248/252; 49/381; 150/5; 460/127
See application file for complete search history.

(56) References Cited

U.S. PATENT DOCUMENTS 2,450,782 A 10/1948 Cascia
3,934,636 A 1/1976 Simmons
(Continued)

FOREIGN PATENT DOCUMENTS

DE 4408931 9/1995
DE 10013251 4/2001
(Continued)

OTHER PUBLICATIONS

Yahoo Answers—Tried window blinds as shower curtain?—retrieved on Nov. 30, 2015 from https://answers.yahoo.com/question/index?qid=20111105132442AAzzZTs.
(Continued)

*Primary Examiner* — Lori L Baker

(57) ABSTRACT

A housing including a reflective mirror, a light source or a speaker, a processor, and a microphone, wherein the housing is configured to couple to a wall, wherein the processor is coupled to the light source or the speaker and the microphone, wherein the microphone is configured to receive a voice sound from a user positioned in an operational proximity to the reflective mirror and the microphone, wherein the processor is configured to process the voice sound from the microphone and control the light source or the speaker based on the voice sound.

20 Claims, 40 Drawing Sheets

Related U.S. Application Data continuation-in-part of application No. 14/948,376, filed on Nov. 22, 2015, now Pat. No. 9,510,711, which is a continuation-in-part of application No. 14/051,444, filed on Oct. 10, 2013, now Pat. No. 9,192,267.

(60) Provisional application No. 61/712,793, filed on Oct. 11, 2012.

(51) Int. Cl.

| | | |
|---|---|---|
| *E03C 1/04* | (2006.01) | |
| *A45D 42/16* | (2006.01) | |
| *A47K 3/38* | (2006.01) | |
| *H04R 1/02* | (2006.01) | |
| *F21V 33/00* | (2006.01) | |
| *G02B 5/08* | (2006.01) | |
| *A45D 42/24* | (2006.01) | |

(56) References Cited

U.S. PATENT DOCUMENTS

| | | |
|---|---|---|
| 4,068,345 A | 1/1978 | Hehl et al. |
| 4,070,735 A | 1/1978 | Canaday |
| 4,088,174 A | 5/1978 | Edwards |
| 4,120,343 A | 10/1978 | Wilson |
| 4,126,172 A | 11/1978 | Faragher, Jr. |
| 4,158,896 A | 6/1979 | Farkas |
| 4,229,842 A | 10/1980 | Gilmore |
| 4,327,961 A | 5/1982 | Kladitis |
| 4,333,187 A | 6/1982 | Schuler |
| 4,361,915 A | 12/1982 | Siewert |
| 4,385,409 A | 5/1983 | File et al. |
| 4,594,741 A | 6/1986 | Payne |
| 4,759,087 A | 7/1988 | Zeilinger |
| 4,769,862 A | 9/1988 | Skrzelowski |
| 4,777,673 A | 10/1988 | Patteson et al. |
| 4,916,764 A | 4/1990 | Meaden et al. |
| 4,931,342 A | 6/1990 | Tolbert et al. |
| 4,944,050 A | 7/1990 | Shames et al. |
| 4,955,422 A | 9/1990 | Irizarry |
| 5,007,120 A | 4/1991 | Annand |
| 5,033,132 A | 7/1991 | Greenblatt |
| 5,070,551 A | 12/1991 | Harrison et al. |
| 5,083,330 A | 1/1992 | Dusar |
| 5,097,541 A | 3/1992 | Annand |
| 5,101,522 A | 4/1992 | Prian |
| 5,148,580 A | 9/1992 | Dyckow |
| 5,170,974 A | 12/1992 | Ruggiero |
| 5,216,766 A | 6/1993 | Lang |
| 5,228,149 A | 7/1993 | Phinn, Jr. |
| 5,337,425 A | 8/1994 | Hill |
| 5,339,884 A | 8/1994 | Angerman |
| 5,345,623 A | 9/1994 | Dearman |
| 5,345,624 A | 9/1994 | Brown, III |
| 5,421,393 A | 6/1995 | Wolfe |
| 5,495,628 A | 3/1996 | Logan |
| 5,513,419 A | 5/1996 | Zinger |
| 5,533,534 A | 7/1996 | Cariello |
| 5,682,627 A | 11/1997 | Russell |
| 5,732,419 A | 3/1998 | Feist |
| 5,732,420 A | 3/1998 | Micciche |
| 5,761,751 A | 6/1998 | Morrissey |
| 5,771,504 A | 6/1998 | Steiner |
| 5,787,520 A | 8/1998 | Dunbar |
| 5,787,954 A | 8/1998 | Herrera |
| 5,794,281 A | 8/1998 | Shearon |
| 5,809,589 A | 9/1998 | Johnson |
| 5,826,284 A | 10/1998 | Wren |
| 5,894,642 A | 4/1999 | Eberhardt |
| 5,950,255 A | 9/1999 | Thompson |
| 6,019,864 A | 2/2000 | Jones |
| 6,038,749 A | 3/2000 | Eberhardt |
| 6,041,454 A | 3/2000 | Summerford |
| 6,154,894 A | 12/2000 | Alexander et al. |
| 6,195,816 B1 | 3/2001 | Glassman |
| 6,195,817 B1 | 3/2001 | Chilton |
| 6,276,002 B1 | 8/2001 | Oschmann |
| 6,289,967 B1 | 9/2001 | Moore |
| 6,292,957 B1 | 9/2001 | Thompson |
| 6,336,232 B1 | 1/2002 | Toder |
| 6,394,168 B1 | 5/2002 | Zoboski |
| 6,408,458 B1 | 6/2002 | Chilton |
| 6,412,124 B1 | 7/2002 | Anderson |
| 6,488,070 B1 | 12/2002 | Cox |
| 6,510,566 B2 | 1/2003 | Bryce |
| 6,560,027 B2 | 5/2003 | Meine |
| 6,591,432 B1 | 7/2003 | Feinstein |
| 6,694,543 B2 | 2/2004 | Moore |
| 6,789,279 B2 | 9/2004 | Yarid |
| 6,836,909 B1 | 1/2005 | Kirsopp |
| 6,996,862 B1 | 2/2006 | Shippy et al. |
| 7,065,806 B2 | 6/2006 | Reichel et al. |
| 7,131,739 B2 | 11/2006 | Sellgren |
| 7,328,466 B2 | 2/2008 | Bowen |
| 7,644,453 B2 | 1/2010 | Dyckow |
| 7,663,571 B2 | 2/2010 | Allen et al. |
| 7,730,925 B1 | 6/2010 | Pereira |
| 7,755,611 B2 | 7/2010 | Barr |
| 7,843,449 B2 | 11/2010 | Krah |
| 7,926,127 B2 | 4/2011 | Barrese |
| 8,069,507 B2 | 12/2011 | Didehvar et al. |
| 8,122,531 B2 | 2/2012 | Li |
| 8,151,385 B2 | 4/2012 | Goskowski et al. |
| 8,826,472 B2 | 9/2014 | Hoernig |
| 9,038,211 B2 | 5/2015 | Hedaya |
| 9,072,973 B2 | 7/2015 | Elliott |
| 9,949,597 B2 * | 4/2018 | Tsibulevskiy .......... A47K 3/281 |
| 9,955,825 B2 * | 5/2018 | Tsibulevskiy .......... A47K 3/281 |
| 10,292,538 B2 * | 5/2019 | Tsibulevskiy .......... A47K 3/281 |
| 10,297,037 B2 | 5/2019 | Shin |
| 2001/0039677 A1 | 11/2001 | Bryce |
| 2002/0040500 A1 | 4/2002 | Noguchi et al. |
| 2002/0108724 A1 | 8/2002 | Grahn |
| 2002/0189011 A1 | 12/2002 | Hess |
| 2002/0196333 A1 | 12/2002 | Gorischek |
| 2003/0033667 A1 | 2/2003 | Lachance |
| 2003/0046757 A1 | 3/2003 | Yarid |
| 2003/0106490 A1 | 6/2003 | Jallepally et al. |
| 2003/0172502 A1 | 9/2003 | Ho |
| 2003/0192923 A1 | 10/2003 | Butzer |
| 2003/0217410 A1 | 11/2003 | Moore |
| 2003/0217446 A1 | 11/2003 | Hamlin et al. |
| 2004/0003459 A1 | 1/2004 | Ferreri et al. |
| 2004/0031364 A1 | 2/2004 | Sato et al. |
| 2004/0034921 A1 | 2/2004 | Yarid |
| 2004/0051365 A1 | 3/2004 | Darst et al. |
| 2004/0128754 A1 | 7/2004 | Bathurst |
| 2004/0231044 A1 | 11/2004 | Carter |
| 2004/0231045 A1 | 11/2004 | Carter |
| 2004/0241385 A1 | 12/2004 | Huseman |
| 2005/0028330 A1 | 2/2005 | Hsu |
| 2006/0080770 A1 | 4/2006 | Rich |
| 2006/0085904 A1 | 4/2006 | Tsvok |
| 2006/0185072 A1 | 8/2006 | Dyckow |
| 2006/0194041 A1 | 8/2006 | Mullally et al. |
| 2006/0200901 A1 | 9/2006 | Beyda |
| 2006/0218717 A1 | 10/2006 | van den Bosch |
| 2006/0260040 A1 | 11/2006 | Schmidt |
| 2007/0157375 A1 | 7/2007 | Lethert |
| 2007/0182666 A1 | 8/2007 | Hochman |
| 2007/0187050 A1 | 8/2007 | Jensen |
| 2007/0256232 A1 | 11/2007 | Erickson |
| 2007/0273181 A1 | 11/2007 | Wechter |
| 2008/0010737 A1 | 1/2008 | Lethert |
| 2008/0010739 A1 | 1/2008 | Barrese |
| 2008/0028513 A1 | 2/2008 | Didehvar |
| 2008/0174682 A1 | 7/2008 | Faisman et al. |
| 2008/0201839 A1 | 8/2008 | Dalton |
| 2008/0210827 A1 | 9/2008 | Samelson |
| 2008/0229491 A1 | 9/2008 | Gregory |
| 2008/0289095 A1 | 11/2008 | Li |
| 2009/0000022 A1 | 1/2009 | Phipps et al. |

(56) References Cited

U.S. PATENT DOCUMENTS

| | | |
|---|---|---|
| 2009/0021486 A1 | 1/2009 | Chaudhri et al. |
| 2009/0083904 A1 | 4/2009 | Roston |
| 2009/0109126 A1 | 4/2009 | Stevenson et al. |
| 2009/0119830 A1 | 5/2009 | Goskowski et al. |
| 2009/0151068 A1 | 6/2009 | Rice |
| 2009/0199333 A1 | 8/2009 | Schmitz |
| 2009/0231836 A1 | 9/2009 | Mischel, Jr. et al. |
| 2010/0101738 A1 | 4/2010 | Luomanen |
| 2010/0175286 A1 | 7/2010 | Felix |
| 2010/0206350 A1 | 8/2010 | Montello et al. |
| 2010/0219958 A1 | 9/2010 | Caldwell et al. |
| 2010/0222725 A1 | 9/2010 | Munzel |
| 2010/0243181 A1 | 9/2010 | O'Connor |
| 2010/0281636 A1 | 11/2010 | Ortins et al. |
| 2011/0010840 A1 | 1/2011 | Paul |
| 2011/0051241 A1 | 3/2011 | Ilvento |
| 2011/0094985 A1 | 4/2011 | Austin |
| 2011/0126992 A1 | 6/2011 | Yordanova |
| 2011/0145987 A1 | 6/2011 | Maes |
| 2011/0179567 A1 | 7/2011 | Tang |
| 2011/0197353 A1 | 8/2011 | Pierce |
| 2011/0221658 A1 | 9/2011 | Haddick et al. |
| 2011/0240814 A1 | 10/2011 | Samelson |
| 2012/0023657 A1 | 2/2012 | Didehvar et al. |
| 2012/0180733 A1 | 7/2012 | Euse |
| 2012/0241108 A1 | 9/2012 | Marszalek |
| 2012/0291243 A1 | 11/2012 | Baines |
| 2012/0330684 A1 | 12/2012 | Jacobs et al. |
| 2013/0061386 A1 | 3/2013 | Vagliardo |
| 2013/0067480 A1 | 3/2013 | Mullet |
| 2013/0074255 A1 | 3/2013 | Uncles |
| 2013/0092329 A1 | 4/2013 | Eastland |
| 2013/0145272 A1 | 6/2013 | Boggie et al. |
| 2013/0145543 A1 | 6/2013 | Cittadino et al. |
| 2013/0317808 A1 | 11/2013 | Kruel et al. |
| 2013/0324241 A1 | 12/2013 | Elliott |
| 2014/0080593 A1 | 3/2014 | Rivera et al. |
| 2014/0207939 A1 | 7/2014 | Mraz et al. |
| 2014/0262056 A1 | 9/2014 | Blair |
| 2014/0380183 A1 | 12/2014 | Esaka |
| 2015/0216331 A1 | 8/2015 | Sanchez |
| 2015/0262286 A1 | 9/2015 | Cypher et al. |
| 2016/0093081 A1 | 3/2016 | Kim et al. |
| 2016/0246793 A1 | 8/2016 | Alfredsson et al. |
| 2017/0052748 A1 | 2/2017 | Dominique |
| 2017/0092107 A1 | 3/2017 | Flores et al. |
| 2017/0178220 A1 | 6/2017 | Chong et al. |
| 2017/0199576 A1 | 7/2017 | Schmitz-Le Hanne |
| 2017/0257543 A1* | 9/2017 | Rowles .................... H04N 7/18 |
| 2018/0300095 A1 | 10/2018 | Goffart et al. |
| 2019/0018486 A1 | 1/2019 | Benford et al. |

FOREIGN PATENT DOCUMENTS

| | | |
|---|---|---|
| DE | 20 2013 102 982 | 9/2014 |
| DE | 102015104437 | 10/2016 |
| EP | 1039093 | 9/2000 |
| EP | 1045954 | 10/2000 |
| EP | 1130991 | 9/2001 |
| EP | 1223296 | 7/2002 |
| EP | 1374750 | 1/2004 |
| EP | 1424031 | 6/2004 |
| EP | 1604082 | 12/2005 |
| EP | 1690022 | 8/2006 |
| EP | 1819261 | 8/2007 |
| EP | 1903174 | 3/2008 |
| EP | 1994893 | 11/2008 |
| EP | 2063064 | 5/2009 |
| EP | 2131008 | 12/2009 |
| EP | 2149667 | 2/2010 |
| EP | 2181233 | 5/2010 |
| EP | 2386711 | 11/2011 |
| EP | 2395194 | 12/2011 |
| EP | 2709803 | 1/2012 |
| JP | 2004357103 | 12/2004 |
| RU | 172702 | 7/2017 |
| WO | 8704339 | 7/1987 |
| WO | 9204850 | 4/1992 |
| WO | 9220271 | 11/1992 |
| WO | 9304619 | 3/1993 |
| WO | 9511614 | 5/1995 |
| WO | 9515709 | 6/1995 |
| WO | 9701982 | 1/1997 |
| WO | 9800340 | 1/1998 |
| WO | 9840632 | 9/1998 |
| WO | 9947782 | 9/1999 |
| WO | 27267 | 5/2000 |
| WO | 209566 | 2/2002 |
| WO | 3007770 | 1/2003 |
| WO | 3017816 | 3/2003 |
| WO | 3040511 | 5/2003 |
| WO | 3046327 | 6/2003 |
| WO | 3051169 | 6/2003 |
| WO | 3052234 | 6/2003 |
| WO | 2004083563 | 9/2004 |
| WO | 2005005085 | 1/2005 |
| WO | 2005101525 | 10/2005 |
| WO | 2005110171 | 11/2005 |
| WO | 2014100250 | 6/2014 |
| WO | 2016135183 | 9/2016 |
| WO | 2016182478 | 11/2016 |
| WO | 2018060232 | 4/2018 |
| WO | 2018060807 | 4/2018 |
| WO | 2018141960 | 8/2018 |
| WO | 2019001626 | 1/2019 |

OTHER PUBLICATIONS

Funk, M., Schneegass, S., Behringer M., Henze N., and Schmidt A., An Interactive Curtain for Media Usage in the Shower. In Proc. PerDis '15. ACM (2015), 225-231.

Canny, J. A computational approach to edge detection. Pattern Analysis and Machine Intelligence, IEEE Transactions on, 6 (1986), 679-698.

Del Valle, A. C. A., and Opalach, A. The persuasive mirror: computerized persuasion for healthy living. In Proceedings of the 11th International Conference on Human-Computer Interaction (HCI International '05). Las Vegas (2005).

Dey, A. K., Wac, K., Ferreira, D., Tassini, K., Hong, J.-H., and Ramos, J. Getting closer: an empirical investigation of the proximity of user to their smart phones. In Proceedings of the 13th international conference on Ubiquitous computing, ACM (2011), 163-172.

Fujinami, K., and Kawsar, F. An experience with augmenting a mirror as a personal ambient display. In Computer-Human Interaction, Springer (2008), 183-192.

Hardy, J., and Alexander, J. Toolkit support for interactive projected displays. In Proceedings of the 11.sup.th International Conference on Mobile and Ubiquitous Multimedia, MUM ' 12, ACM (New York, NY, USA, 2012), 42:1-42:10.

Iwai, D., and Sato, K. Heat sensation in image creation with thermal vision. In Proceedings of the 2005 ACM SIGHI International Conference on Advances in computer entertainment technology, ACM (2005), 213-216.

Klompmaker, F., Nebe, K., and Fast, A. dsensingni: a framework for advanced tangible interaction using a depth camera. In Proceedings of the Sixth International Conference on Tangible, Embedded and Embodied Interaction, ACM (2012), 217-224.

Kurz, D. Thermal touch: Thermography-enabled everywhere touch interfaces for mobile augmented reality applications. In Mixed and Augmented Reality (ISMAR), 2014 IEEE International Symposium on, IEEE (2014), 9-16.

Larson, E., Cohn, G., Gupta, S., Ren, X., Harrison, B., Fox, D., and Patel, S. Heatwave: thermal imaging for surface user interaction. In Proceedings of the SIGCHI Conference on Human Factors in Computing Systems, ACM (2011), 2565-2574.

Wilson, A. D. Using a depth camera as a touch sensor. In ACM international conference on interactive tabletops and surfaces, ACM (2010), 69-72.

(56) References Cited

OTHER PUBLICATIONS

Sahami Shirazi, A., Henze, N., Dingler, T., Kunze, K., and Schmidt, A. Upright or sideways?: analysis of smartphone postures in the wild. In Proceedings of the 15th international conference on Human-computer interaction with mobile devices and services, ACM (2013), 362-371.
Starner, T. Project glass: An extension of the self. Pervasive Computing, IEEE 12, Apr. 2, 2013, 14-16.
Zhou, B., Cheng, J., Sundholm, M., and Lukowicz, P. From smart clothing to smart table cloth: Design and implementation of a large scale, textile pressure matrix sensor. In Architecture of Computing Systems—ARCS 2014. Springer, 2014, 159-170.
Sahami Shirazi, A., Abdelrahman, Y., Henze, N., Schneegass, S., Khalilbeigiy, M., and Schmidt, A. Exploiting thermal reflection for interactive systems. In Proceedings of the 2014 ACM annual conferenceon Human factorsin computing systems, CHI ' 14, ACM (New York, NY, USA, 2014).
UK sustainable shower study—https://www.unilever.co.uk/news/press-releases/2011/uk-sustainable—-shower-study.html (last access on May 21, 2017).
Is the five minute shower an urban myth?—http://www.ech2o.co.uk/is-the-five-minute-shower-an-urban-myth (last access on May 21, 2017).
Le terme shower cabin with built-in touch-interactive OLED display—http://www.homecrux.com/2012/08/25/615/le-terme-shower-cabin-wit- h-built-in-touch-interactive-oled-display.html (last access on May 21, 2017).
Piezo shower—http://www.piezo-shower.blogspot.de/ (last access May 21, 2017).
AquaNotes—waterproof notepad http://www.myaquanotes.com (last access May 21, 2017).
Edison Research—The Smartphone Consumer—http://www.edisonresearch.com/wp-content/uploads/2012/06/The_Sm—artphone_Consumer_2012_by_Edison_Research.pdf (last access May 21, 2017).
Wilson, A. D. Touchlight: an imaging touch screen and display for gesture-based interaction. In Proceedings of the 6th international conference on Multimodal interfaces, ACM (2004), 69-76.
Dante vision: In-air and touch gesture sensing for natural surface interaction with combined depth and thermal cameras—https://iths.pure.elsevier.com/en/publications/dante-vision-in-a- ir-and-touch-gesture-sensing-for-natural-surface (last access on May 21, 2017).
Intelligent bathroom—https://www.researchgate.net/publication/228881021_Intelligent_—bathroom (last access on May 21, 2017).
Ubiquitous Media Lab. / Flat # Laboratory—https://translate.google.com/translate?hl=en&sl=ja&tl=en&u=ht-tp%3A%2F%2Fubiqmedia.cse.kyoto-su.ac.jp%2F%3Fpage_id%3D68 (last access on May 21, 2017).
AquaTop display: interactive water surface for viewing and manipulating information in a bathroom—https://www.semanticscholar.org/paper/AquaTop-display-interacti- ve-water-surface-for-view-Koike-Matoba/7a523fc5b3be65c06c2dae0887d487eadfd—91179 (last access on May 21, 2017).
Bathcratch: touch and sound-based DJ controller implemented on a bathtub—http://dl.acm.org/citation.cfm?id=2426063.2426068&preflayout=tab—s (last access on May 21, 2017).

Saiki Ito, Shuichi Ishibashi, Kosuke Kazato, Mariko Koizumi, Keigo Aoki, Naohito Okude, Spalogue: Designing Men-Women Communication in a Public Bath, Adjunct Proceedings of the 8th International Conference of Ubiquitous Computing (Ubicomp 2006).
Smart glass, Wikipedia, <available at https://en.wikipedia.org/wiki/Smart_glass, printed on Dec. 5, 2018>.
Heatable glass, Wikipedia, <available at https://en.wikipedia.org/wiki/Heatable_glass, printed on Dec. 5, 2018>.
Smart film, Wikipedia, <available at https://en.wikipedia.org/wiki/Smart_film, printed on Dec. 5, 2018>.
Smartglass International: Switchable Smart Glass, <available at http://www.smartglassinternational.com, printed on Dec. 5, 2018>.
Smartglass International, Projects, <available at http://www.smartglassinternational.com/projects/#all, printed on Dec. 5, 2018>.
Smartglass International, Projects, Kempinski Hotel & Resorts, Bahrain, <available at http://www.smartglassinternational.com/projects/kempinski-hotel-resorts, printed on Dec. 5, 2018>.
Smartglass International, Projects, Eccleston Square Hotel, London, England, <available at http://www.smartglassinternational.com/projects/eccleston-square-hotel, printed on Dec. 5, 2018>.
Smartglass International, Projects, The Brew House Hotel, Tunbridge Wells, <available at http://www.smartglassinternational.com/projects/the-brew-house-hotel, printed on Dec. 5, 2018>.
Smartglass International, LC SmartGlass.TM. SPD SmartGlass.TM. Electronically Switchable Glass Handbook, <available at http://smartglassinternational.com/downloads/SmartGlass_Handbook_2012.pdf- , printed on Dec. 5, 2018>.
Smartglass International, LC SmartGlass.TM. Electronically Switchable Glass Handbook, <available at http://www.smartglassinternational.com/downloads/LC_SmartGlass_HandbookOL—D.pdf, printed on Dec. 5, 2018>.
Smartglass International, SmartGlass International SPD SmartGlass.TM. Overview, <available at http://www.smartglassinternational.com/downloads/SPD_SmartGlass_Data.pdf, printed on Dec. 5, 2018>.
Archilovers, switchable privacy glass, <available at http://img.archilovers.com/projects/b11d9bde-cea3-4809-81c9-282bac36ca31.—pdf, printed on Dec. 5, 2018>.
Smartglass International, Youtube, Smartglass Animation | Electronic Switchable Glass, <available at https://www.youtube.com/watch?v=tbj9hZAF4I4, printed on Dec. 5, 2018>.
Glass magazine, Something new, <available at https://glassmagazine.com/article/retail/something-new-119101, printed on Dec. 5, 2018>.
Dream Glass Group, Youtube, DreamGlass.RTM. Privacy Glass: Smart Glass Bathroom Applications, <available at https://www.youtube.com/watch?v=QjUvI4Pbba0, printed on Dec. 5, 2018>.
Zoeypill, Youtube, Smart Glass Bathroom, <available at https://www.youtube.com/watch?v=x4AV_fCbP5g, printed on Dec. 5, 2018>.
Smartglass International, Smart Glass, <available at http://www.smartglassinternational.com/smart-glass-2/, printed on Dec. 5, 2018>.
Smartglass International, Hotel Guest Reviews—LC SmartGlass, <available at http://www.smartglassinternational.com/hotel-guest-reviews-lc-smartglass/- , printed on Dec. 5, 2018>.
Smartglass International, Electric privacy glass for homes, <available at http://www.smartglassinternational.com/electric-privacy-glass-for-home—s/, printed on Dec. 5, 2018>.

\* cited by examiner

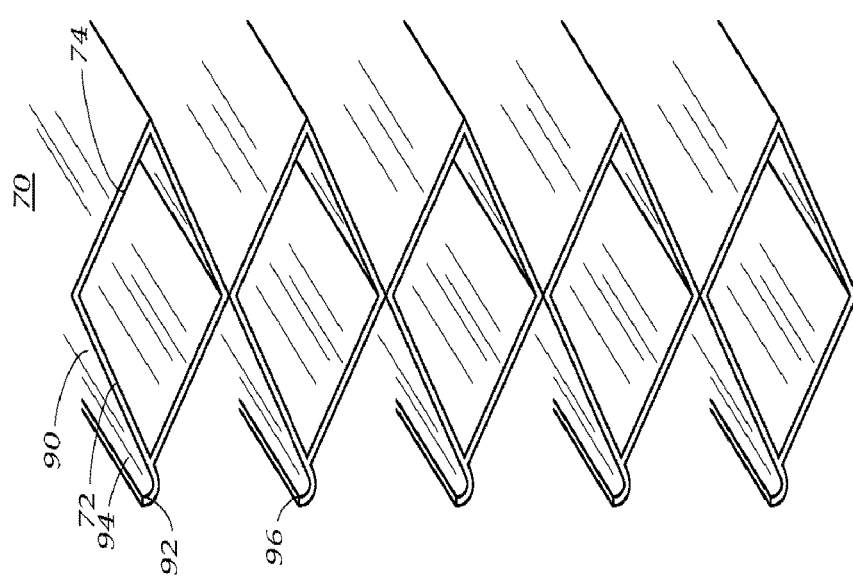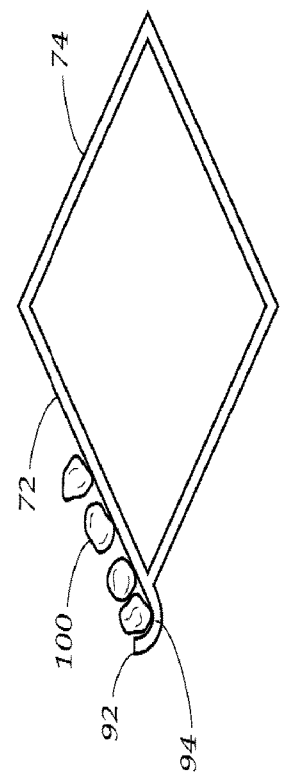
FIG. 5A
FIG. 5B

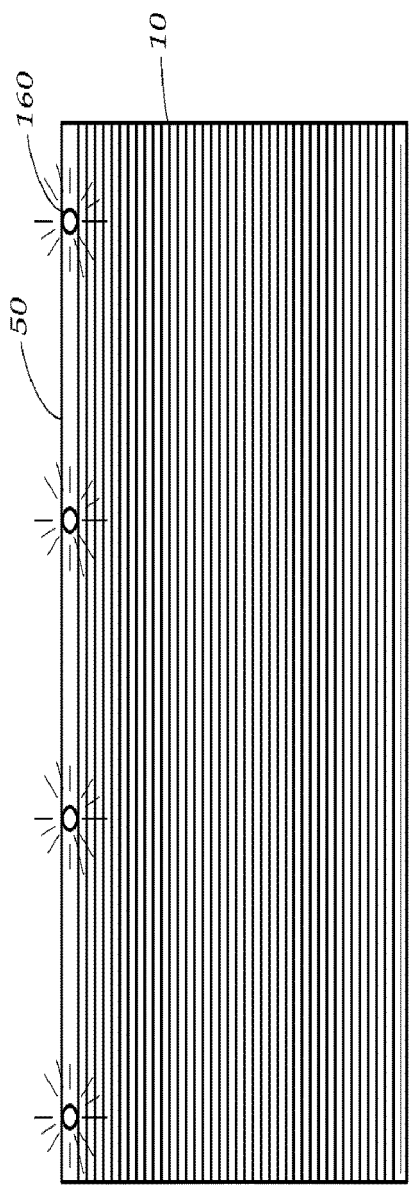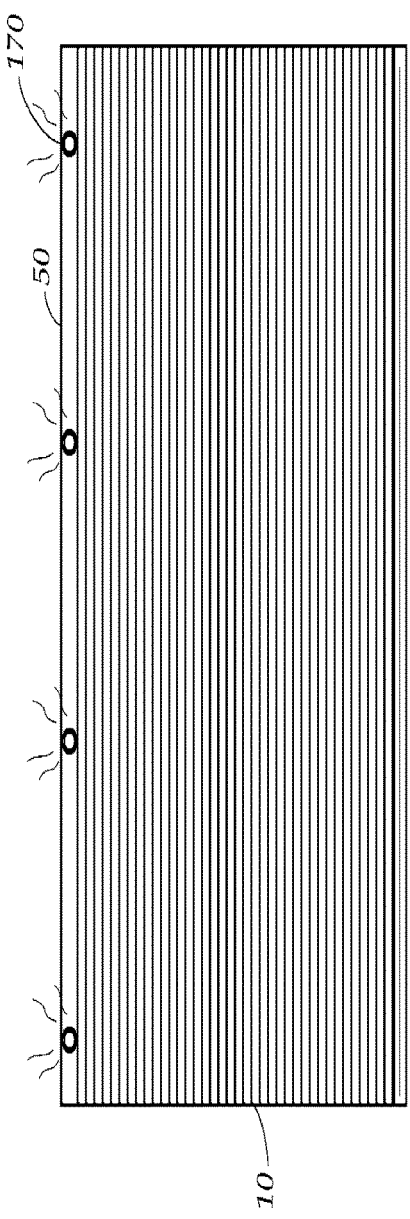
FIG. 10A
FIG. 10B

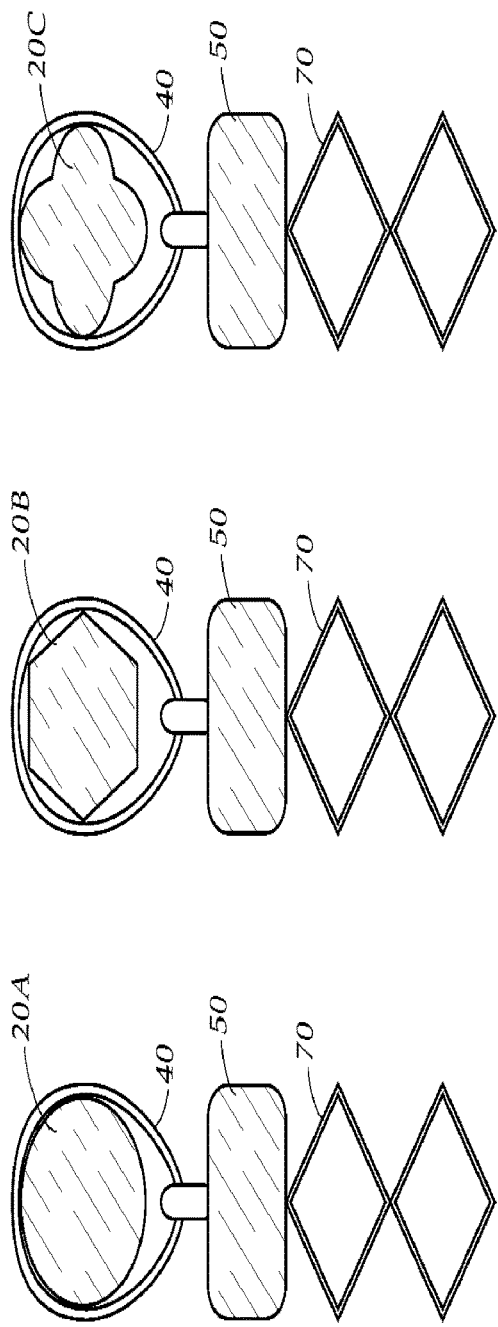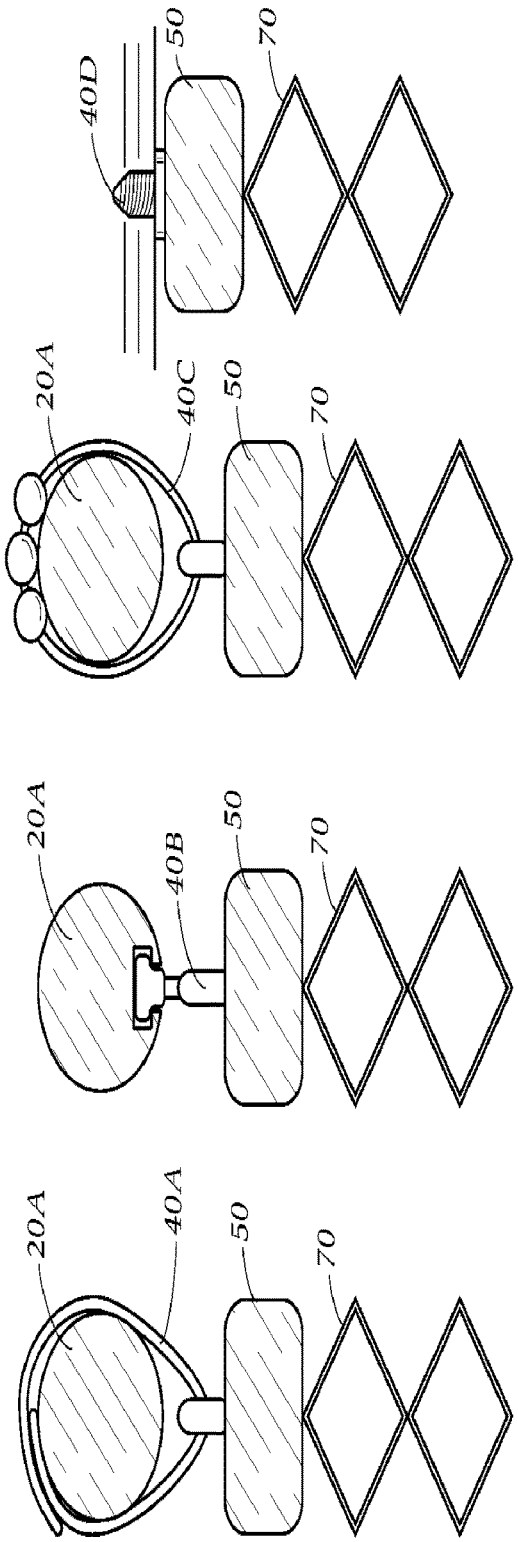

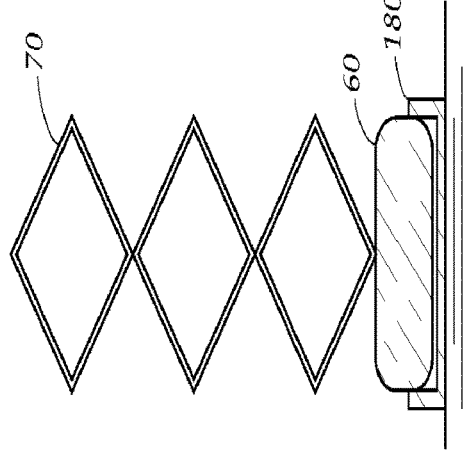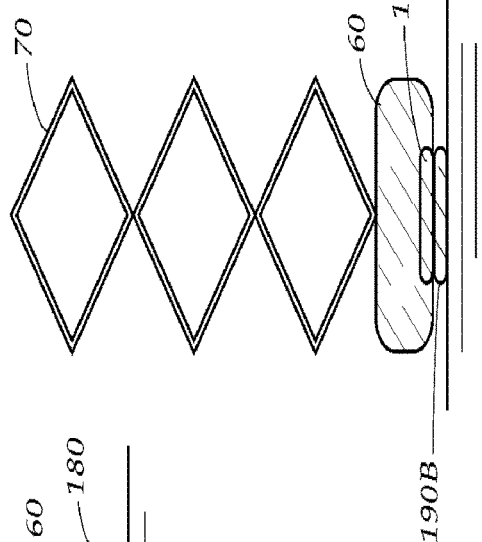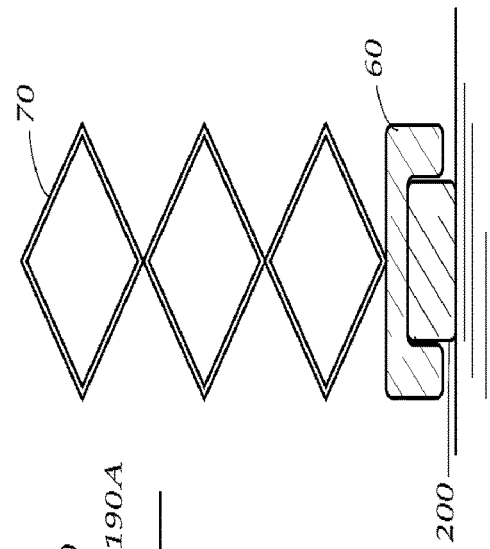

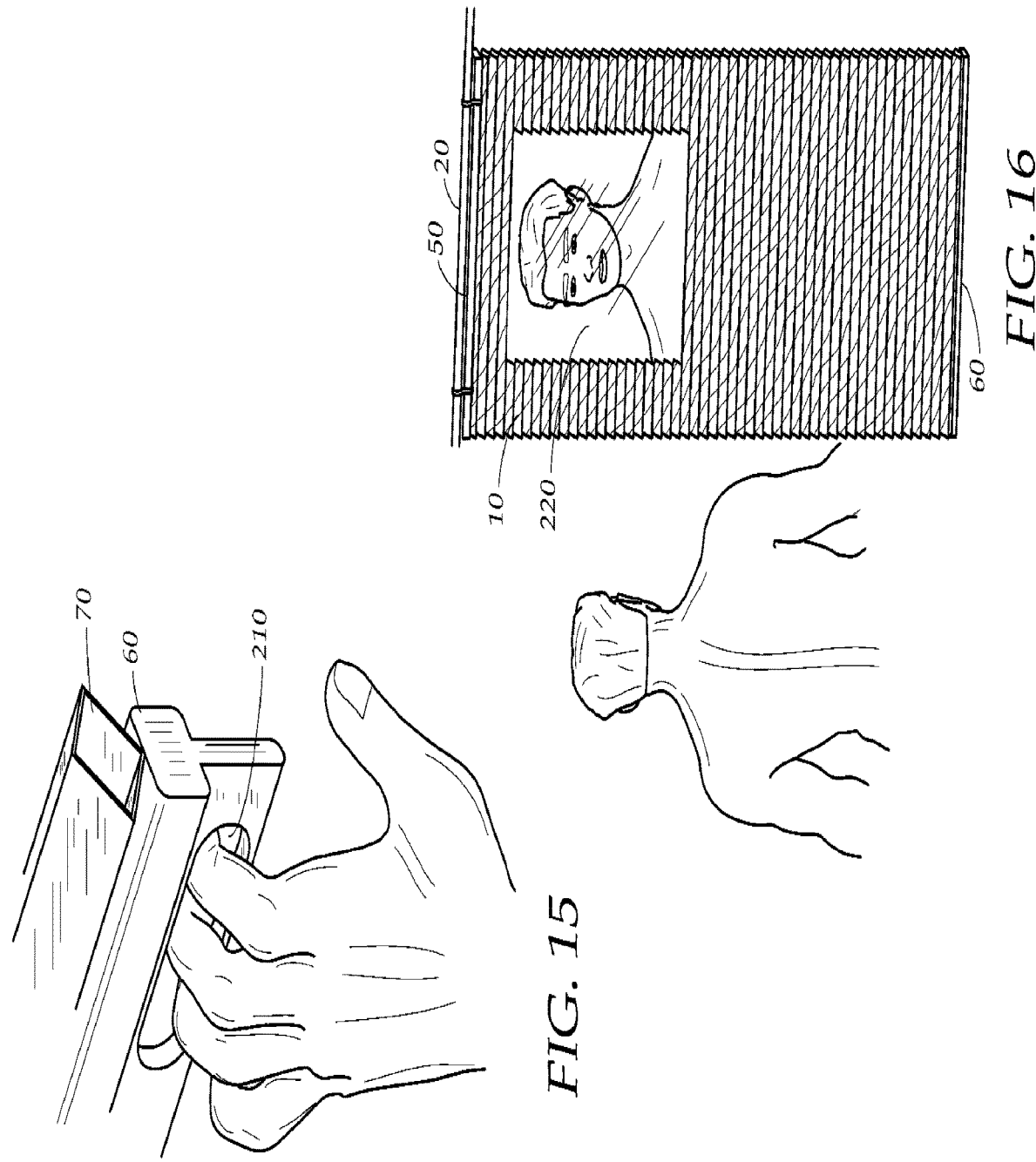

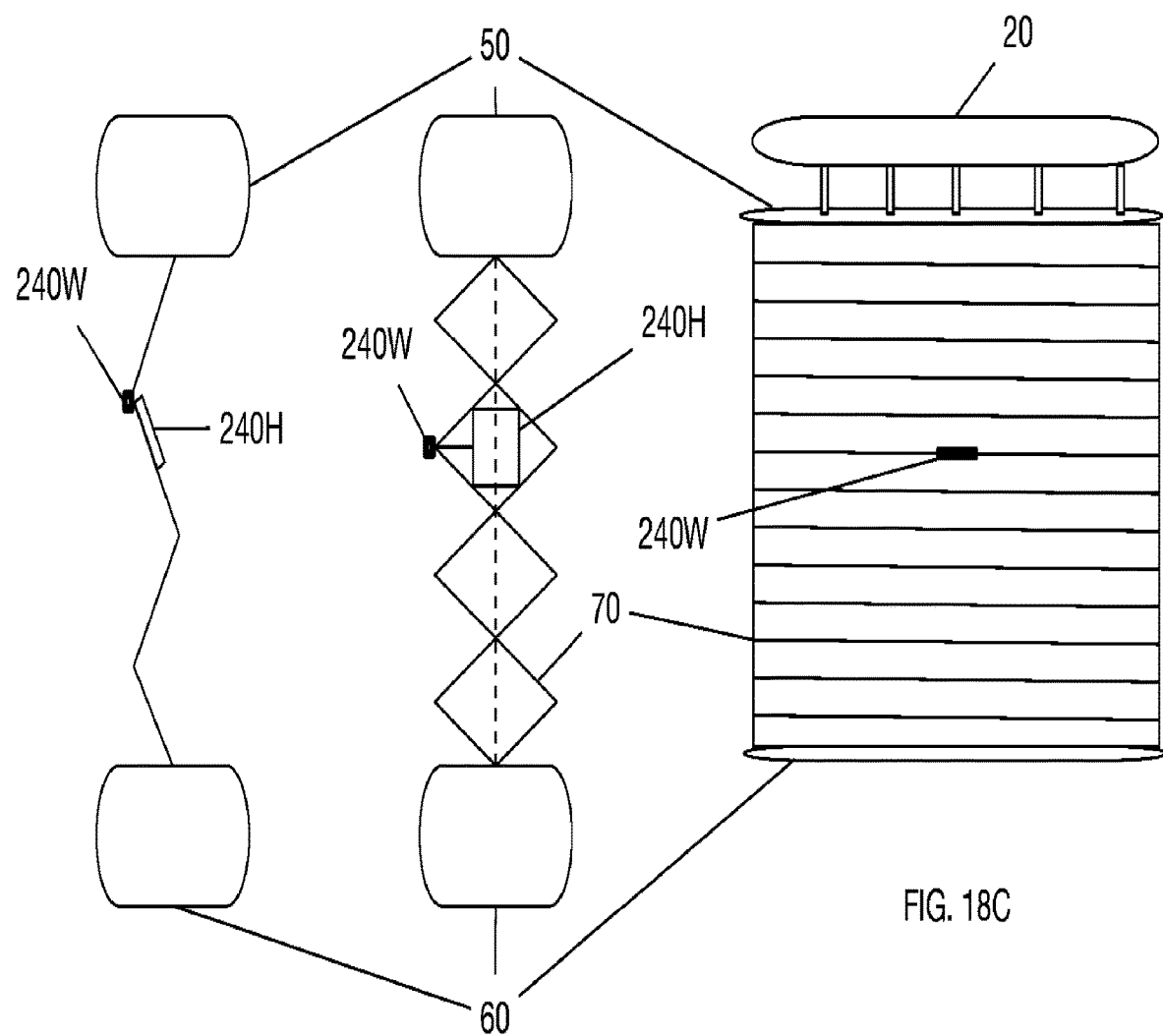

240

240

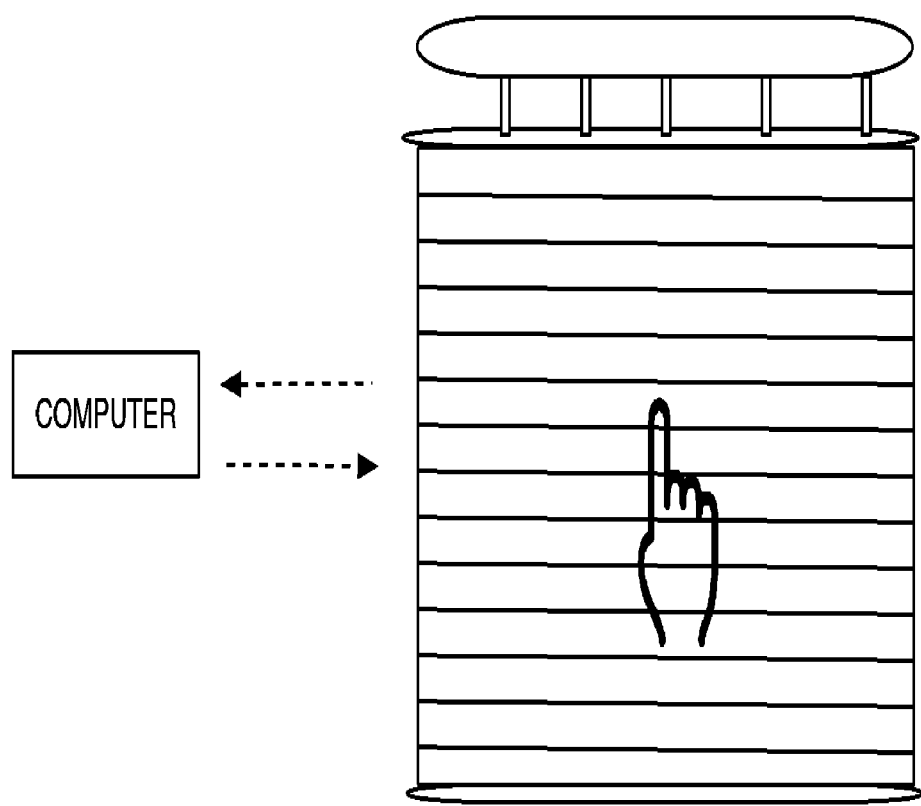
FIG. 18G            240

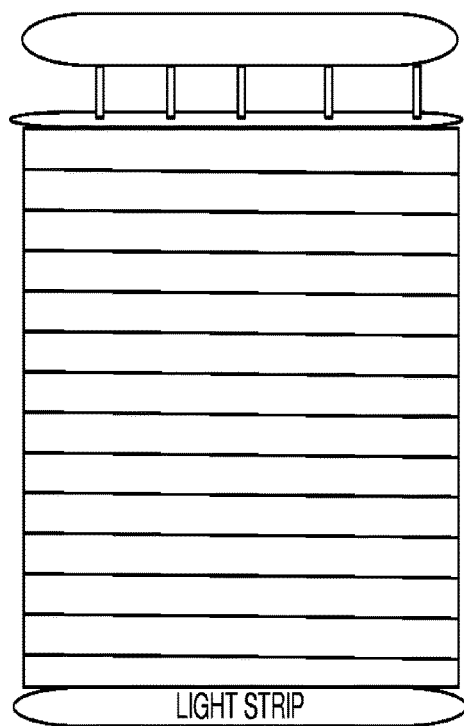
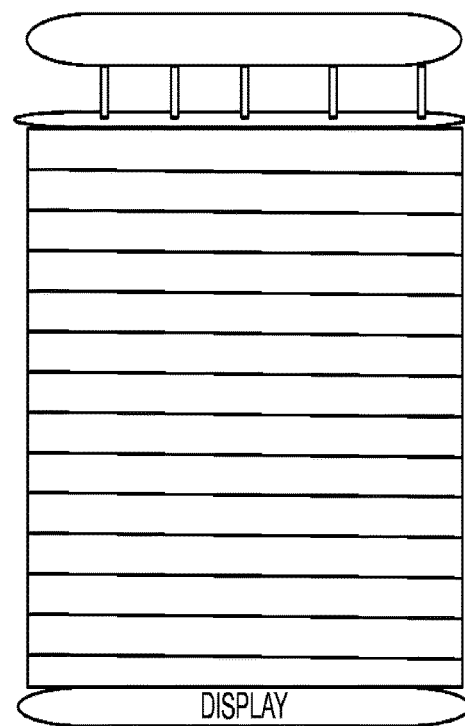
240
240
FIG. 18H
FIG. 18I

240

240

PORTABLE SHOWER BOOTH

240

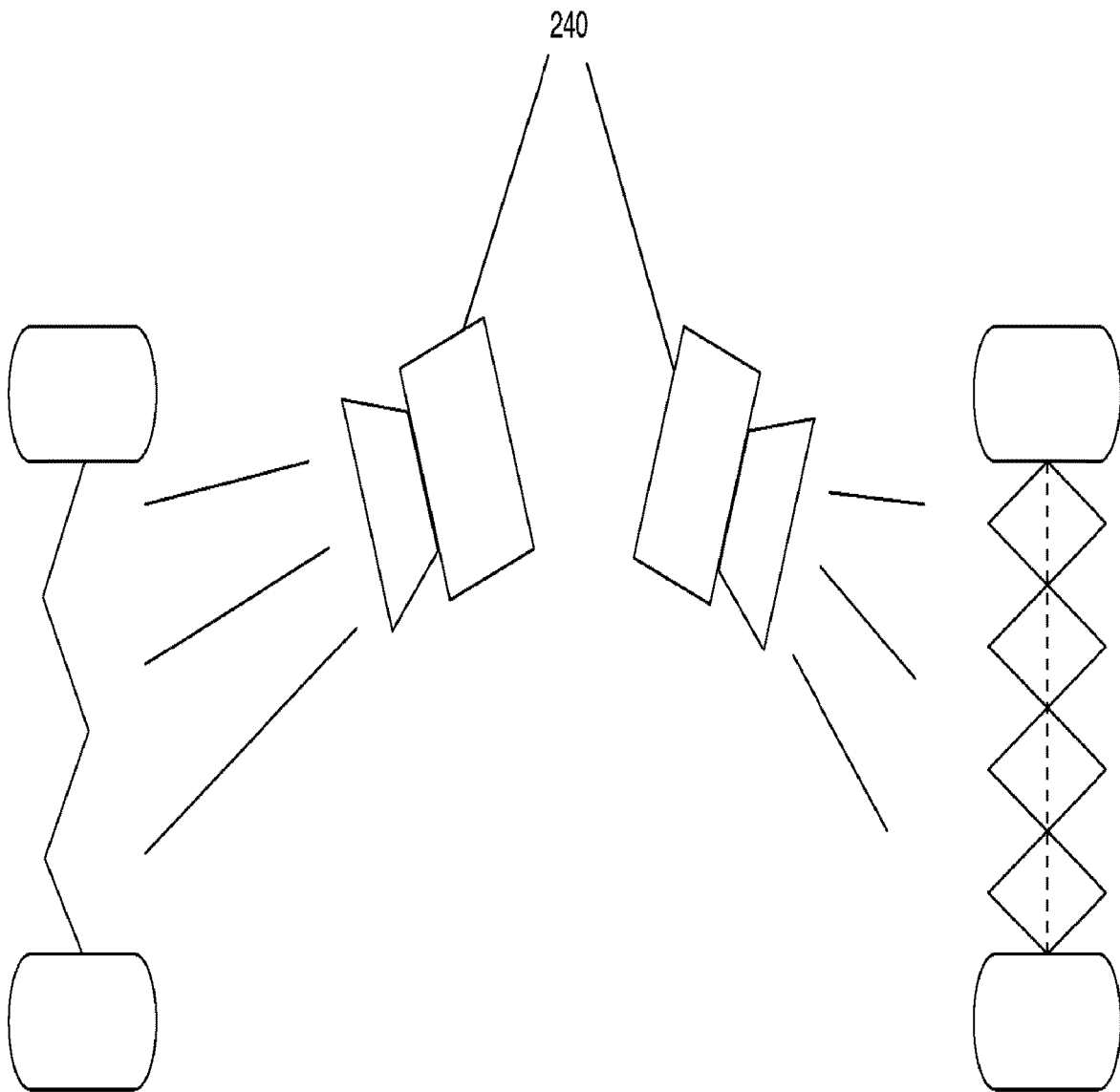
FIG. 18R1  FIG. 18R2

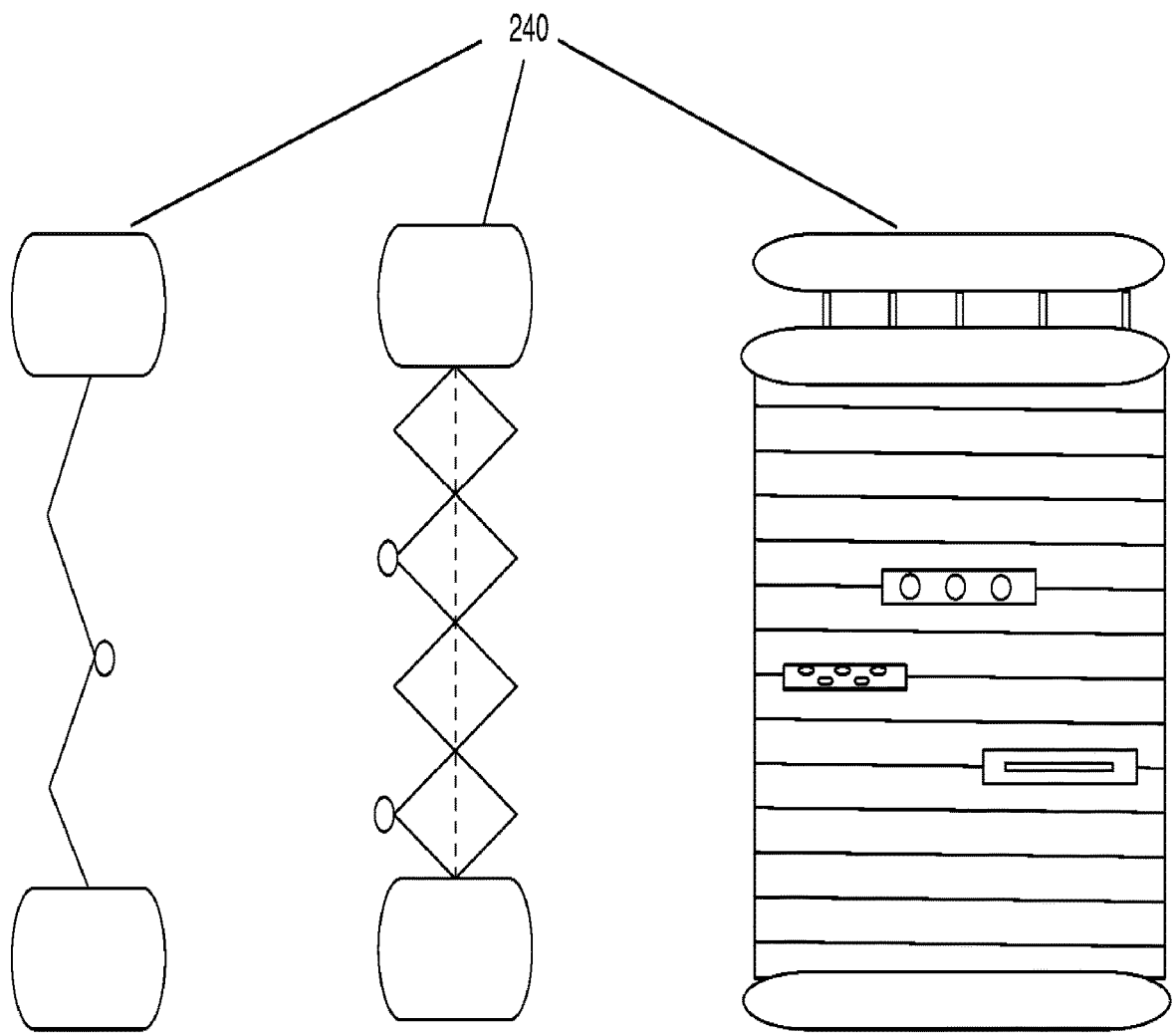
FIG. 18S1  FIG. 18S2  FIG. 18S3

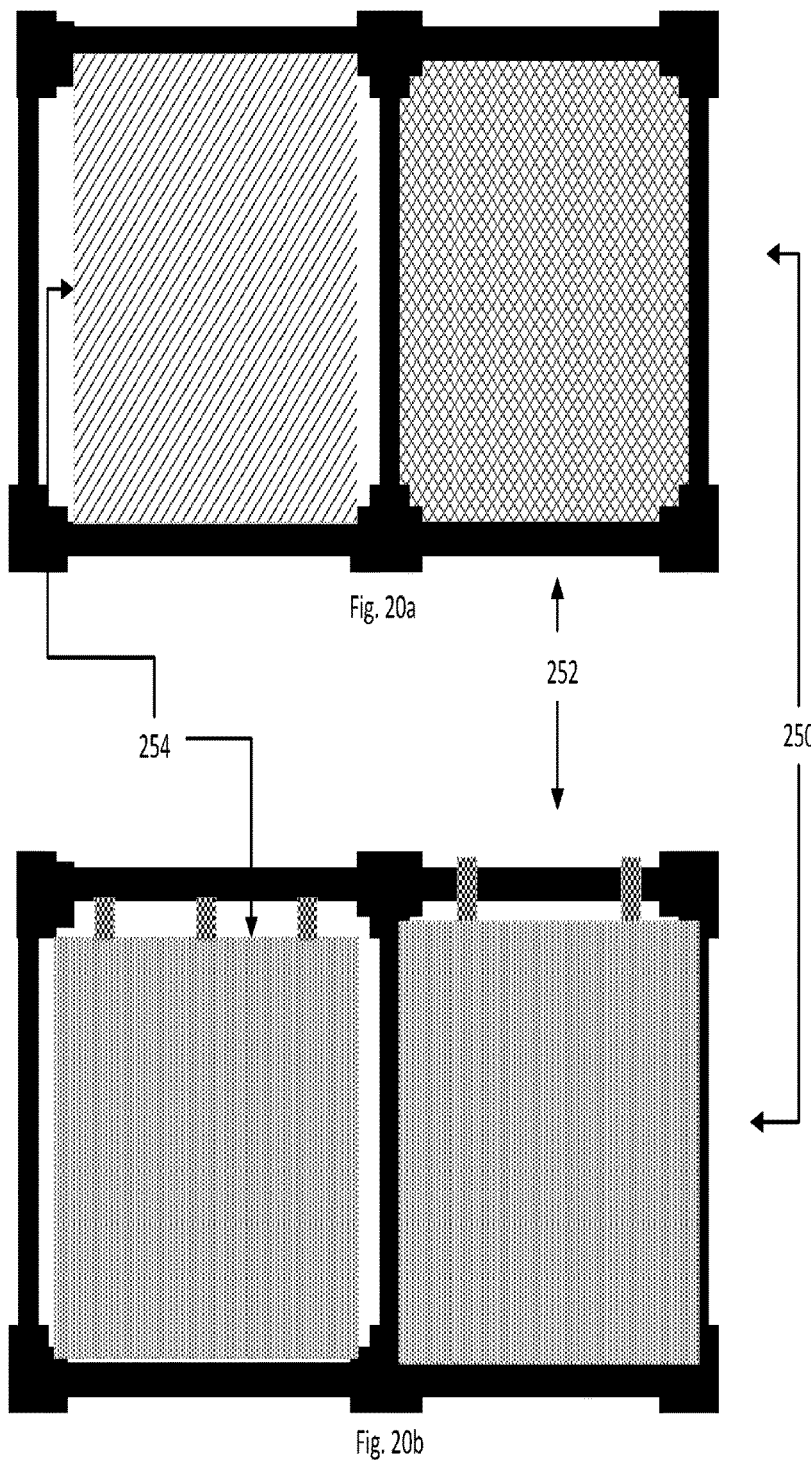

PARTITION TECHNOLOGIES

CROSS-REFERENCE TO RELATED APPLICATIONS

This application is a continuation of U.S. patent application Ser. No. 15/367,522 filed on Dec. 2, 2016, now U.S. Pat. No. 10,292,538, which is a continuation-in-part of U.S. patent application Ser. No. 14/948,376, filed on Nov. 22, 2015, now U.S. Pat. No. 9,510,711, which is a continuation-in-part of U.S. patent application Ser. No. 14/051,444, filed on Oct. 10, 2013, now U.S. Pat. No. 9,192,267, which claims a benefit of priority to U.S. Patent Application 61/712,793, filed on Oct. 11, 2012, each of which is herein fully incorporated by reference for all purposes.

TECHNICAL FIELD

This disclosure relates to partitions.

BACKGROUND

In this disclosure, where a document, an act and/or an item of knowledge is referred to and/or discussed, then such reference and/or discussion is not an admission that the document, the act and/or the item of knowledge and/or any combination thereof was at the priority date, publicly available, known to the public, part of common general knowledge and/or otherwise constitutes prior art under the applicable statutory provisions; and/or is known to be relevant to an attempt to solve any problem with which this disclosure may be concerned with.

A typical shower curtain effectively provides privacy to a user during a showering process. In addition, the curtain effectively prevents water from spraying past the curtain during the showering process. Further, the curtain moves along a horizontal plane when facing the user.

While certain aspects of conventional technologies have been discussed to facilitate the present disclosure, no technical aspects are disclaimed. The claims may encompass at least one of the conventional technical aspects discussed herein.

BRIEF SUMMARY

This disclosure may at least partially address at least one of the above. However, this disclosure may prove useful to other technical areas. Therefore, at least some claims should not be construed as necessarily limited to addressing any of the above.

According to an example embodiment of the present disclosure a shower curtain is provided. The curtain includes a body having an upper end and a lower end opposing the upper end. The body has a plurality of cells extending one above another between the upper end and the lower end. The body is configured for retracting toward the upper end based at least in part on the cells collapsing onto each other when a force is applied onto the lower end toward the upper end. The lower end is configured for substantially remaining in place responsive to the force being removed.

According to an example embodiment of the present disclosure a shower curtain is provided. The curtain includes a body having an upper end and a lower end opposing the upper end. The body has a plurality of pleat folds extending one above another between the upper end and the lower end. The body is configured for retracting toward the upper end based at least in part on the cells folding onto each other when a force is applied onto the lower end toward the upper end. The lower end is configured for substantially remaining in place responsive to the force being removed.

According to an example embodiment of the present disclosure a shower curtain is provided. The curtain includes a body having an upper end and a lower end opposing the upper end. The body has a plurality of cells extending one above another between the upper end and the lower end. The lower end includes a handle. The lower end includes a magnet. The cells comprise a plurality of liquid channels configured to receive liquid during showering. At least one of the channels is external to at least one of the cells and is inclined such that liquid flow is gravity induced. The body includes a lip configured for liquid output into a drain. At least one of the channels is in fluid communication with the lip. The body includes a shaving mirror configured to effectively reduce fog formation thereon during showering based at least in part on liquid flow via at least one of the channels. The body is configured for retracting toward the upper end based at least in part on the cells collapsing onto each other when a force is applied onto the lower end toward the upper end. The lower end is configured for substantially remaining in place responsive to the force being removed.

The present disclosure may be embodied in the form illustrated in the accompanying drawings. However, attention is called to the fact that the drawings are illustrative. Variations are contemplated as being part of the disclosure, limited only by the scope of the claims.

BRIEF DESCRIPTION OF DRAWINGS

The accompanying drawings illustrate example embodiments of the present disclosure. Such drawings are not to be construed as necessarily limiting the disclosure. Like numbers and/or similar numbering scheme can refer to like and/or similar elements throughout.

FIG. 5A shows a side view of an example embodiment of a cellular shower curtain having a plurality of liquid channels according to the present disclosure.

FIG. 5B shows a side view of an example embodiment of a liquid drops forming on a channel of a cellular shower curtain according to the present disclosure.

FIG. 10A shows an example embodiment of a shower curtain having a plurality of light sources according to the present disclosure.

FIG. 10B shows an example embodiment of a shower curtain having a plurality of air fresheners according to the present disclosure.

FIG. 11A shows an example embodiment of a shower curtain coupled to an elliptical-shaped shower rod according to the present disclosure.

FIG. 11B shows an example embodiment of a shower curtain coupled to a polygonal-shaped shower rod according to the present disclosure.

FIG. 11C shows an example embodiment of a shower curtain coupled to a flower-shaped shower rod according to the present disclosure.

FIG. 12A shows an example embodiment of a shower curtain fastened to a shower rod according to the present disclosure.

FIG. 12B shows an example embodiment of a shower curtain coupled to a rail shower rod according to the present disclosure.

FIG. 12C shows an example embodiment of a shower curtain coupled to a shower rod via a shower curtain ring according to the present disclosure.

FIG. 12D shows an example embodiment of a shower curtain coupled to a ceiling according to the present disclosure.

FIG. 14A shows an example embodiment of a shower curtain coupled to a surface via a track according to the present disclosure.

FIG. 14B shows an example embodiment of a shower curtain coupled to a surface via a fastener according to the present disclosure.

FIG. 14C shows an example embodiment of a shower curtain coupled to a surface via a weight according to the present disclosure.

FIG. 15 shows an example embodiment of a shower curtain having a handle according to the present disclosure.

FIG. 16 shows an example embodiment of a shower curtain having a shaving mirror according to the present disclosure.

FIGS. 18A-18C show example embodiments of a shower partition comprising a sound input device according to the present disclosure.

FIG. 18G shows an example embodiment of a shower partition being touch enabled according to the present disclosure.

FIGS. 18H, 18I show example embodiments of a partition comprising a light strip and a display according to the present disclosure.

FIGS. 18R1, 18R2 show example embodiments of projectors projecting onto shower partitions according to the present disclosure.

FIGS. 18S1, 18S2, 18S3, 18T show example embodiments of shower partitions with fluid output systems according to the present disclosure.

FIGS. 20A-E show various embodiments of partitions in a context of a structure according to the present disclosure.

DETAILED DESCRIPTION OF PREFERRED EMBODIMENTS

Figure 1:
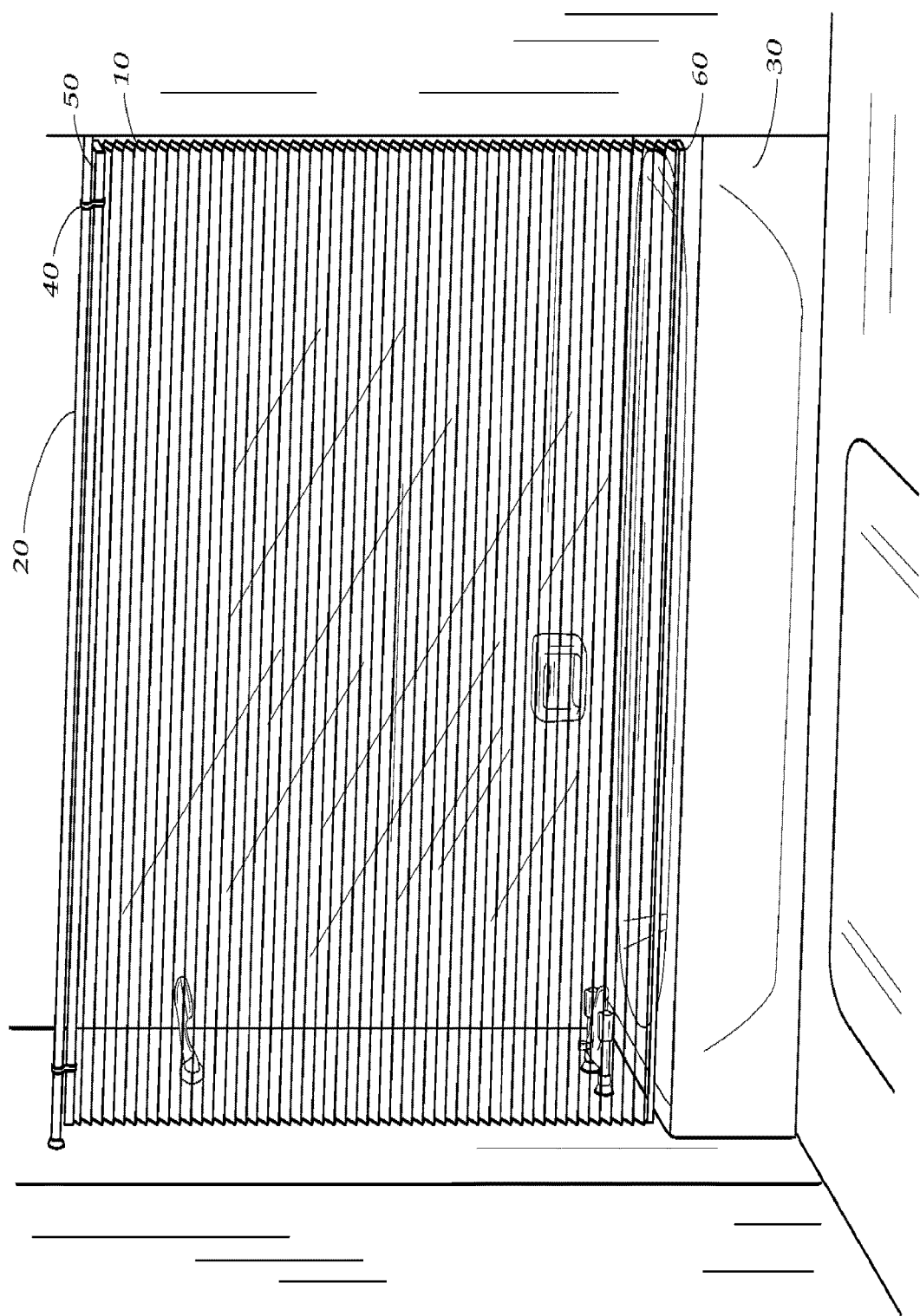
FIG. 1 shows an example embodiment of a shower curtain in an expanded state according to the present disclosure.

The present disclosure is now described more fully with reference to the accompanying drawings, in which example embodiments of the present disclosure are shown. The present disclosure may, however, be embodied in many different forms and should not be construed as necessarily being limited to the example embodiments disclosed herein. Rather, these example embodiments are provided so that the present disclosure is thorough and complete, and fully conveys the concepts of the present disclosure to those skilled in the relevant art. In addition, features described with respect to certain example embodiments may be combined in and/or with various other example embodiments in any permutational or combinatory manner. Different aspects and/or elements of example embodiments, as disclosed herein, may be combined in a similar manner. The term "combination", "combinatory," or "combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements may be present, including indirect and or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular example embodiments only and is not intended to be necessarily limiting of the present disclosure. As used herein, the singular forms "a," an and the are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing, and/or other any other types of manufacturing. For example, some manufacturing processes include three-dimensional (3D) printing, laser cutting, computer numerical control (CNC) routing, milling, pressing, stamping, vacuum forming, hydroforming, injection molding, lithography, and so forth.

Any and/or all elements, as disclosed herein, can be a part of, are, or include, whether partially and/or fully, a solid, including a metal, a mineral, an amorphous material, a ceramic, a glass ceramic, an organic solid, such as wood and/or a polymer, such as rubber, a composite material, a semiconductor, a nanomaterial, a biomaterial and/or any combinations thereof. Any and/or all elements, as disclosed herein, can be a part of, are, or include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, reflection, anti-reflection and/or holography, a photosensitive coating, an electronic and/or thermal property coating, such as for passivity, insulation, resistance or conduction, a magnetic coating, a water-resistant and/or waterproof coating, a scent coating and/or any combinations thereof. Any and/or all elements, as disclosed herein, can be rigid, flexible, and/or any other combinations thereof. Any and/or all elements, as disclosed herein, can be identical and/or different from each other in material, shape, size, color and/or any measurable dimension, such as length, width, height, depth, area, orientation, perimeter, volume, breadth, density, temperature, resistance, and so forth.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, the term "about," "substantial," and/or "substantially" refers to an up to and including a +/−15% variation from the nominal value/term. Such variation is always included in any given value/term provided herein, whether or not such variation is specifically referred thereto.

U.S. Patent Application Publications 20150216331, 20150135426, 20130145543, 20130167335, 20130219736, 20140026316, 20140289955, 20140345814, 20150074896, 20150113722, 20150327729, 20150327728, 20150297038, 20150297037, 20150289724, 20150257610, 20150250363, 20150238052, 20150223643, 20150208873, 20150208766, 20150374160, 20150286638, 20140016837, 20150055834, 20160345755, 20160331193, 20160289909, 20160287027, 20160278582, 20160262577, 20160045080, and 20030215115 are fully incorporated by reference herein for any and/or all purposes, at least as disclosed herein or within any of such publications in any combinatory or permutational manner. Therefore, any combination in any permutational manner of any technology in any of such publications and present disclosure can be made for any and/or all purposes, whether disclosed herein or therein. To be even more clear, any systems/devices/methods of this disclosure can be combined with any systems/devices/methods of any of above-specified disclosures for any or all reasons disclosed herein or therein, as understood to those having ordinary skill in this art. For example, any partition devices, input devices, output devices, walls, blinds, sensors, accessories, or logic, whether hardware or software, or techniques of this disclosure can be combined with any partition devices, input devices, output devices, walls, blinds, sensors, accessories or logic, whether hardware or software, or techniques of any of above-mentioned disclosures. Note that if any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

FIG. 1 shows an example embodiment of a shower curtain in an expanded state according to the present disclosure. A shower room contains a shower curtain 10, a shower rod 20, a bathtub/shower stall 30, a shower curtain rod coupler, such as a pair of rings 40, a top bar 50, and a bottom bar 60. Bathtub/shower stall 30 includes an opening for user entry and/or user exit.

Curtain 10 is in an expanded state as suspended from rod 20. In the expanded state, curtain 10 substantially covers the opening of bathtub/shower stall 30. Rod 20 is mounted substantially horizontally across the opening of bathtub/shower stall 30 and can be close to a ceiling of the shower room. Curtain 10 can be cordless, horizontally pleated, and/or cellular. Note that other types of shower curtains are possible according to alternative example embodiments, such as a venetian blind, a roman shade, or any other curtain typically used as a window covering. Curtain 10 can have light filtering, light polarizing, darkening, or blackout properties. The light filtering can be used to depict images and/or text and/or shadows on a wall within the shower for view of a person showering. Curtain 10 can have different designs depicted on any one or both sides of curtain 10. An example embodiment of curtain 10 can be similar to a cordless horizontally pleated window blind, which is raised and lowered by manual action. Curtain 10 can include waterproof material. The curtain 10 can be transparent, translucent, or opaque. Curtain 10 can have any shape, such as a parallelogram, a polygon, an ellipse, a triangle, and so forth. Curtain 10 can include a single, a double, or a multiple layer of collapsible voids that provide insulation when curtain 10 is in the extended state.

Rod 20 can be attached to bar 50, which can be rigid or semi-rigid, and/to or a top pleat/cell of curtain 10. Curtain 10 is secured to rod 20 via rings 40 coupled to bar 50 or to the top pleat/cell of curtain 10. Alternatively, curtain 10 can be secured to rod 20 or top pleat/cell via adhesives, magnets, mating mechanisms, suction cups and/or other similar securing/fastening/coupling methods. For example, support or mounting brackets/head-rails can be used along with screws for attachment. Curtain 10 can be mounted inside or outside the bracket. A valance may be used to cover the mounting bracket or head-rail. When a frame is used, then the frame itself may be made from any material, which allows attachment to curtain 10. Curtain 10 can travel within the frame, such as via frame rails. Curtain 10 can be pulled via a rod or other device, such as a pull tag. The mounting bracket can be attached to a wall or the ceiling. Moreover, at least two mounting brackets or bars can be used. This can allow for a part of curtain 10 to move substantially vertically, while another part of curtain 10 can move substantially horizontally. Curtain 10 can be controlled via a remote-control device. In addition, curtain 10 can be opened automatically when water from a showerhead is turned off. Alternatively, curtain 10 can be coupled to rod 20, the frame, or the wall in any way.

Curtain 10 can have a rigid or a semi-rigid bottom bar 60 and/or a bottom pleat/cell. Curtain 10 can have a weight on bar 60 and/or the bottom pleat/cell to keep curtain 10 in place, as discussed herein. Alternatively, curtain 10 can have adhesives, magnets, mating mechanisms, suction cups and/or any other securing/fastening/coupling technologies coupled to bar 60 and/or the bottom pleat/cell such that these securing/fastening/coupling technologies can couple bar 60 and/or the bottom pleat/cell to bathtub/shower stall 30 or a floor in the shower room. Curtain 10 can include at least one of vinyl, plastic, polymer, carbon fiber, metal, wood, rubber, and so forth. In some embodiments, curtain 10 can be a rolling shower curtain, which vertically and/or diagonally rises and lowers by automatic or manual action, such as pushing and pulling, for example, via a remote control, whether wired or wireless. Curtain 10 rolls into a roll coupled to or a part of a shower rod 20/frame/shower wall. Curtain 10 can stay in any position indefinitely.

Curtain 10 can be coated with anti-bacterial and/or anti-mildew and/or anti-mold coatings. Curtain 10 can be hung over one side of tub/shower stall 30, enclosing tub/shower stall 30, surrounding tub/shower stall 30, or if tub/shower stall 30 has some open geometric shape, like U-shaped, then curtain 10 can cover the open space. Curtain 10 can work with rod 20, which can be straight rod or straight rod, such as a wavy rod, an arcuate rod, a bent rod, a zigzag rod, a telescoping rod, a hingedly foldable rod, and so forth. Rod 20 can have a smooth surface, a rough surface, a rugged surface, and so forth.

Figure 2:
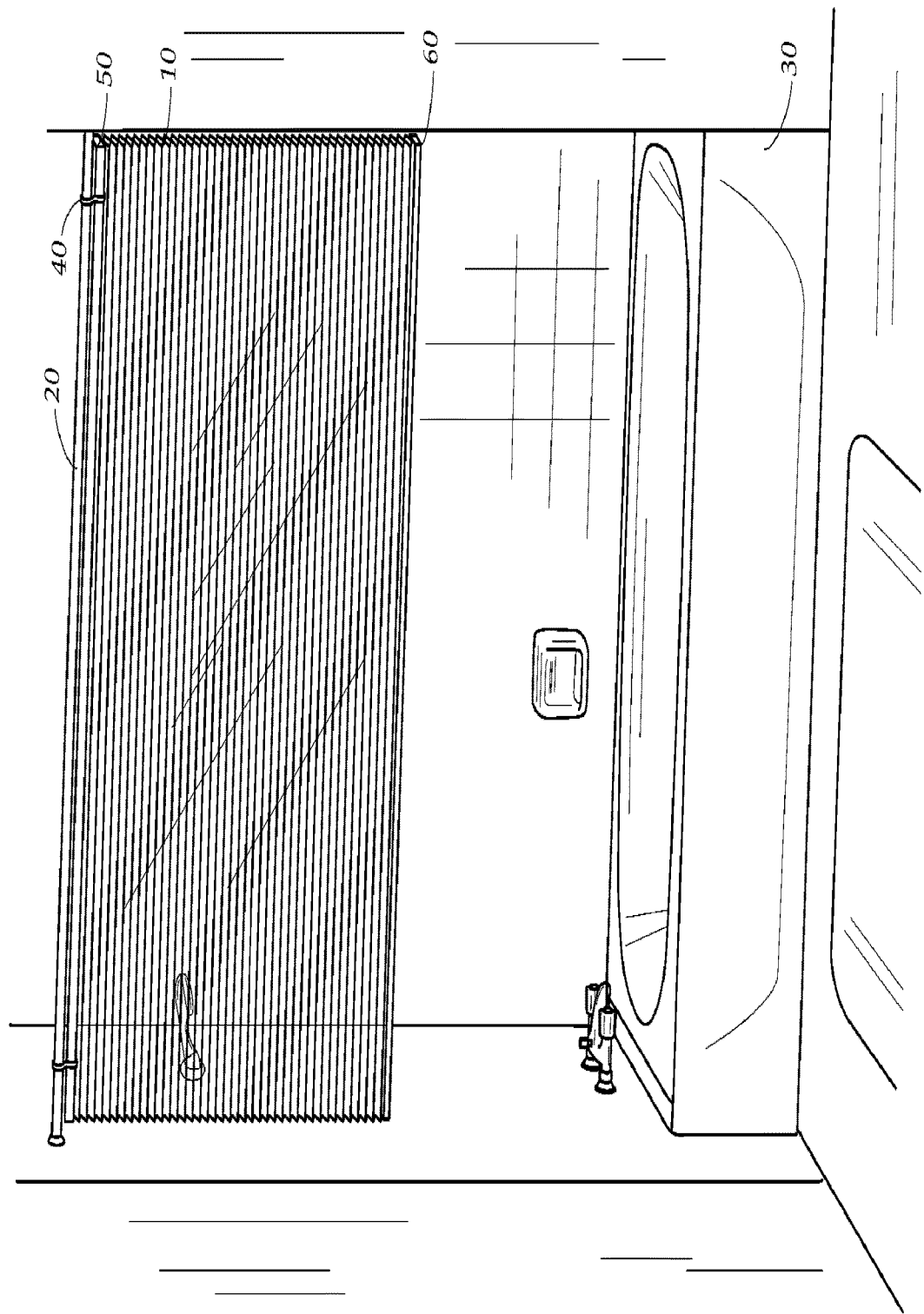
FIG. 2 shows an example embodiment of a shower curtain in semi-expanded state according to the present disclosure.

FIG. 2 shows an example embodiment of a shower curtain in a semi-expanded state according to the present disclosure. Curtain 10 has a row of cells 70. In the semi-expanded state, some of cells 70 collapse onto each other into a stack. When viewed from a rear of curtain 10, external to tub/shower stall 30, the stack may have an appearance similar to stacked slats of a Venetian blind. Note that at least one of cells 70 can extend substantially horizontally and/or substantially diagonally.

To reach the semi-expanded state from the expanded state, i.e., to raise curtain 10, curtain 10 is pushed upward via bar 60 or the bottom cell/pleat. Such pushing can be manual and/or automatic. Pushing upward, such as via applying a force in a direction to rod 20, effectively causes cells 70 to collapse and fold. Resultantly, cells 70 upwardly collapse against each other into the stack. When the force is removed, curtain 10 can remain in the semi-expanded state indefinitely. Note that the semi-expanded state can be along any point along a vertical axis between rod 20 and tub/shower stall 30. In some example embodiments, whether alternatively or additionally to bar 60 remaining in place, bar 60 can move slightly, such as having a slight displacement for a short period of time before remaining in place. Also, even if the force is not completely removed, but a slight force remains, such as for example, above a certain threshold, bar 60 can remain in place. Note that in some example embodiments, curtain 10 can have a lower end, such as bar 60, and an upper end, such as bar 50. Alternatively or additionally, the lower end can be a lower cell/pleat of curtain 10 and the upper end can be an upper cell/pleat of curtain 10.

To reach the semi-expanded state from a retracted state, such as to lower curtain 10, curtain 10 is pulled downward via bar 60 or the bottom cell/pleat. Pulling downward causes cells 70 to unfold and expand. In some embodiments, the shower curtain 10 is raised or lowered via manual action of a user. In an alternative embodiment, the shower curtain 10 is raised or lowered automatically via a suitable control system. In some embodiments, curtain 10 can be raised or lowered by pressing a button, or operating a switch, or a touchscreen display, or pulling a lever, located on curtain 10 and/or with simultaneously manually raising or lowering curtain 10. In another alternative embodiment, the curtain can be raised or lowered through a voice command which is input into an input unit situated on shower curtain 10. For example, if a user says "up" then shower curtain 10 moves upward, and if the user says "down" then shower curtain 10 moves down. In some embodiments, when bar 60 or the bottom/cell pleat are adjacent to and/or in contact with tub/shower stall 30, a downward force can be applied to bar 50 toward bar 60 such that bar 50 forces cells 70 to collapse and fold. Resultantly, cell 70 downwardly collapse against each other into the stack. Note that such action can bring curtain 10 into any semi-expanded state or fully expanded state. Also, note that such force application can allow for entire bar 50 or part of bar 50 to move downward. In some embodiments, bar 60 can be lifted upward toward bar 20 from one side end such that another side end remains in its current position. When the one end is let go, then the one end can remain in its new position such that bar 60 is diagonally inclined between the one end and the other end. Therefore, at least one of cells 70, adjacent to the one end, is partially collapsed onto adjacent cell 70. In some embodiments, bar 50 can be pulled down away from rod 20 such that the line/cord becomes visible and bar 50 moves toward bar 60. Therefore, an opening can be created between bar 50 and rod 20, such as for air exhaust. Note that bar 50 can be pulled down on one side end such that bar 50 is inclined diagonally between the one end and another end of bar 50, which remains in its current position. Note that cells 70 adjacent to bar 50 at least partially collapse onto each other on the one end. In addition, bar 50 can be pulled down such that bar 50 lengthwise moves downward away from rod 20 to bar 60.

Figure 3:
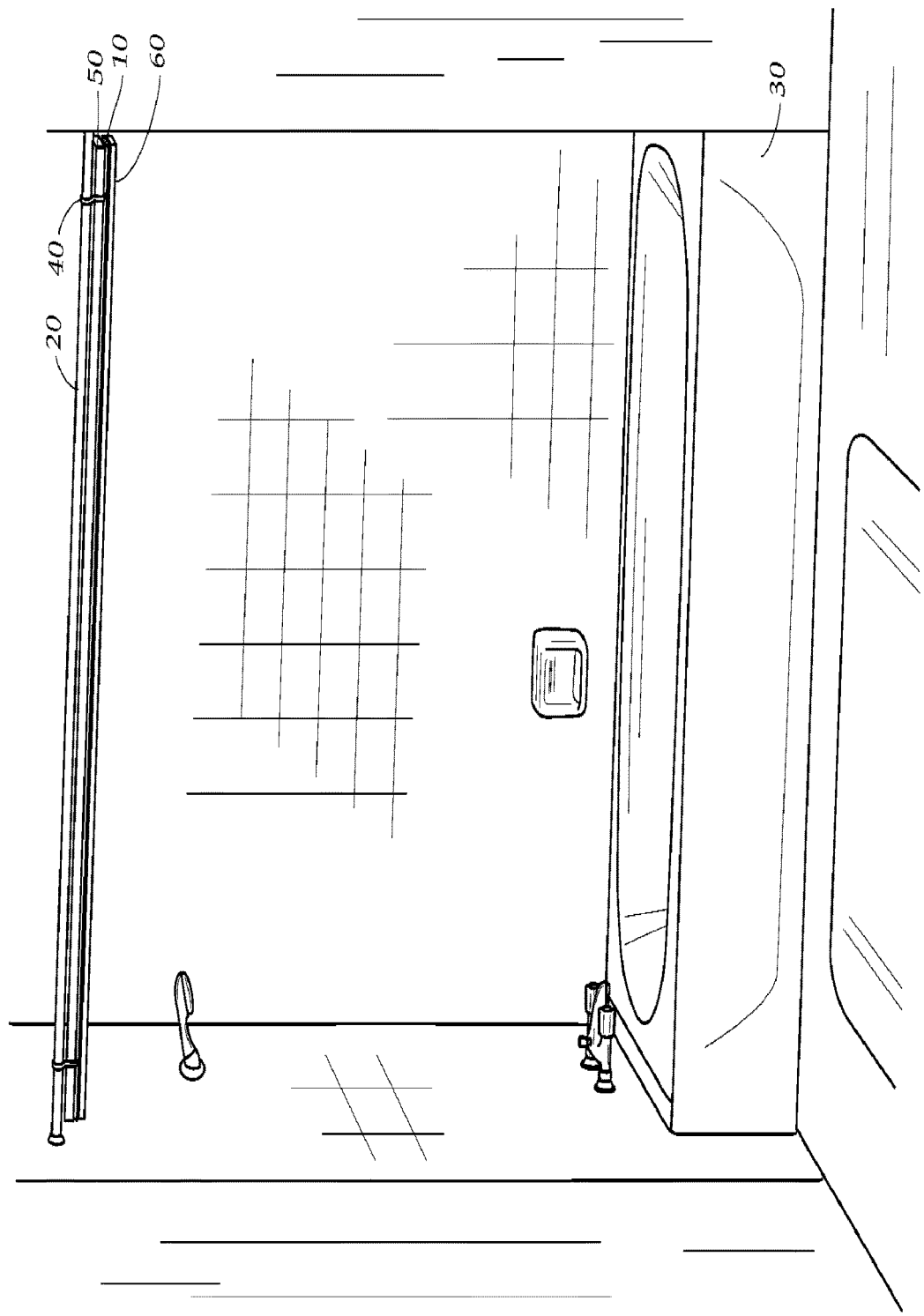
FIG. 3 shows an example embodiment of a shower curtain in a fully retracted state according to the present disclosure.

FIG. 3 shows an example embodiment of a shower curtain 10 in a fully retracted state according to the present disclosure. To reach the fully retracted state from the expanded state or from the semi-expanded state, curtain 10 is pushed upward from bar 60 or from the bottom cell/pleat. Pushing upward, such as via applying a force in the direction of rod 20, causes cells 70 to fold and adjacent cells 70 to collapse against each other into the stack. In the fully retracted state, all cells 70 are collapsed together into the stack such as where bar 60 or the bottom cell/pleat has been pushed upward until curtain 10 reaches bar 50 and/or, in some embodiments, rod 20. While FIGS. 1-3 show three different positions of curtain 10, any position between the fully retracted state and the fully expanded state is possible. To raise curtain 10 to a specific position, curtain 10 can be pushed upward until a desired position is reached. To lower curtain 10 to a desired position, curtain 20 can be pulled downward until the desired position is reached. Alternatively, curtain 10 can be raised or lowered automatically via remote control.

Figure 4B:
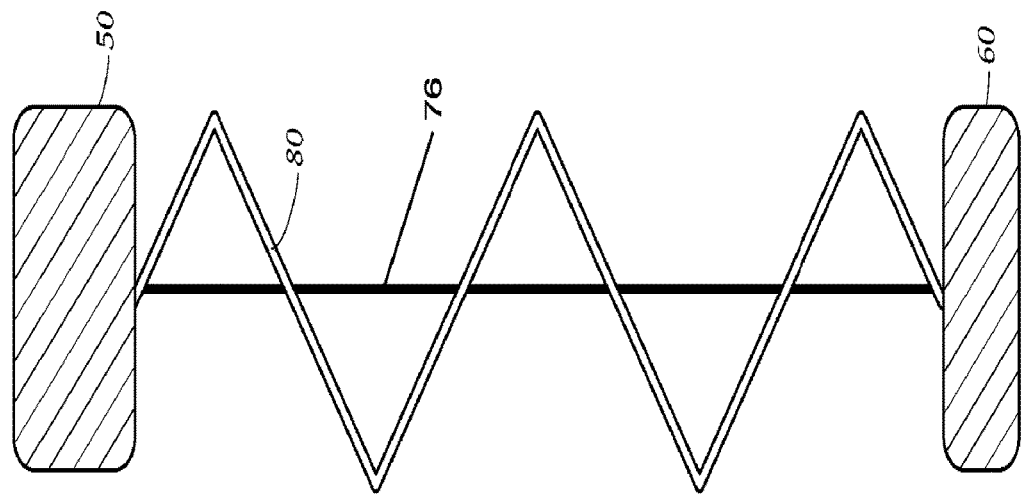
FIG. 4B shows a side view of an example embodiment of a pleated shower curtain according to the present disclosure.
Figure 4A:
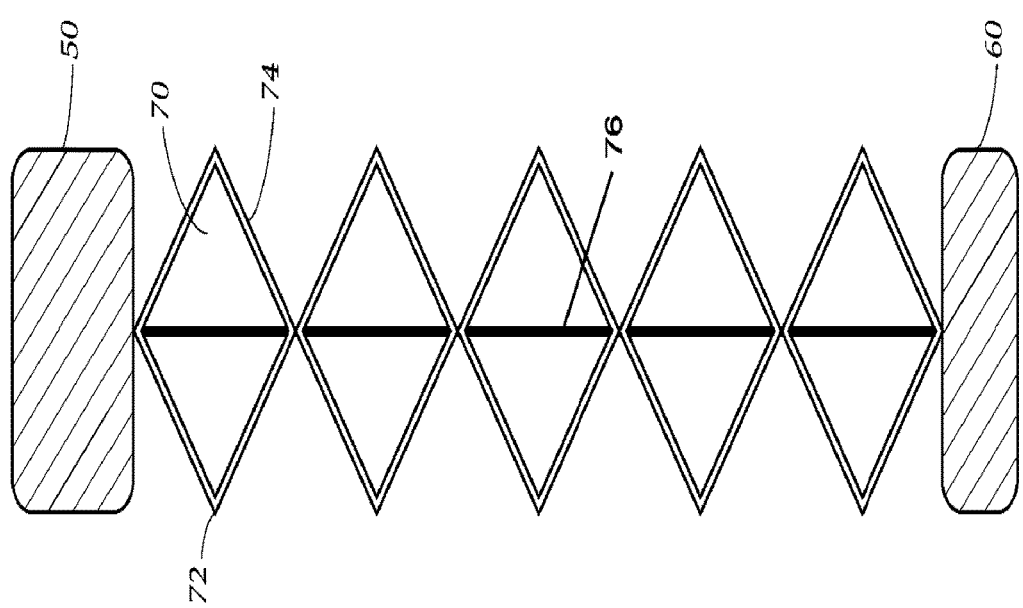
FIG. 4A shows a side view of an example embodiment of a cellular shower curtain according to the present disclosure.

FIG. 4A shows a side view cross section of an example embodiment of a cellular shower curtain according to the present disclosure. Curtain 10 can include a plurality of horizontally extending elements, such as cells 70, having a cellular structure. Each of cells 70 extends across a width of curtain 10 and in parallel relationship to other cells 70 of curtain 10. Each of cells 70 includes a front surface 72 and a rear surface 74. Front surface 72 of each of cells 70 faces bathtub/shower stall 30, while rear surface 74 of each of cells 70 faces away from bathtub/shower stall 30, such as into an interior of the shower room. Note that cells 70 have at least one cord/line 76 extending therethrough. Such cord/line 76 can be visible or invisible to nearby bystanders. Such cord/line 76 can include at least one of cotton, silk, plastic, carbon fiber, and so forth. The cord/line 76 can facilitate upward and/or downward movement of curtain 10 via facilitating collapse and/or expansion of cells 70. Such cord/line 76 can also include a wire for conducting current, as described herein. Note that when more than one cord/line 76 is used, then such plurality of cords/lines 76 can operate dependent or independent of each other.

While FIG. 4A shows rows of cells 70 having a parallelogram shape, such as a diamond shape, cells 70 of any suitably appropriate shape can be used, such as triangular, square, semicircular, rectangular, elliptical, pentagonal, hexagonal, and so forth. In some embodiments, cells 70 having a hexagonal configuration are used. Such hexagonally shaped cells are commonly referred to as honeycomb cells. In some embodiments, curtain 10 can include differently shaped cells 70, such as at least one cell has a hexagonal shape and at least one cell has a diamond shape. In an example embodiment of the present disclosure, instead of a single cell structure 70 as shown in FIG. 4A, curtain 10 can have a double or triple cellular structure where cells 70 where each row can have at least two cells 70, whether diagonal, vertical and/or horizontal to each other.

Cells 70 can trap hot and cold air for maximum energy efficiency and sound reduction. Cells 70 can be hollow, void, gas filled, and/or solid. At least one of cells 70 can be closed from at least one open end to prevent side water entry. The cells 70 can be formed of a flexible material such as plastic, vinyl, paper, cloth, foam, and other shower curtain relevant materials. However, other materials are possible according to alternative example embodiments. In some embodiments, curtain 10 can provide a plurality of distinct sets of cells 70. For example, an upper set 70 can comprise a first transparency and a lower set can comprise a second transparency, with the first transparency being distinct from the second transparency. For example, a caretaker can switch between the upper set and the lower set depending on who is showering, such as a young child or elderly. Note that other optical properties, such as translucency or opaqueness, or non-optical properties can also be used. For example, a shower partition can include a material that switches between a first optical state and a second optical state based on an application of an electrical energy to the material. In some embodiments, curtain 10 can be manufactured via spraying a cellular window blind with a hydrophobic spray and installed via suspending from rod 20.

FIG. 4B shows a side view of an example embodiment of a pleated shower curtain according to the present disclosure. Curtain 10 includes a plurality of pleats 80. As with the cellular configuration, pleated curtain 10 can be pushed upward from bar 60 attached to curtain 10 or from one of pleats 80, such as a bottom pleat. Pushing upward, such as via applying a force in a direction of rod 20, causes pleats 80 to fold against each other into a stack, such as in a Z-manner. To lower curtain 10, curtain 10 can be pulled downward from bar 60 or from one of pleats 80. Pulling downward causes pleats 80 to unfold. Note that at least one of pleats 80 can extend substantially horizontally and/or substantially diagonally.

Note that pleats 80 have at least one cord/line 76 extending therethrough. Such cord/line 76 can be visible or invisible to nearby bystanders. Such cord/line 76 can include at least one of cotton, silk, plastic, carbon fiber, and so forth. The cord/line 76 can facilitate upward and/or downward movement of curtain 10 via facilitating folding and/or unfolding of pleats 80. Such cord/line 76 can also include a wire for conducting current, as described herein. Note that when more than one cord/line 76 is used, then such plurality of cords/lines 76 can operate dependent or independent of each other.

Note that curtain 10 with pleats 80 can operate similarly to curtain with cells 70, such as for retraction and/or expansion. For example, to reach the semi-expanded state from the expanded state, such as to raise curtain 10, curtain 10 is pushed upward via bar 60 toward rod 20. Such pushing can be manual and/or automatic. Pushing upward, such as via applying a force in a direction to rod 20, effectively causes pleats 80 to fold onto each other. Resultantly, pleats 80 upwardly fold into the stack. When the force is removed, curtain 10 can remain in the semi-expanded state indefinitely. Note that the semi-expanded state can be along any point along a vertical axis between rod 20 and tub/shower stall 30.

In some embodiments, when bar 60 or the bottom/cell pleat are adjacent to and/or in contact with tub/shower stall 30, a downward force can be applied to bar 50 toward bar 60 such that bar 50 forces pleats 80 to fold. Resultantly, pleats 80 downwardly fold into the stack. Note that such action can bring curtain 10 into any semi-expanded state or fully expanded state. Also, note that such force application can allow for entire bar 50 or part of bar 50 to move downward. In some embodiments, bar 60 can be lifted upward toward bar 20 from one end such that another end remains in its current position. When the one end is let go, then the one end can remain in its new position such that bar 60 is diagonally inclined between the one end and the other end. Therefore, at least one of pleats 80 can be partially folded. In some embodiments, bar 60 can be lifted upward toward bar 20 from one side end such that another side end remains in its current position. When the one end is let go, then the one end can remain in its new position such that bar 60 is diagonally inclined between the one end and the other end. Therefore, at least one of pleats 80, adjacent to the one end, is partially folded onto adjacent pleat 80. In some embodiments, bar 50 can be pulled down away from rod 20 such that the line/cord becomes visible and bar 50 moves toward bar 60. Therefore, an opening can be created between bar 50 and rod 20, such as for air exhaust. Note that bar 50 can be pulled down on one side end such that bar 50 is inclined diagonally between the one end and another end of bar 50, which remains in its current position. Note that pleats 80 adjacent to bar 50 at least partially fold onto each other on the one end. In addition, bar 50 can be pulled down such that bar 50 lengthwise moves downward away from rod 20 to bar 60. In some embodiments, cellular curtain 10 and pleated curtain 10 can be manufactured from similar materials for similar appearance. Cellular curtain 10 and pleated curtain 10 can function and operate similarly. Cellular curtain 10 and pleated curtain 10 can each have a single lit cord, but both can be made cordless or with as top-down bottom-up curtains. Cellular curtain 10 and pleated curtain 10 can be translucent or include room darkening fabrics for either light control or light filtration. Cellular curtain 10 and pleated curtain 10 can have different size pleats.

Cellular curtain 10 can be honeycomb shaped due to a honeycomb design when looking at cells 70 from a side. Cellular curtain 10 and pleated curtain 10 can even be hung to function as shades on windows. Cellular curtain 10 can provide insulation to help with sound as well as energy. Cellular curtain 10 can have a small stack height as cells 70 can compress tightly when raised for minimal visual blockage. Cellular curtain 10 can include a wide range of colors due to its manufacturing material.

Pleated curtain 10 look like honeycomb cellular curtain 10 frontally. Pleated curtain 10 can have a small stack height as pleats 80 can compress tightly when raised for minimal visual blockage. Pleated curtain 10 can include a wide range of colors due to its manufacturing material.

FIG. 5A shows a side view of an example embodiment of a cellular shower curtain having a plurality of liquid channels according to the present disclosure. Curtain 10 has at least one channel 90. At least one of cells 70 has a front surface 72, which faces the user during showering. Channel 90 is positioned on front surface 72. Channel 90 can be integral with, or connected to, a respective side or corner of one of cells 70, such as a front side or a front corner.

Channel 90 can be integral to curtain 10, such as unitary, or can be added to curtain 10. Channel 90 can extend horizontally and continuously from one end of curtain 10 to a second end of the curtain 10, or can extend only a partial way. Channel 90 can extend linearly, inclined, wavy, zigzag, and so forth. Channel 90 can be perforated such that the water flowing through falls out of channel 90, such as onto another channel 90 or into tub/shower stall 30. Such fall through can create a cascading effect and/or waterfall effect if multiple instances of channel 90 allow for perforations. A converging effect can be created if multiple channels 90 converge, such as via inclining, into a single point receiving the water from such channels.

Channel 90 face the user showering. Channel 90 function to direct the water, resulting from a showering process, into tub/shower stall 30. Thus, during the showering process and/or when curtain 10 is raised, the water flows into tub/shower stall 30 instead of splashing and/or spilling onto the user, a floor of the shower room, and/or all around the shower room. Channel 90 can extend according to any geometric shape, such as linear, square, rectangle, trapezoid, circle, hexagon, pentagon, triangle, oval, and others, and/or pattern, such as lattice, wavy, and others.

Channel 90 is arranged such that each of cells 70 contains at least one channel 90 spaced apart from, and parallel to, an adjacent channel 90 of an adjacent cell 70. In an alternative embodiment, each of cells 70 can contain more than one channel 90, and/or can be arranged nearly parallel to, and/or perpendicular to, or non-coaxial with the other channels 90 such that different channels 90 are arranged side by side in the longitudinal direction. Channel 90 can include a bottom section 92 and a front section 94. Section 94 extends generally upwardly in a curved or linear manner from section 92. Channel 90 is designed to contain an amount of water falling from a showerhead, such as a drop, mist, and so forth. Channel 90 guides, transports, and/or discharges the water at an end portion of channel 90, which transfers the water to a lip 96 or at predetermined spaces along channel 90 that have at least one opening for discharging the liquid. Lip 96 directs the water into tub/shower stall 30. Lip 96 extends from bottom bar 60 or the bottom pleat/cell. However, note that lip 96 can extend from other areas of curtain 10. Lip 96 can extend away from the curtain 10 or inward. Curtain 10 can have more than one lip 96. Lip 96 can include a hydroelectric generator/turbine and/or a thermoelectric generator/turbine, as discussed herein, to generate electric current via the water, whether hot, warm, or cold, flowing through lip 96. The generator/turbine can be coupled to circuitry for conducting electric current to a current input, such as a light source, and/or an electrically powered device coupled to or part of curtain 10. Note that in other example embodiments, lip 96 can be U-shaped, J-shaped, L-shaped, Z-shaped, V-shaped, S-shaped, P-shaped, I-shaped, Y-shaped, E-shaped, W-shaped, and so forth. Also, note that lip 96 can be perforated so that the water exits via the perforations.

FIG. 5B shows a side view of an example embodiment of a plurality of liquid drops forming on a channel of a cellular shower curtain according to the present disclosure. A plurality of liquid drops 100 falling from the showerhead drops into at least one channel 90 and either gravity pulls drops 100 to flow downward along channel 90 or additional liquid falling on top of, or adjacent to, drops 100 forces drops 100 to flow down channel 90.

Figure 6:
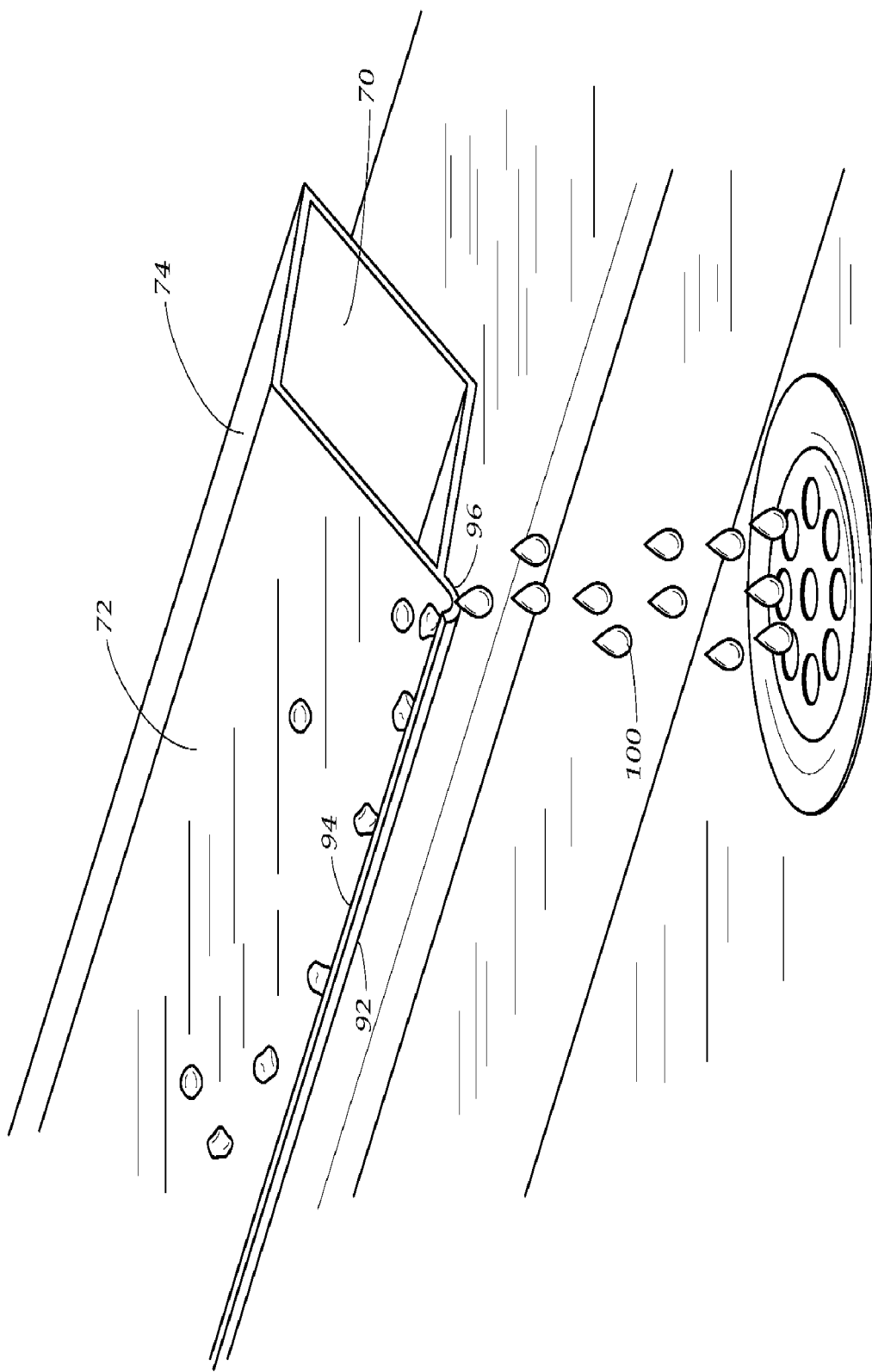
FIG. 6 shows an example embodiment of a liquid exiting a channel of a cellular shower curtain according to the present disclosure.

FIG. 6 shows an example embodiment of liquid drops exiting a channel of a cellular shower curtain according to the present disclosure. Drops 100 flowing via channel 90 exits at an end portion of channel 90, such as lip 96. In an alternative embodiment, drops 100 flowing via channel 90 exit at other predetermined locations along channel 9, such as through openings formed along channel 90. Note that lip 96 can be positioned at least one end of curtain 10, both ends of curtain 10, between ends of curtain 10, and so forth.

Figure 7A:
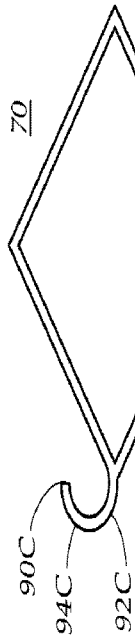
FIG. 7A shows an example embodiment of a J-shaped channel according to the present disclosure.

FIG. 7A shows an example embodiment of a J-shaped channel according to the present disclosure. A J-shaped channel 90A includes a bottom section 92A and a front section 94A. Section 92A has an inner end extending from section 94A. Section 94A extends in a bent manner from section 92A to form an outermost side of channel 90A. A wall of a cell 70 extends from another end of section 92A. For example, a distance from a top of section 94A until a point formed on cell 70 at a same height can be approximately between about 0.5 inches to about 1 inch, but can also have a higher height, such as from 1 inch to 3 inches or some other measurements. Drops 100 collect in channel 90A. Some of drops 100 fall onto section 92A, while other drops 100 enter channel 90A in another way, such as after hitting cell 70 and then flowing within channel 90A. Drops 100 collected in channel 90A flow in channel 90A due to gravity and/or additional water pushing against drops 100 until exiting at an end of channel 90A.

Figure 7C:
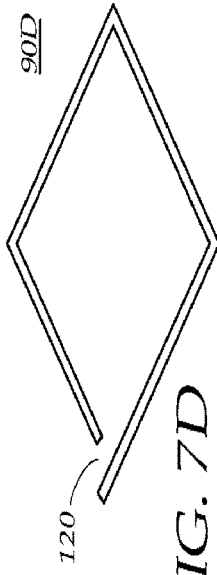
FIG. 7C shows an example embodiment of a U-shaped channel according to the present disclosure.
Figure 7B:
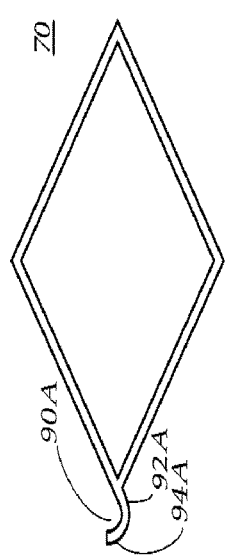
FIG. 7B shows an example embodiment of an O-shaped channel according to the present disclosure.

FIG. 7B shows an example embodiment of an O-shaped channel according to the present disclosure. An O-shaped channel 90B is oriented outwardly from a respective side and/or end of cell 70, and at least partially extends along a length of cell 70. Channel 90B can be formed integrally with cell 70, such as unitary. As with other shaped channels, as described herein, channel 90B can be spaced apart from adjacent channels 90B in a parallel or diagonal manner. For example, a diameter of the channel 90B is approximately between about 0.5 inches and about 1 inch, but can be lower or higher as well, such as 1 inch to 4 inches. Channel 90B can include a port, such as an input port and/or an output port, along a top portion and/or a bottom portion of channel 90B through which some of drops 100 enter and/or exit.

FIG. 7C shows an example embodiment of a U-shaped channel according to the present disclosure. A U-shaped channel 90C includes a bottom section 92C and a front section 94C. Channel 90C is similar in configuration to channel 90A, but has a longer and curvier front section 94C. Section 92C has an inner end extending to front section 94C. Section 94C extends in a bent manner from section 92C to form an outermost surface of channel 90C. An inner wall of cell 70 is fixed to another end of section 92C.

Liquid drops 100 collect in channel 90C. Some of drops 100 fall onto bottom section 92C, while other drops 100 can enter channel 90C in another way, such as after hitting cell 70 and then flowing within channel 90C. Drops 100 collected in channel 90A flow in said channel 90C due to gravity and/or additional water pushing against drops 100 until exiting at an end of channel 90C.

Figure 7D:
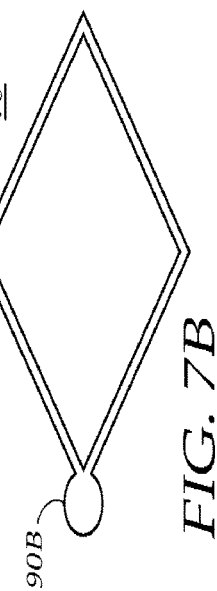
FIG. 7D shows an example embodiment of an open cell channel according to the present disclosure.

FIG. 7D shows an example embodiment of an open cell channel according to the present disclosure. An open cell channel 90D allows liquid drops 100 to flow into cell 70 itself via an opening 120 along a surface of cell 70. Liquid drops 100 collected in channel cell 70 exit at an open-end portion of cell 70. In an alternative embodiment, liquid drops 100 collected in cell 70 exit at other predetermined locations along cell 70 through openings formed along cell 70, which exit to tub/shower stall 30. Further, lip 96 can be coupled to the open end of cell 70 or to at least one of the openings. In an alternative embodiment, different shaped channels are used on different cellular rows, and/or even within one row.

Figure 8A:
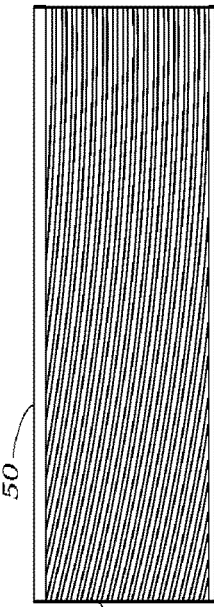
FIG. 8A shows an example embodiment of a linear channel path according to the present disclosure.

FIG. 8A shows an example embodiment of a linear channel path according to the present disclosure. A channel path 130A of each cell 70 is substantially horizontal and arranged to be parallel with each other and with respect to a longitudinal axis of shower curtain 10. Each channel path 130A is at least partially continuous along the longitudinal axis of the shower curtain 10. Water flows in steady rectilinear motion along path 130A.

Figure 8C:
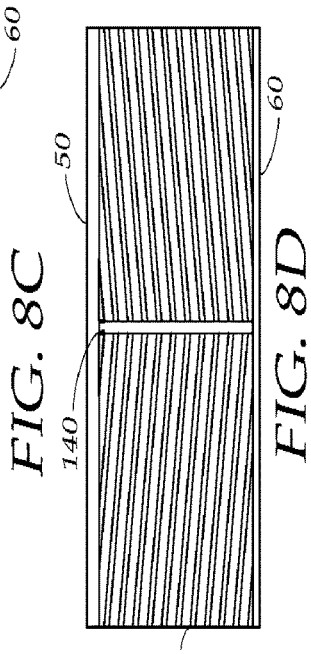
FIG. 8C shows an example embodiment of a curved channel path according to the present disclosure.
Figure 8B:
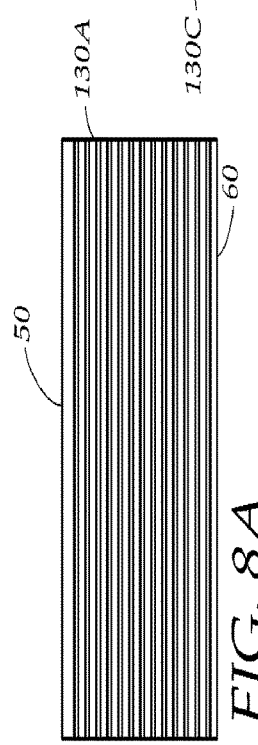
FIG. 8B shows an example embodiment of an inclined channel path according to the present disclosure.

FIG. 8B shows an example embodiment of an inclined channel path according to the present disclosure. A channel path 130B is inclined with respect to the longitudinal axis of shower curtain 10 at an angle between about 1 degree and about 90 degrees, such as between about 5 degrees and about 45 degrees. Each channel path 130B is at least partially continuous along the longitudinal axis.

FIG. 8C shows an example embodiment of a curved channel path according to the present disclosure. A channel path 130C is curved with respect to the longitudinal axis of shower curtain 10. Each channel 130C can have an identical curved shape and/or different curved shapes. Such curvature can be sharp or curved. Such curved paths enable the water to flow in a non-linear motion from a higher end to a lower end along a respective channel path 130C.

Figure 8D:
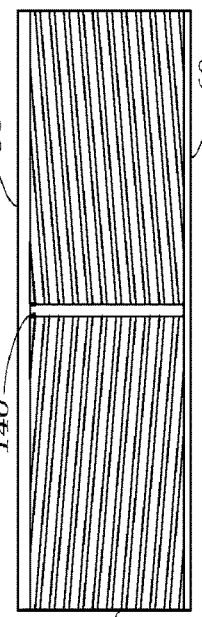
FIG. 8D shows an example embodiment of a converging channel path according to the present disclosure.

FIG. 8D shows an example embodiment of a converging channel path according to the present disclosure. At least one channel path 130D converges into a single secondary channel 140 at a center portion of the shower curtain 10. Channel 140 is oriented vertically. However, in other embodiments, secondary channel 140 can be oriented in other directions. Further, channel 140 can be in other, non-center portions, of curtain 10, such as off-center, adjacent to an open end of curtain 10, and so forth. If a generator/turbine, as described herein, is downstream from path 140, then a synergistic water flow effect can be created to enhance power generation of the generator/turbine.

Figure 9A:
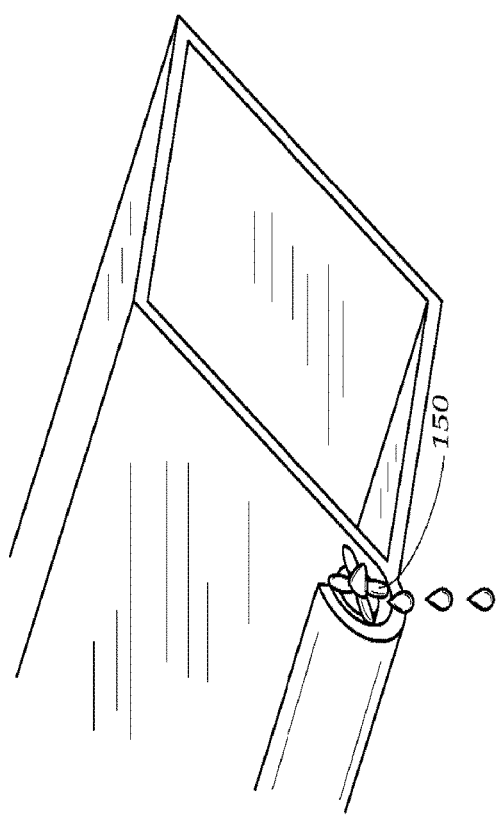
FIG. 9A shows an example embodiment of a channel having a turbine downstream according to the present disclosure.

FIG. 9A shows an example embodiment of a channel having a turbine downstream according to the present disclosure. A generator/turbine 150 is positioned at an open end of channel 90. Curtain 10 can include waterproof wiring/circuitry for conducting electric current. At least one of channel 90 can include at least one of generator/turbine 150, such as a hydroelectric generator/turbine, a thermoelectric generator/turbine, and so forth, to generate electric current via water, whether hot, warm, or cold, flowing through channel 90. Generator/turbine 150 are coupled to the circuitry for conducting electric current to a current input, such as a light source, and/or an electrically powered device coupled to and/or part of curtain 10, whether temporary and/or permanently, such as a mobile phone.

Generator/turbine 150 can be a hydroelectric turbine, which produces electricity via water flow within channel 90. FIG. 9A shows one simplified form of generator/turbine 150 suitable for use with the present disclosure. Generator/turbine 150 includes a rotor, such as a plurality of blades attached to a shaft, coupled to internal machinery/circuitry housed within generator/turbine 150. When the rotor rotates based on water flow exiting channel 90, the shaft rotates and the machinery/circuitry perform power generation. However, other types of turbines, and other numbers of rotors, suitable for producing electricity are within the scope of the present disclosure. As shown, water moving downstream turns the rotor, which spins to produce electricity. Generator/turbine 150 is mounted at the open end of channel 90 in a downstream direction and is rotatable within channel 90 or outside of channel 90.

Figure 9B:
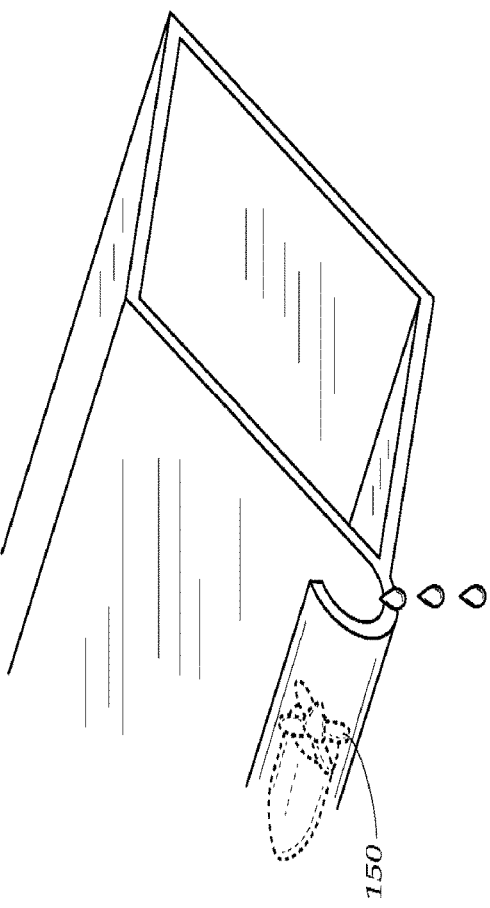
FIG. 9B shows an example embodiment of a channel having a turbine within a channel according to the present disclosure.

FIG. 9B shows an example embodiment of channel 90 having a turbine within a channel according to the present disclosure. Generator/turbine 150 is mounted within channel 90 and operates according to identical or similar principles discussed above regarding FIG. 9A. However, when generator/turbine 150 is mounted within channel 90, water flowing in a unidirectional or bidirectional manner can rotate the rotor, which aids in electricity production.

FIG. 10A shows an example embodiment of a shower curtain having a plurality of light sources. A plurality of light sources 160 can include at least one light emitting diode (LED), a fluorescent bulb, a halogen bulb, and/or an incandescent bulb, or any other suitable light source, including a blacklight or a phosphorescence coating/material. Sources 160 receive power from generator/turbine 150 or from another power source, such as a battery. In some embodiments, a single light source 160 is used, which can output light based on at least one light technology, such as LED, LED and fluorescent bulb, and so forth. For example, the blacklight, such as a ultraviolet (UV)-A light source, may emit ultraviolet light, such as to observe fluorescence, and can include a violet filter, such as on a bulb or in a separate in a lamp housing which allows through UV light such that the lamp has a dim violet glow when in operation. For example, the blacklight can output UV light but lacks the violet filter and such blue color may be output. For example, the blacklight may be fluorescent, mercury-vapor based, LED, laser, or incandescent.

Light sources 160 can be secured to curtain 10 or to rod 20 via rear suction cups, gluing, drilling, screwing, clamping, welding, bolting, molding, adhering, magnetically attracting, fastening, or any other suitable securing method. For example, light sources 160 can be glued to bar 50 of curtain 10 as shown, or to any other portion of shower curtain 10, and a tube/pipe connecting at least one channel 90 to light source 160 can be provided. Sources 160 can be output light of identical color, different colors, and/or any combination thereof. Sources 160 can include and/or be coupled to and/or contain a plurality of thermometers configured for measuring water temperature. Sources 160 can vary in light color based on such temperature. For example, sources 160, which output blue light, can output blue light when the water is cold based on certain threshold, and sources 160, which output red light, can output red light when the water hot based on certain threshold. Note that a single source 160 can output light of a single color, and/or a plurality of colors, whether concurrently or sequentially. Also, note that thermometers can also be configured to measure ambient air temperature, whether alternatively or additionally to the water temperature. Resultantly, sources 160 can output colored light based on the air temperature only, the water temperature only, an average of the air temperature and the water temperature, and so forth.

FIG. 10B shows an example embodiment of a shower curtain having a plurality of air fresheners according to the present disclosure. Curtain 10 can be coupled to and/or include an air freshener/aroma emitter 170 to provide pleasant smells during the showering process. Freshener/emitter 170 can include a logo, an advertisement, and/or instruction printed on an outer surface of freshener/emitter 170. Freshener/emitter 170 can be releasable yet secured to shower curtain 10 or bar 50 or bat 60 or to shower rod 20 via rear suction cups, gluing, drilling, screwing, clamping, welding, bolting, molding, fastening, adhering, magnetically attracting, and/or any other suitable securing method. In an alternative embodiment, freshener/emitter 170 are placed in a holder/pocket attached to shower curtain 10. Note that a single freshener/emitter 170 can be used as well. Further, note that freshener/emitter 170 can output at least one smell.

FIG. 11A shows an example embodiment of a shower curtain coupled to an elliptical-shaped shower rod according to the present disclosure. A rod 20A is elliptical, such as circular. However, rod 20A can be oval. Note that ring 40, or any other type of the shower curtain coupler, encloses rod 20A at one point. Note that ring 40 is snug with rod 20A. Ring 40 are coupled to bar 50 via a tab extending toward rod 20A from bar 50. The tab can include a through-hole for inserting ring 40 therethrough. Alternatively, ring 40 is defined via a pair of mating jaws coupled to, such as via a hinge, to the tab. Any number of rings 40 is possible, such as at least one. Note that rod 20A can have varying cross-sectional shape, such as circular on one end and oval on another. Other cross-sectional shapes are possible, such as a polygon.

FIG. 11B shows an example embodiment of a shower curtain 10 coupled to a polygonal-shaped shower rod according to the present disclosure. A rod 20A is polygonal, such as hexagonal. Note that any type of polygon can be used, such as a triangle, a square, a rectangle, a pentagon, an octagon, and so forth. Note that ring 40 is not snug with rod 20B, although ring 40 can be configured for snug relationship. Note that rod 20B can have varying cross-sectional shape, such as polygonal on one end and elliptical on another. Other cross-sectional shapes are possible, such as a flower.

FIG. 11C shows an example embodiment of a shower curtain 10 coupled to a flower-shaped shower rod according to the present disclosure. A rod 20C is flower-shaped and has a plurality of petals extending from a common center. Any number of petals of any shape can extend from the common center, whether in an identical manner or a different manner. Note that ring 40 is not snug with rod 20C, although ring 40 can be configured for snug relationship.

FIG. 12A shows an example embodiment of a shower curtain fastened to a shower rod according to the present disclosure. A ring 40A is defined via a strap having a first end and a second end. The strap has a hook-and-loop fastener thereon with the hook on the first end and the loop on the second end. The hook and the loop fasten to each other via overlapping. Note that other fastening mechanism can be used, such as a magnet, a male-female engager, a snap, a button, a zipper, and so forth.

FIG. 12B shows an example embodiment of a shower curtain coupled to a rail shower rod according to the present disclosure. Rod 20A includes a rail configured to receive the tab 40B extending from bar 50. The rail can be rectilinear, wavy, and so forth. The rail can be configured to allow for fixed coupling such that bar 50 remains substantially fixed in place or the rail can be configured to allow such that bar 50 can move along the rail, such as via sliding.

FIG. 12C shows an example embodiment of a shower curtain coupled to a shower rod via a shower curtain ring according to the present disclosure. A ring 40C has a first end with a first coupling mechanism and a second end with a second coupling mechanism. The first mechanism and the second mechanism couple to each other, such as via mating, locking, magnetically attracting, adhering, male-female connecting, and so forth. The first mechanism and the second mechanism avoid overlapping each other, although in other embodiments, such overlapping is possible as well.

FIG. 12D shows an example embodiment of a shower curtain coupled to a ceiling according to the present disclosure. Bar 50 is coupled to a ceiling of the shower room and/or of tub/shower stall 30 via a fastener 40D, such as a screw. Note that any type of coupling, gluing, drilling, screwing, clamping, welding, bolting, molding, adhering, magnetically attracting, fastening, or any other suitable securing method. Note that in some embodiments, the ceiling can include a railing for curtain 10. Also, note that some users can use at least two shower curtains: one that is inside the tub, which is mainly functional or decorative as well, and an outer shower curtain, which is purely decorative. The inner curtain can include magnets for coupling to tub/shower stall 30. Further, note that curtain 10 can be used in a shower door, whether additionally or alternatively to glass in the door.

Figure 13:
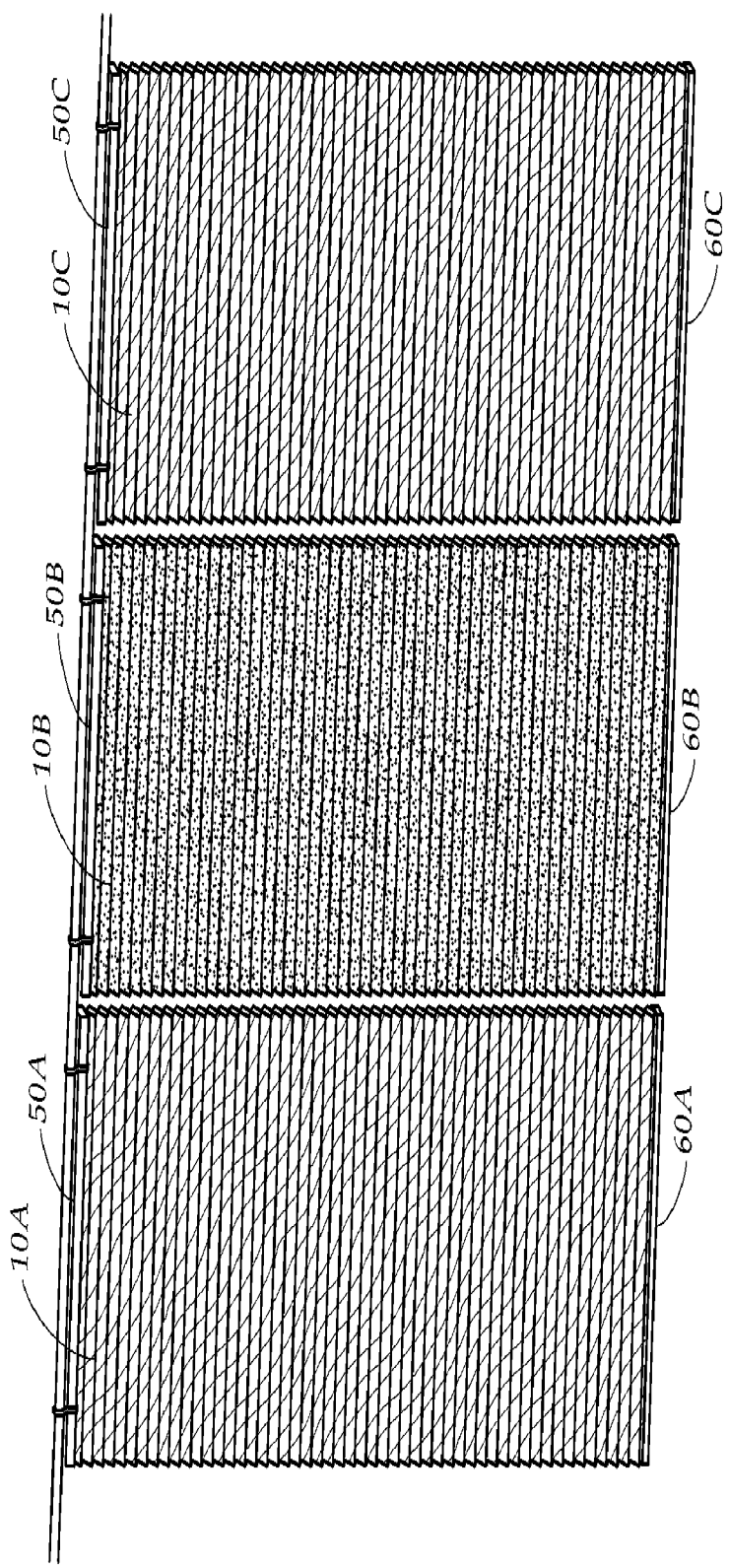
FIG. 13 shows an example embodiment of a plurality of shower curtains arranged along a shower rod according to the present disclosure.

FIG. 13 shows an example embodiment of a plurality of shower curtains arranged along a shower rod according to the present disclosure. A plurality of curtains 10A, 10B, and 10C are sequentially suspended from rod 20 along rod 20 in a line via a plurality of top bars 50A, 50B, and 50C, respectively. Note that curtains 10A, 10B, and 10C have a plurality of bottom bars 60A, 60B, and 60C.

Curtains 10A, 10B, and 10C can also be coupled on shower rod 20 with other similar or dissimilar curtains such that multiple users can lower and/or raise different curtains, whether relatively concurrently or at different times. Also note that curtains 10A, 10B, and 10C can have similar or dissimilar lengths along tub/shower stall 30, and can be suspended from rod 20 immediately adjacent to each other such that curtains 10A, 10B, and 10C are sequentially arranged in a line spanning between exterior of tub/shower stall 30 and interior of tub/shower stall 30. Resultantly, curtains 10A, 10B, and 10C can at least partially overlap each other when curtains 10A, 10B, and 10C are in the expanded state simultaneously. For example, a parent can pull down curtain 10A, such as one having inspirational quotes depicted on any one or both sides of curtain 10A, whereas a child can pull down another curtain 10B, such as one having cartoon characters depicted on any one or both sides of curtain 10C. Alternatively, both curtains can be lowered and/or raised together.

As shown in FIG. 13, shower curtains 10A, 10B, and 10C are in the expanded state as arranged side-by-side and suspended from shower rod 20. Shower curtains 10A, 10B, and 10C can have overlapping edges to prevent water from passing therethrough. Shower curtains 10A, 10B, and 10C can be selectively connected together in a releasable manner by a clip and/or some other suitable structure. Each of shower curtains 10A, 10B, and 10C is independent of other curtains suspended from rod 20 such that any and/or all of curtains 10A, 10B, and 10C can be raised and/or lowered without movement of others. Each of shower curtains 10A, 10B, and 10C can include separate top bar 50A, 50B, and 50C and separate bottom bar 60A, 60B, and 60C, or two or more can have common top and bottom bars. While FIG. 13 shows three curtains 10, any numbers of curtains suitable for enclosing a shower is within the scope of the present disclosure.

FIG. 14A shows an example embodiment of a shower curtain coupled to a surface via a track according to the present disclosure. Bar 60 is coupled to tub/shower stall 30 via a track 180 configured to receive bar 60, which can function as a rail within track 180. Track 180 is coupled to tub/shower stall 30 or the floor of the shower room or another surface, such as a moveable object, like a chair. Note that bar 60 can travel within track 180, such as along track 180 when track 180 extends lengthwise along tub/shower stall 30. Alternatively, track 180 can be configured only to receive bar 60. Track 180 can be configured to lock onto bar 60 and/or bar 60 can be configured to lock onto track 180. Any type of tracked technology can be used. Note that track 180 can include magnets and/or other fastening technologies to enhance such coupling. Also, note that bar 60 can be configured for detachment from cell 70 and remain coupled to track 180, while cells 70 collapse, and retract away from track 180. Track 180 can include a battery configured for receiving power from generator/turbine 150.

FIG. 14B shows an example embodiment of a shower curtain coupled to a surface via a fastener according to the present disclosure. Bar 60 is coupled to tub/shower stall 30 via a plurality of corresponding fasteners 190A, 190B configured to fasten to each other. Fastener 190A is coupled to bar 60 in any manner. Fastener 190B is coupled to tub/shower stall 30 or the floor of the shower room or another surface, such as a moveable object, like a chair. Fastener 190A and fastener 190B fasten to each other via any fastening/coupling/securing technology, such as magnets, hook-and-loop fastener, male-female maters, interlockers, and so forth. Also, note that bar 60 can be configured for detachment from cell 70 and remain coupled to fastener 190A fastened to fastener 190B, while cells 70 collapse and retract away from fastener 190B.

FIG. 14C shows an example embodiment of a shower curtain coupled to a surface via a weight according to the present disclosure. Bar 60 is coupled to tub/shower stall 30 via a weight 200. Weight 200 is coupled to tub/shower stall 30 or the floor of the shower room or another surface, such as a moveable object, like a chair. Weight 200 can be configured to lock onto bar 60 and/or bar 60 can be configured to lock onto weight 200. Note that weight 200 can also include magnets and/or other fastening technologies to enhance such coupling. Also, note that bar 60 can be configured for detachment from cell 70 and remain coupled to weight 200, while cells 70 collapse, and retract away from weight 200. Curtain 10 can be configured, such as via biasing, to retract by default. Weight 200 can include rubber, steel, plastic, wood, and so forth. Weight 200 can include a battery configured for receiving power from generator/turbine 150.

FIG. 15 shows an example embodiment of a shower curtain having a handle according to the present disclosure. A handle 210 is defined via an opening through bar 60. Alternatively, handle 210 can be a groove, such as a finger insert, defined via a surface of bottom bar 60. Handle 210 can be integrated into a recess or a slot of bottom bar 60 of shower curtain 10. In addition, handle 210 can be integrated and/or coupled to other parts of shower curtain 10. Handle 210 can be used to raise and/or lower the shower curtain 10 as needed, via pulling or pushing. Handle 210 can be unitary or non-unitary to curtain 10. Handle 210 can be attached to curtain 210. Handle 210 can be any type of handle, whether detachable or non-detachable, whether extending into the interior of tub/shower stall 30 or extending into the exterior of tub/shower stall 30. Handle 210 can include a button to activate at least one of source 160. Handle 210 can include a button to activate at least one of freshener/emitter 170. More than one handle 210 can be used, whether identical or different from each other in structure. Handle 210 can also be coupled to at least one of cells 70 at a side end of the cell 70. Alternatively or additionally to handle 210, a tab for lifting or pulling can be used, similarly to handle 210.

FIG. 16 shows an example embodiment of a shower curtain having a shaving mirror or reflective coating according to the present disclosure. Curtain 10 includes a shaving mirror 220 or a reflective coating. To prevent fog from forming on mirror 220 or the reflective coating during showering, mirror 220 or the reflective coating can be exposed to at least one of channels 90, whether directly or indirectly. Alternatively, the water can flow through at least one of channels 90, while contacting mirror 220 or the reflective surface. Resultantly, during the showering process, when the water is hot or warm, the water flows through at least one of channels 90 and maintains mirror 220 or the reflective surface at about or around the same temperature as the water. Thus, fog formation is effectively reduced and/or prevented. Note that mirror 220 or the reflective surface is sufficiently lightweight such that curtain 10 can remain in the retracted state on its own.

Shaving mirror 220 or the reflective coating can be attached via suction cups, fastening, securing, mating, interlocking, magnetically attracting, adhering, and/or through any other attaching means. Shaving mirror 220 can be unitary or an assembly of pieces, whether on one side of curtain 10 or both sides of curtain 10. For example, shaving mirror 220 can magnetically couple to curtain 10 directly. Also, for example, shaving mirror 220 can comprise a plurality of pieces and therefore can magnetically couple to curtain 10 such that curtain 10 is positioned between the pieces, with at least one side having a reflective surface. Further, for example, additionally or alternatively to the reflective surface, other devices can be used for magnetic coupling, such as a toothbrush holder, a phone case, a mobile phone pocket or stand, or any other device. For example, curtain 10 can be non-magnetic. Shaving mirror 220 or the reflective coating can be mounted flush with, or recessed from the shower curtain 10. Shaving mirror 220 or the reflective coating can be secured, yet releasable to shower curtain 10 so that mirror 220 or the reflective coating can be moved between a first position and a second position along shower curtain 10, if and as needed. Mirror 220 or the reflective coating can also be fastened such that mirror 220 or the reflective coating cannot be removed without substantially affecting operation of curtain 10. Mirror 220 or the reflective coating can be of any suitable size or shape and can be adjusted to any angle with respect to the shower curtain 110.

Mirror 220 or the reflective coating can be unitary solid piece or unitary flexible piece, which can fold onto itself via cells 70 or pleats 80 when curtain 10 is retracted to the retracted state. Mirror 220 or the reflective coating can also be an assembly, such as defined via a plurality of strips or jigsaw puzzle pieces, which, when curtain 10 is in the expanded state, unfold into mirror 220 or the reflective coating for shaving, and when curtain 10 is in the retracted state, fold onto each other between folds of cells 70 or pleats 80 such that mirror 220 or the reflective coating is substantially hidden from sight when frontally viewed. For example, adjacent strips/pieces can face each other when folded in the retracted state. The strips/pieces can be of any size, shape, and so forth. Note that in some embodiments, in the expanded state, the strips/pieces are sufficiently close to each other such that mirror 220 or the reflective coating appears substantially continuous when frontally viewed.

Figure 17:
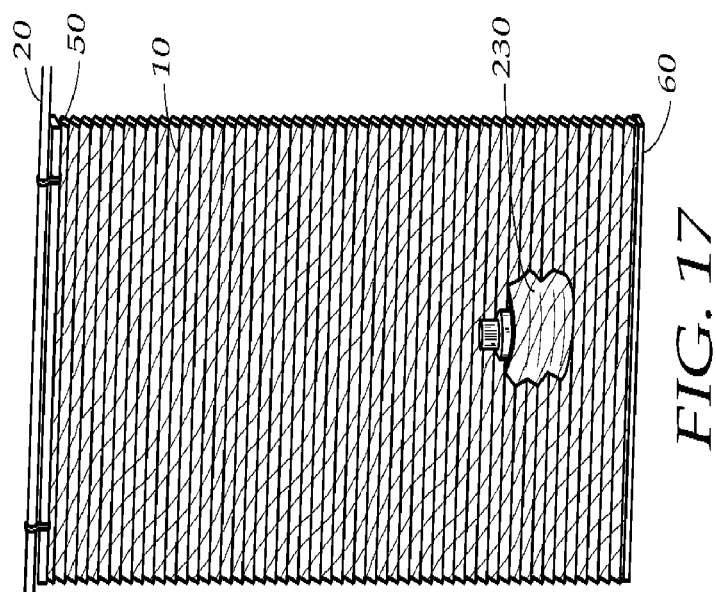
FIG. 17 shows an example embodiment of a shower curtain having an accessory holder according to the present disclosure.

FIG. 17 shows an example embodiment of a shower curtain having an accessory holder according to the present disclosure. An accessory holder 230 can be on an inner surface of curtain 10, which faces the user during the showering process. Accessory holder 230 can be removed from curtain 10 and/or can be moved to different positions along shower curtain 10. Holder 230 can hold a toothbrush, a shaver, and/or any other item that can fit within holder 230. The holder 230 can have the shape of a J-hook, L-hook, U-hook, and so forth. Holder 230 can include a pocket, whether parallelogrammical, triangular, elliptical, polygonal, and so forth. Other suitably appropriate geometrical configurations are possible for holder 230. Note that holder 230, at least if empty, is sufficiently lightweight such that curtain 10 can remain in the retracted state on its own.

In some example embodiments, curtain 10 can be configured to effectively reduce an effect of a shower-curtain effect where a conventional shower curtain is blown inward with a running shower. For example, a structure of cells 70, pleats 80, the cord/line 76 within cells 70/pleats 80, bar 50, and/or bar 60 can be configured to effectively withstand such inward blow, such as via having an internal skeleton, which is at least partially rigid. Further, track 180, fasteners 190A, 190B, and/or weight 200 can contribute or be configured to contribute for effectively withstanding such inward blow.

FIGS. 18A-18C show example embodiments of a shower partition comprising a sound input device according to the present disclosure. A partition 240 comprises the curtain 10 which comprises a sound input device, such as a microphone, for instance a waterproof or water resistant dynamic microphone. The sound input device comprises a housing 240H and a windscreen 240W operably coupled to each other, such as adhesively, fastenably, matingly, or others. The housing 240H houses a power source, such as a battery, for instance, a rechargeable lithium battery, and relevant interconnected circuitry, such as a sound input circuit and a sound transmitting circuit. In some embodiments, the power source can comprise a waterproof or water resistant power cord, such as with an electrically insulating plastic sheath and a copper wire within the plastic sheath, configured for plugging into a wall outlet. In some embodiments, the power source can comprise a rechargeable unit, whether in a wired or a wireless manner, such as to recharge a battery of the power source. In some embodiments, the housing 240H and the battery are configured such that the battery is replaceable. The power source powers the relevant interconnected circuitry. For example, the sound input circuit can comprise a magnet bar and a copper coil wrapping around the magnet bar, where the housing 240H comprises a diaphragm positioned in proximity of the coil and the windscreen 240W such that the diaphragm is positioned between the windscreen 240W and the copper coil. Other materials are possible as well, whether additionally or alternatively, such as aluminum, silver, iron, or gold. For example, the sound transmitting circuit can comprise an antenna wirelessly sending a signal comprising an input sound, whether audio processed or raw, to another device, such as a computer, an antenna, a network server, or any other device, whether local or remote. In some embodiments, the housing 240H houses a memory for retrievably memorializing/recording the input sounds. For example, the memory can comprise flash memory. The memory can be primary, secondary, tertiary or other. The memory can be volatile or non-volatile.

When the curtain 10 is pleated, such as in FIG. 18A, then the windscreen 240W is positioned closer to a showering user than the housing 240H, which is positioned further from the showering user, such as on opposing sides of the curtain 10. However, the windscreen 240W and the housing 240H can be positioned on a same side, whether the curtain 10 is pleated or non-pleated.

When the curtain 10 is cellular, as shown in FIG. 18B, then the housing 240H can be positioned within at least one of the cells 70 and be collapsible and expandable along with the at least one of the cells 70. Note that the power source and the relevant circuitry housed within the housing 240H is configured to avoid interfering with such collapse and expansion such via shape/size, such as via being planar, for instance horizontally planar along the pleats or the cells. In some embodiments, the housing 240H and the windscreen 240W are embodied as one unit extending along the curtain 10, such as shown in FIG. 18C.

Note that more than one sound input device can be used, whether identical to or different from each other in structure, location, operation, or function, whether independent of each other or dependent on each other. For example, such plurality of the sound input devices can be optimally positionally distributed in various patterns along the curtain 10 depending on the showering user profile. For example, the sound input devices can be positioned one above another along one vertical axis, such as in a line, whether rectilinear or non-rectilinear, or distributed along the curtain 10 in various patterns or in a shape, such as a triangle, a diamond, a circle, a rectangle, a pentagon, or any other open or closed shape. In some embodiments, at least one of the rod 20, the bar 50, or the bar 60 can be involved in at least partially hosting the sound input device. For example, at least one of the rod 20, the bar 50, or the bar 60 can comprise at least one of the housing 240H or the windscreen 240W. In some embodiments, the sound input device is embedded into a surface/side of the pleats or the cells of the curtain so as to reduce visibility.

In some embodiments, the relevant interconnected circuitry comprises a sound processing circuit, which can comprise an audio filter, whether analog or digital, such as a high pass, a bandpass filter, a band reject filter, or a low pass filter. The filter can be hardware and/or software based. The filter is able to filter out shower sounds or audio for clarity of the input sounds. In some embodiments, the filter can comprise digital signal processing (DSP) technology. In some embodiments, the filter can provide a feedback loop to introduce resonance or gain or attenuation. In some embodiments, the showering user can speak, hum, dictate, or sing into, towards, away, or parallel to the windscreen 240W such that the sound processing circuit captures such sounds and the filter is then able to filter out water output sounds or noises or other shower or bathroom or outdoor or indoor or toilet or faucet or drain or curtain 10 movement relevant noises. In some embodiments, the curtain 10 may include a noise canceling system for selective and/or active auditory canceling. For example, a person using the shower may want to cancel noise emanating external to shower curtain. The noise canceling system is adapted to generate a signal in response to external noise sensed by a microphone situated on or within the shower curtain. Moreover, if the sound input device is coupled to or comprises a speaker, then one or more speaker levels of the speaker can be adjusted automatically to filter out ambient water noise.

Figure 18D:
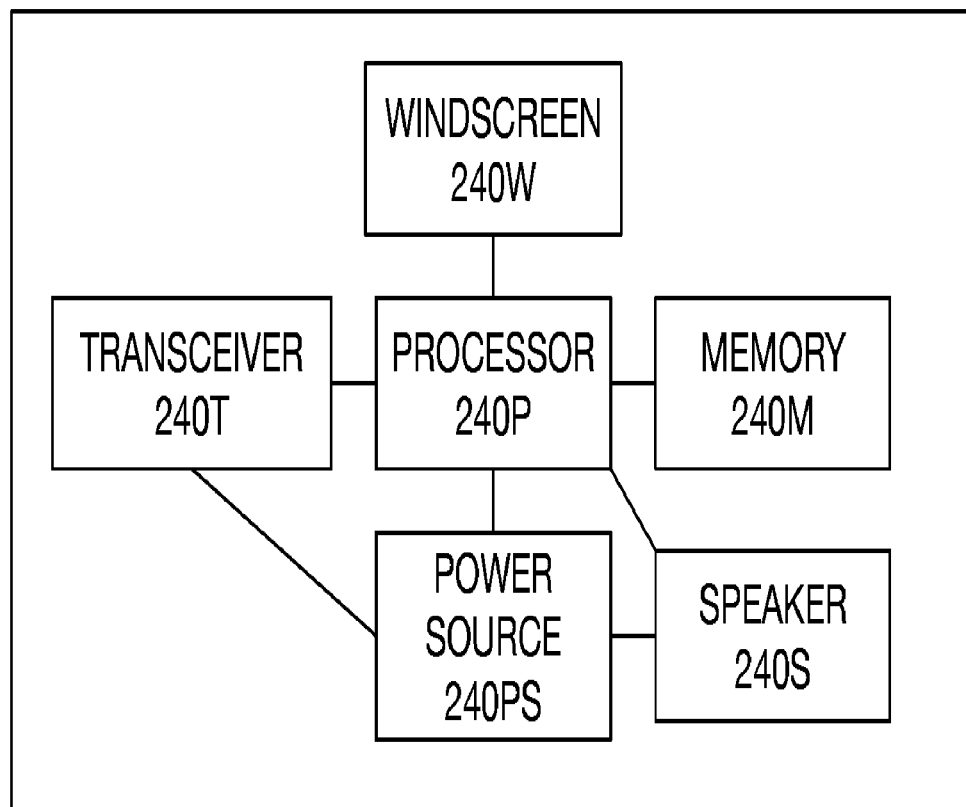
FIG. 18D shows a schematic diagram of an example embodiment of a shower partition according to the present disclosure.

FIG. 18D shows a schematic diagram of an example embodiment of a shower partition according to the present disclosure. The curtain 10 can comprise the windscreen 240W, such as described above, the processor 240P, the power source 240PS, such as described above, the transceiver 240T, the speaker 240S, and the memory 240M. The processor 240P can be a single core or a multi core processor, such as a processing circuit, powered via the power source 240PS. The transceiver 240T can comprise a receiver and/or a transmitter for any type of signal communication, such as radio frequency, ultrasound, infrared, laser, optical, or any other type, as powered via the power source 240PS. The speaker 240S can be of any type of a transducer powered via the power source 240PS. Resultantly, the curtain 10 can operate, such as selectively, as a sound input device and a sound output device, such as a telephone, whether expanded or contracted.

Figure 18E:
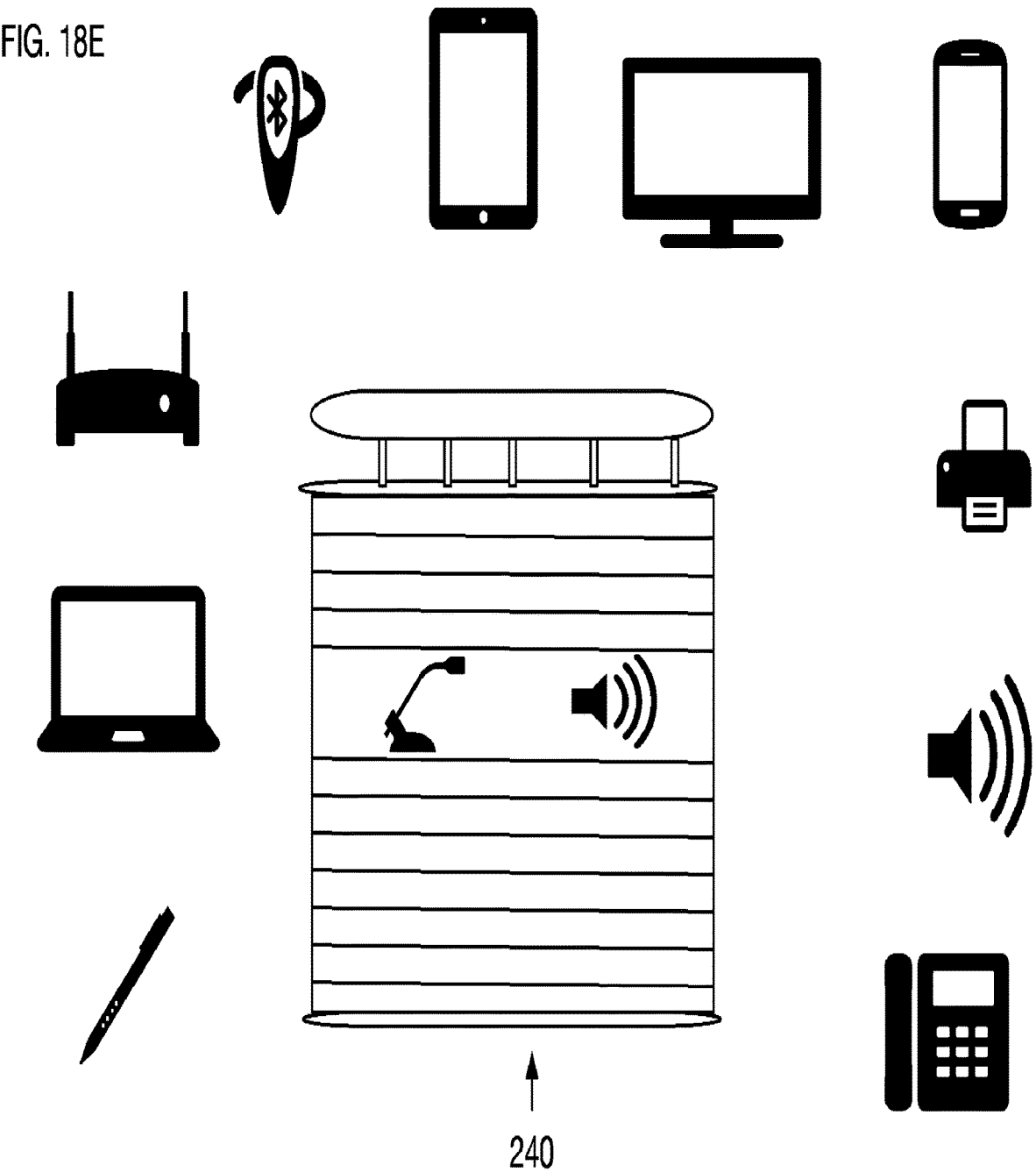
FIG. 18E shows an example embodiment of a shower partition functioning as a sound input and/or a sound output device and communicating with various computing devices.

FIG. 18E shows an example embodiment of a shower partition functioning as a sound input and/or a sound output device and communicating with various computing devices. The curtain 10 is configured to communicate, whether in a wired or a wireless manner, whether directly or indirectly, with at least one of a stylus, a pen, a pencil, a laptop, a router, a headset, a tablet, a display, a mobile phone, a printer, a speaker, a desk phone, a personal activity tracker, a wearable computer, a sensor, a vehicle, an alarm system, a health monitor, or any other input or output device comprising a processing circuit for any purpose. Alternatively or additionally, the curtain 10 can be a part of or comprise at least one of a stylus, a pen, a pencil, a laptop, a router, a headset, a tablet, a display, a mobile phone, a printer, a speaker, a desk phone, a personal activity tracker, a wearable computer, a sensor, a vehicle, an alarm system, a heating ventilation air conditioning (HVAC) system, a health monitor, or any other input or output device with a processing circuit. In some embodiments, the curtain 10 can operate as a network intermediary or a gateway or a portal. In one method of operation, the curtain 10 can be used to place, forward, and/or receive telephone calls or even video conferencing sessions, while being in proximity of the curtain 10, such as during a shower. Since the curtain 10 may comprise an audio filter to filter out undesired shower or bathroom related sounds, the telephone calls or the videoconferencing sessions can sound more clear. For example, the curtain 10 or other devices disclosed herein can communicate via a network signal, such as over Wi-Fi, Li-Fi, or others, such as via sound, optics, radio, or other means. For example, the vehicle can include land, aerial, marine, submersible, or space, whether manned or unmanned. For example, the vehicle can include a door, such pivoting or sliding, that includes a partition, as disclosed herein.

Figure 18F:
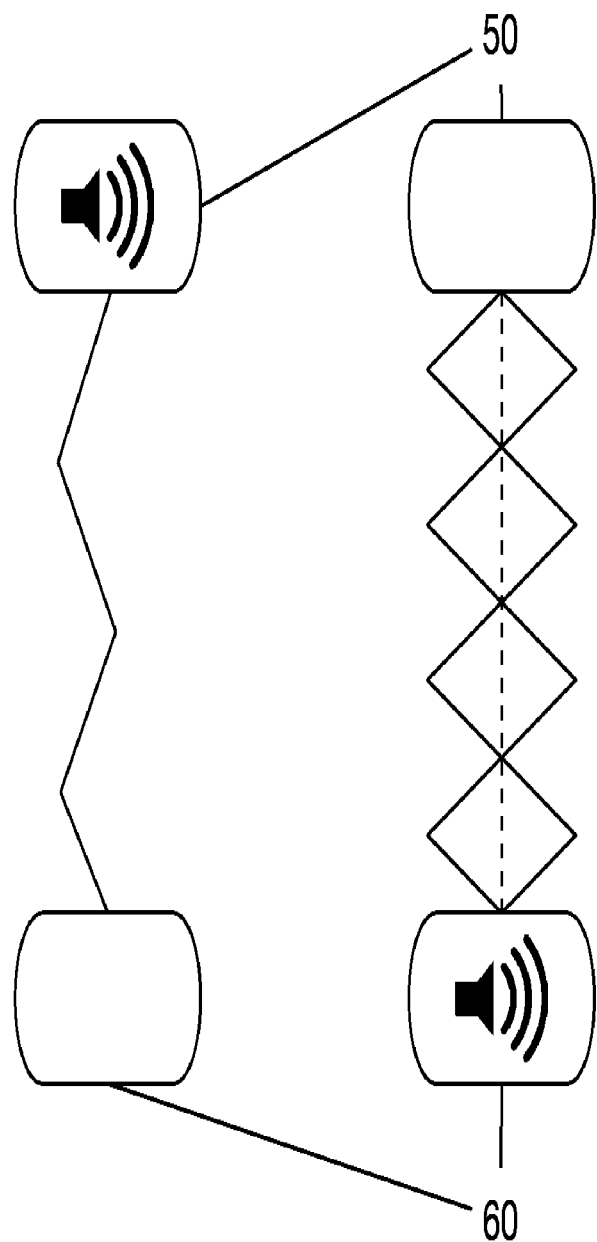
FIG. 18F shows an example embodiment of a shower partition with a sound output device according to the present disclosure.

FIG. 18F shows an example embodiment of a shower partition with a sound output device according to the present disclosure. The curtain 10 comprises a sound output device, which can be waterproof or water resistant, such as a speaker or a transducer, positioned in or on least one of the bar 50 or the bar 60. The sound can be output in at least one direction, such as downward, upward, diagonal, or sideways. Additionally or alternatively, the rod 20 comprises the sound output device, whether within or outside thereof. The sound output device can comprise or be coupled to a power source, as disclosed herein, such as in a wired or wireless manner. The sound output device can couple, such as in a wired or wireless manner, whether directly or indirectly, to another device, as disclosed herein, such as a mobile phone, a tablet, a desktop, a desktop telephone, or others, such as via a short-range communication protocol, such as Bluetooth, or another protocol, such as Wi-Fi or Li-Fi. For example, music can be streamed for output from the bar 60, whether the curtain 10 is in an expanded or collapsed state, although in some embodiments, the music can be disabled for output when the curtain 10 in the expanded state or the collapsed state. Volume or sound characteristic adjustment, such as bass, treble, or others, can be made via the other device, as disclosed herein, such as a mobile phone, a tablet, a desktop, a desktop telephone, or others. Volume or sound characteristic adjustment can also be made on at least one of the bar 50, the bar 60, or the rod 60 when least one of the bar 50, the bar 60 comprises a user interface, such as one or more buttons, sliders, knobs, dials, or others, to interface with the sound output device. Alternatively, the sound output device comprises the interface. The sound output device can output the sound in a stereo or mono mode. The sound output device can be manually or automatically turned on or off, such as upon collapse or expansion of the curtain 10. For example, the sound output device can be automatically turned on when the curtain 10 is in a collapsed state or an expanded state. The sound output device can comprise a light output device to modulate or flicker in accordance with the sound being output, such as according to the beat of the sound when the sound comprises music with the beat. For example, a speaker may be mounted to the curtain 10, such as within a lower cell of the curtain 10 or the bar 50 or the bar 60, to reproduce sound. The speaker may be configured to extend a width of the cell in order that the sound propagates throughout a shower area, and not just from one discrete point. The sound output device or the speaker may include a microphone, a control button, and an indicator light, which may be visible through the cell and which may be response to a person's pressing of cell.

FIG. 18G shows an example embodiment of a shower partition being touch enabled according to the present disclosure. The partition 240 can be used for a note taking ability and synchronization with a remote device. As shown in FIG. 18G, the curtain 10 may include an electronic note-taking device adapted to enable a user to take notes, draw, play games, solve puzzles, draw, comment, such as social network post, email, chat, or text, and/or create images of one or more colors. The electronic note-taking device may include a computer, such as rechargeable battery or mains electricity powered, and a user interface comprising a screen, which can be integrated, embedded, built into, or otherwise comprised into the curtain 10. The screen can be rechargeable battery or mains electricity powered. The computer may include software that reads, displays, and stores a person's cursive or non-cursive writing on the screen or any other type of writing in any language or alphabet, such as English, Russian, Hebrew, Arabic. Mandarin, Hindi, Spanish, Armenian, Farsi. Dutch, or others. The computer may be able to perform optical character recognition (OCR) on the writing, handwriting recognition on the writing, or translation of the writing from one language to another language, whether via comparing to locally stored data or via network querying a remote data source, such as in real-time. The OCR or the translation can be in real-time or not. The screen may be a flat-panel display, such as an LCD (liquid crystal display), a plasma display panel (PDP), an organic light emitting diode (OLED), an electrophoretic display, a rigid display, a bendable display, a foldable display, an electroluminescent display (ELD), a mechanical display, a waterproof/water resistant display, matte, glossy, or any other display. The screen can be configured for haptic feedback. The screen may be located within the curtain 10 and/or attached to an external layer or surface of the curtain 10. In some embodiments, the mirror may include a non-reflective portion or a poorly reflective portion, such as in a corner or along an edge or at center or any other portion of the mirror, that includes the screen, as disclosed herein, such as via displaying weather, stock quotes, sports scores, social media service feed, television, email/chat, video game, which may be played during shower, such as via touching or interacting with the screen, the curtain, the mirror, a shower wall, a pan floor, a tub, or any other content. As such, the screen may be built-in into mirror.

The curtain 10 may include one or more user-input devices, such as a pointing device, such a stylus, a glove, and/or a touchscreen, which is capable of sensing a gesture or a position of a person's finger, a stylus, a pen, a shower bottle, a toothbrush, a soap bar, an electric razor, a T-blade, a toothpaste tube, or any other shower related accessory, and/or which may be sensed by a sensor cooperating with the interface when the pointer device is positioned over the interface, whether in contact or with no contact. The pointing device may be placed in physical contact with the interface, or at a distance from the interface without contacting the interface, in order to be sensed by the screen. The user-input device may be communicatively coupled to the user interface. For example, the screen may include a pressure sensitive or capacitive surface which may include a liquid crystal material configured to display an input alphanumeric text or an image drawn upon the surface of the interface by application of pressure on the surface using a person's finger, stylus, or other pointing device. Additionally or alternatively, an electronic data capture device may cooperate with the interface to electronically capture gestures or movements of the person's finger, palm, hand, stylus, glove, shower related accessory, or other pointing device on the surface of the interface as electronic information representing a text or an image, and a recording device may record the writing or drawing strokes, in real-time, on the surface of the interface, based on the electronic information representing the movements of the of the person's finger, stylus, or other pointing device, for transmitting to, and further use by, an external processing device, such as a mobile phone, a desktop, or a tablet or a wearable computer. The interface may communicate to an external processing device, as further discussed below, such that the interface may transmit the image to an external processing device as electronic information representing the movements of the stylus or other input device, via the interface. The interface may include a communication device, such as a receiver, a transmitter, or a transceiver, to couple the interface to at least one external electronic device to transmit electronic information corresponding to the hand-written notes or drawings wirelessly in real-time or as stored files. The communication device may allow for synchronization among multiple electronic devices, which can be in real-time or selective upon user request or schedule. Edits on the interface can be received and updated in real time in the displays on one or more, including all, synchronized devices. In addition, edits on any of the multiple electronic devices can be merged or synchronized across all of the devices and allow for simultaneous editing via at least two of the multiple electronic devices. For example, the synchronized edits can be based on differences between old and new information. The external device may be a mobile phone, a tablet, a laptop or desktop computer and the communication may occur via a radio antenna or an infrared transmitter/receiver or any other communication signal manner. The writing or drawing or selecting or highlighting. etc. via the screen can be wirelessly synchronized and/or transferred and/or paired to the computer. Furthermore, the interface may be able to receive wireless communication, which can be encrypted, from the external device. In addition, the curtain 10 may include a connection port, such as a universal serial bus (USB), that allows for hardware connections to other computing devices.

In some embodiments, the screen may be similar to a screen of a digital notebook or a tablet in that a person may enter freeform hand-written notes or drawings onto the screen. In addition, the screen may allow for the selection of objects, highlighting of objects, spelling, formatting, and/or moving of objects. In addition, the screen may include a button which allows for the erasing of the image or parts of the image from the surface of the interface. The screen may also include keys which allow the user to scroll up and down through menu options or other display options. Moreover, the device may allow for printing and email. The shower curtain can also include an audio recorder, such as disclosed herein, comprising a microphone, which cooperates with the interface to allow for, for example, simultaneous recording of audio while taking notes via the interface. This allows for the combining and linking of the note taking with the audio recorder.

FIGS. 18H, 18I show example embodiments of partitions comprising light strips and displays according to the present disclosure. The curtain 10 can comprise a light strip or a display in the bar 50, in the bar 60, or in the rod 20. For example, an illumination device, which may be in the form of a lightstrip, may be provided in, or attached to, the curtain 10, at, for example, a lower cell or bar 60 of the curtain 10. Such attachment can be in any manner, such as magnetic, adhesive, mating, fastening, or others. The illumination device may include one or more light sources, such as fluorescent or light emitting diodes (LED) which may be arranged horizontally at a predetermined distance apart from each other or continuously. Alternatively, one or more light sources may be arranged vertically or diagonally throughout a part of, or the entirety, of the curtain 10. The light sources can be decorative and/or ornamental and may be steady on or flashing which may prevent a person from falling or tripping while in the shower area or entering or exiting the shower or may be based on water temperature changes or humidity level changes. The light sources may be battery-powered and/or electrically battery-powered or photovoltaicly powered. The light sources may be configured to turn on when the shower is on, or when the shower curtain is pulled or lifted. The light sources can be activated wirelessly through a computer, such as a tablet or a mobile phone. The light sources can be dependent or independent of each other.

The display may be a flat-panel display, such as an LCD, a PDP, an OLED, an electrophoretic display, a rigid display, a bendable display, a foldable display, an ELD, a mechanical display, a waterproof/water resistant display, matte, glossy, or any other display. The screen can be configured for haptic feedback. The screen may be configured to display local or remotely obtained information, such as videos, images, email, stock ticker, social network feed, news, personal communication messages, or others. The display can be attached in any manner, such as magnetic, adhesive, mating, fastening, or others. More than one display can be used, which can be dependent or independent of each other. The displays may be arranged horizontally at a predetermined distance apart from each other or continuously. Alternatively, the displays may be arranged vertically or diagonally throughout a part of, or the entirety, of the curtain 10. The display may be battery-powered and/or electrically battery-powered or photovoltaicly powered. The display may be configured to turn on when the shower is on, or when the shower curtain is pulled or lifted. The display may be equipped with an antenna to watch over-the-air live TV or coupled to a cable box, such as wirelessly over local area network or short range communication protocol, such as Bluetooth.

Figure 18J:
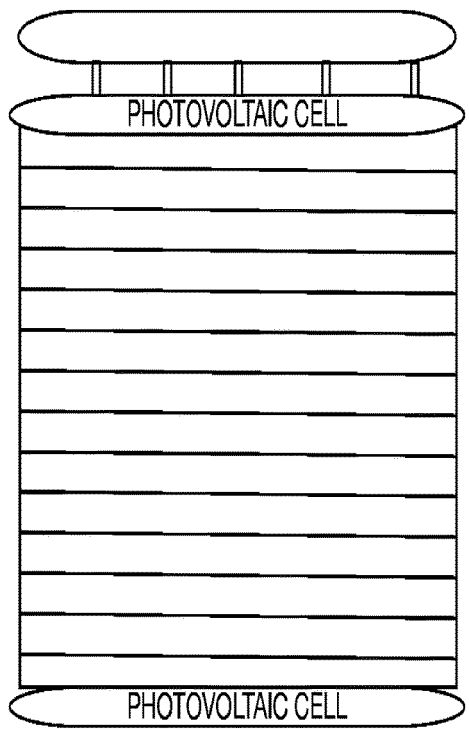
FIGS. 18J, 18K show example embodiments of shower partitions comprising a photovoltaic cell according to the present disclosure.
Figure 18K:
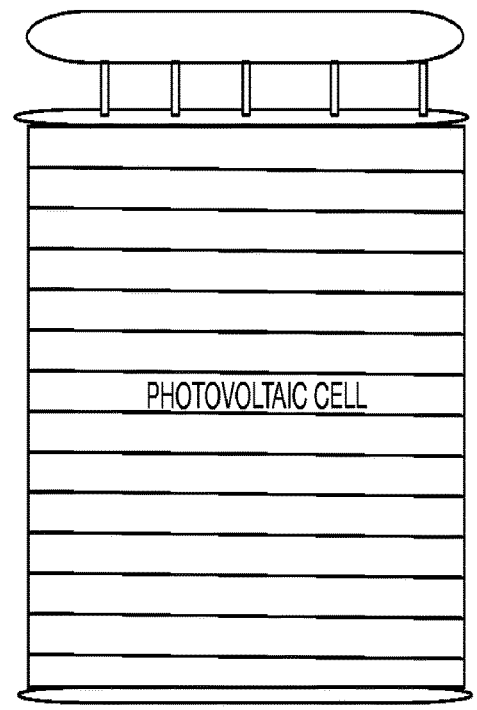

FIGS. 18J, 18K show example embodiments of shower partitions comprising a photovoltaic cell according to the present disclosure. The curtain 10 may include one or more photovoltaic surfaces or cells, such as an array, which are supported within or by one or more of the cells 70, such as the surface 72 or 74. Note that the photovoltaic surfaces or cells can be positioned in either side of the curtain 10, such as facing a user during a showering process or avoiding facing the user during the showering process. The photovoltaic surfaces or cells generate electric power via an exposure to photons, such as a light fixture turned on during a shower or placed outside a window, such as in proximity of the curtain 10, such as from lunar or solar light. Additionally or alternatively, the bar 50, the bar 60, or the rod 20 can comprise one or more of the photovoltaic cells or surfaces. The electric power generated may be used to supply power to various devices, such as disclosed herein, such as for recharging. The generation of power may be controlled by or be dependent on the position of the curtain 10. For example, in some embodiments, when the curtain 10 is contracted and the cells 70 comprise the photovoltaic cells, then little or no power is generated, although the bar 50 or the bar 60 or the rod 20 may still be generating power. For example, one or more photovoltaic surfaces or cells can comprise at least one of mono-crystalline silicon, polycrystalline silicon, amorphous silicon, cadmium telluride, and copper indium gallium selenide/sulfide. Copper solar cables can connect photovoltaic modules (module cable), photovoltaic arrays (array cable), and photovoltaic sub-fields. In some embodiments, a window blind or shade of any type, such as cellular, roller, pleated, slat, whether Persian, venetian, vertical, roman, exterior, aluminum, honeycomb, solar, sheer, wood, or others, whether vertical, horizontal, or diagonal, can be equipped with any of such photovoltaic configurations. In some embodiments, the photovoltaic surface or cell generates a direct current (DC) and, therefore, an inverter, such as for conversion of the DC into an alternating current (AC), may be locally hosted, such as via the curtain 10 or other partitions/blinds/devices as disclosed herein, or remotely hosted. For example, such local hosting may be via the surface 72 or 74 of the cell 70 or the pleat 80 or the bar 50 or the bar 60 or the rod 20.

Figure 18L:
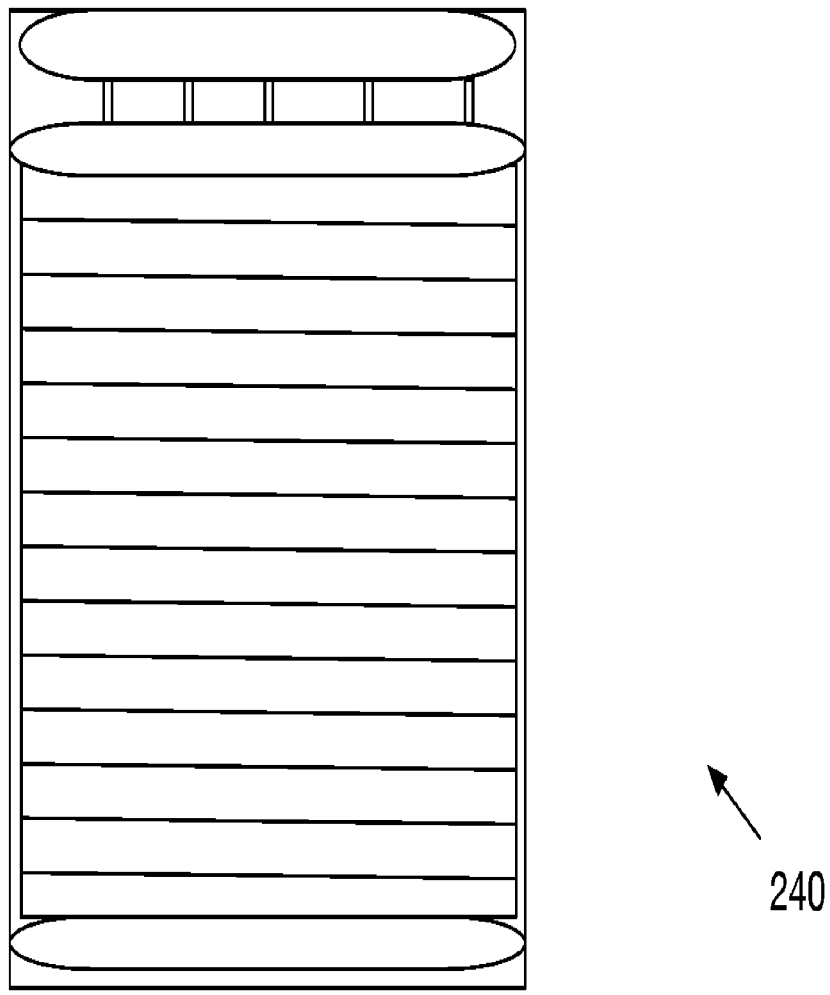
FIG. 18L shows an example embodiment of a shower partition employed in a portable shower booth according to the present disclosure.

FIG. 18L shows an example embodiment of a shower partition employed in a portable shower booth according to the present disclosure. A portable shower booth, such as transportable via a vehicle, such as ground, marine, or aerial, comprises the partition 240. Such configuration can be useful in various field conditions, such as natural disaster area, military outposts/bases, hiking, or others.

Figure 18M:
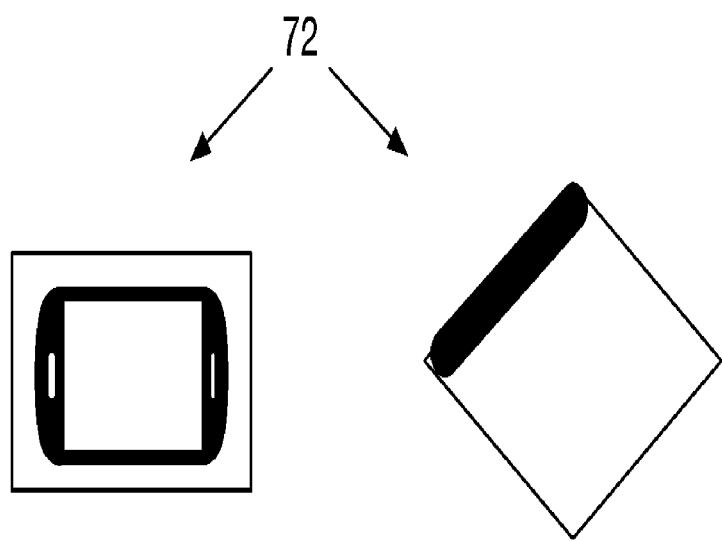
FIG. 18M shows an example embodiment of a pocket for a mobile device in a shower partition according to the present disclosure.

FIG. 18M shows an example embodiment of a pocket for a mobile device in a shower partition according to the present disclosure. The curtain 10 can comprise a pocket to contain a mobile phone, a tablet, or a mobile communication device, as shown frontally (left) and in a profile view (right). The pocket can be permanently open or selectively closed, such as with a flap or a tab, and secured, such as via fastening, magnetizing, hoop-and-looping, hooking, buttoning, adhering, mating, or others. The pocket extends horizontally/vertically/diagonally along surface 72 or 74 of cell 70 or pleat 80 or the bar 50 or the bar 60 or the rod 20. The pocket can be open or closed shaped, such as a polygon, such as a rectangle, a circle, a triangle, an oval, a pentagon, an octagon, a U-shape, a C-shape, an L-shape, or any other shape. The pocket is sized/dimensioned to contain the mobile phone, the tablet, or the mobile communication device. The pocket may be waterproof or water repellent so, for example, one can place the mobile phone into the pocket and observe or interact with the phone during the shower. The pocket can be defined via a plastic or fabric patch coupled to the surface 72 or 74, such as via stitching, fastening, adhering, mating, magnetizing, or others. Alternatively, the pocket can be integrated into surface 72 or 74 of cell 70 or pleat 80 or the bar 50 or the bar 60 or the rod 20. The pocket can be perforated, such as the water contacting the mobile phone, or whole, such as to avoid the water contacting the mobile phone. In some embodiments, cell 70 internal structure can hold or contain a display device against a cell wall for watching during shower, such as a phone stand internal to cell 70.

Figure 18N:
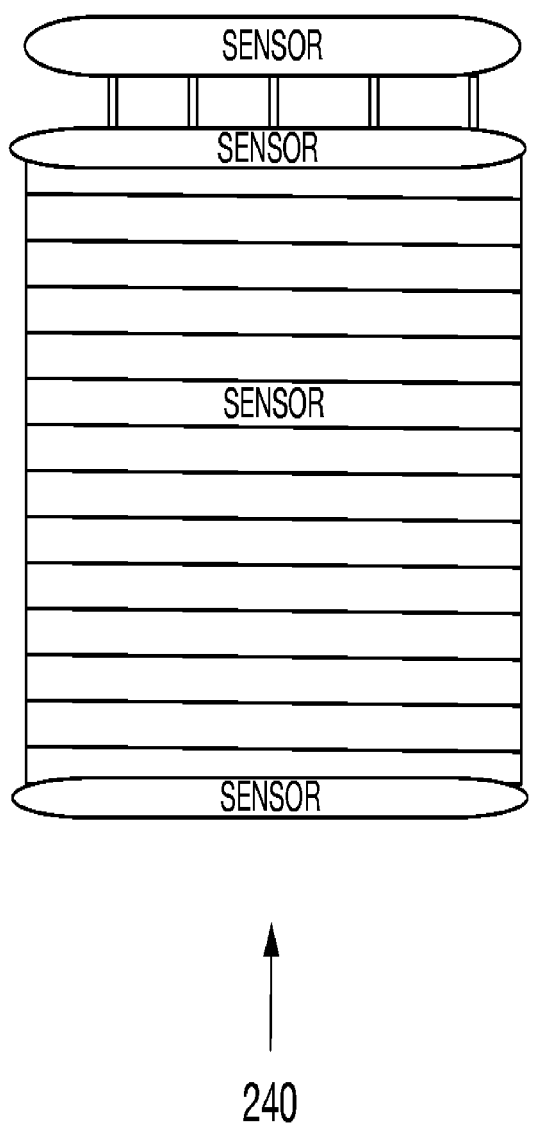
FIG. 18N shows a shower partition comprising a sensor according to the present disclosure.

FIG. 18N shows an example embodiment of a shower partition comprising a sensor according to the present disclosure. The curtain 10 can comprise a sensor, whether an active sensor or a passive sensor, extending horizontally/vertically/diagonally along surface 72 or 74 of cell 70 or pleat 80 or the bar 50 or the bar 60 or the rod 20. The sensor can be operative or inoperative when the curtain 10 can be expanded or contracted. The sensor can be powered, as disclosed herein, such as via mains electricity or a battery. The sensor can be a sound sensor, a vibration sensor, a chemical sensor, an electric current/potential/magnetic/radio sensor, a flow/fluid velocity sensor, a position/angle/displacement/distance/speed/acceleration sensor, an optical/light/imaging/photon sensor, a pressure sensor, a force/density/level sensor, a thermal/heat/temperature sensor, a proximity/presence sensor, or any other sensor. For example, the sensor may be configured to sense for an unusual motion or no motion to issue an alert. For example, the sensor can be a health or physiological sensor, such has a heart rate sensor, a pulse sensor, or any other any other type of health sensor.

In some embodiments, a sensor configured for or capable of measuring water surface height and/or volume displacement is disposed in or attached to the partition 240 or the tub or the stall or the ceiling or the wall, such as via fastening, mating, magnetizing, hook-and-looping, or others. The sensor can be passive or active, whether battery or main electricity powered. For example, if a child is taking a bath in a tub under a supervision of a caretaker and the caretaker leaves an area in proximity of the tub, thereby leaving the child alone in the tub, then the sensor can sense for water surface height and/or volume displacement and wirelessly send a signal to a device held or positioned in proximity to the caretaker, such as a mobile phone, a home appliance, or any other computer, to alert the caretaker if the water surface height and/or volume displacement is indicative of the child's entire body, or most of body, being under water or a water rising above a predetermined water level in the tub. To accomplish this, the sensor comprises an input device, such as a user interface, or can be wirelessly sent input information concerning the child's current weight and/or height, and based on the Archimedes' principle, can calculate the displacement indicative of the body position. The sensor can sense water surface height in various ways, such as via coming in contact water, optical refraction, chemical reaction/trigger, or any other ways. The sensor can sense volume displacement in various ways, such as via coming in contact water, optical refraction, chemical reaction/trigger, water or body weight, or others.

Figure 18O:
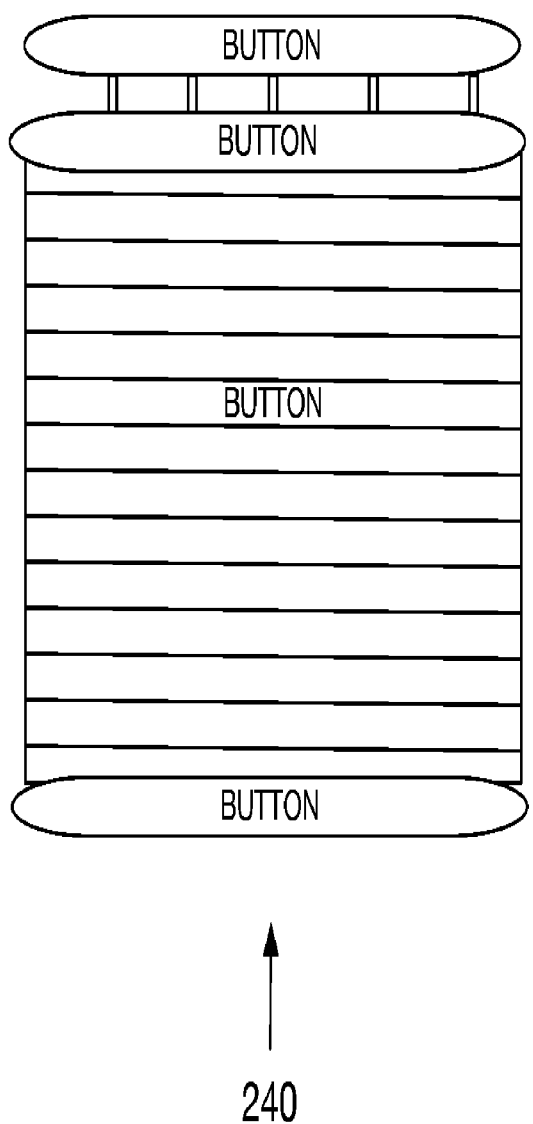
FIG. 18O shows a shower partition comprising a button according to the present disclosure.
Figure 18P:
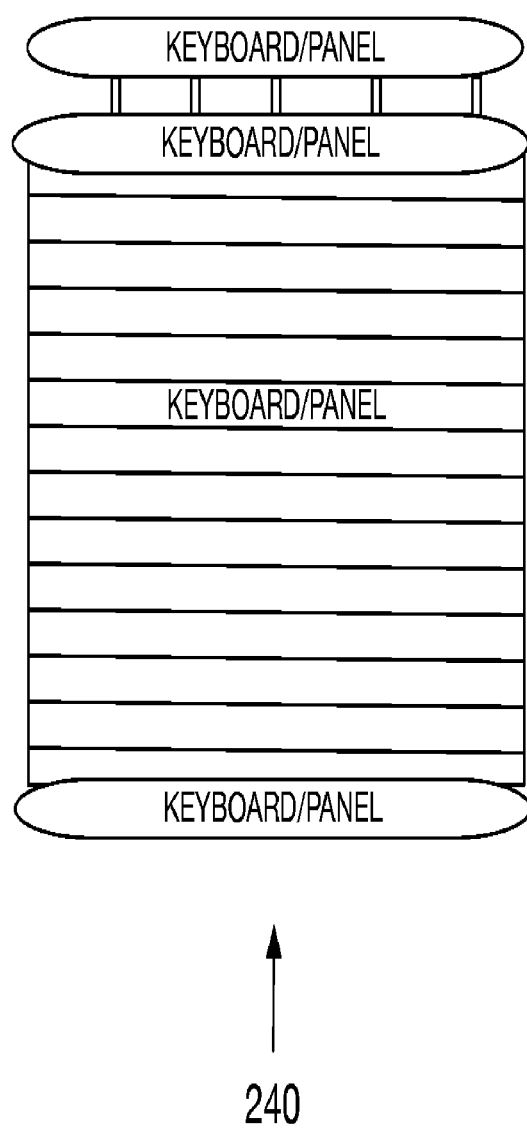
FIG. 18P shows a shower partition comprising a keyboard/panel according to the present disclosure.

FIG. 18O shows an example embodiment of a shower partition comprising a button according to the present disclosure. FIG. 18P shows a shower partition comprising a keyboard/panel according to the present disclosure. The curtain 10 comprises a button installed or positioned along surface 72 or 74 of cell 70 or pleat 80 or the bar 50 or the bar 60 or the rod 20. The button can be a push-button, such as a switch meant to control a machine or a process. The button can also be a computing button, such as a virtual control displayed on a computer screen that can control software. The button can also be a network button, such as a web button or a button graphic, such as a digital image used to represent a link to a specific web location. For example, the button can be an emergency button, which can be positioned installed or positioned along surface 72 or 74 of cell 70 or pleat 80 or the bar 50 or the bar 60 or the rod 20 and can be activated when a user of the shower is not feeling well or has fallen, such as an elderly person. Upon activation of the emergency button, a sound output device, as disclosed herein, can activate or a network signal communication may be sent to a remote device, as disclosed herein, such as wirelessly to a mobile phone of a caretaker. In some embodiments, the emergency button can be selectively attached and removed from any portion of the curtain 10 to improve reachability of the emergency button in a case of an emergency. The curtain 10 may be equipped with at least one sensor, such as a physiological sensor capable of monitoring in real-time one or more various health factors. For example, heart rate, pulse, blood flow, blood oxygen, blood glucose level, physical and psychological stress levels, position and balance, brain activity, blood pressure, hydration level, pregnancy-related issues, body temperature, body fat density, and others. A combination of sensors may be employed to detect predefined user states in various environments and during various activities, such as inside a house, while sleeping, while walking or exercising outside the house, while in the shower, and others. The curtain 10 may also be equipped with a device capable of detecting falls within the shower, which can comprise a sensor, a camera, a invisible light trigger, a microphone, or others.

Figure 18Q:
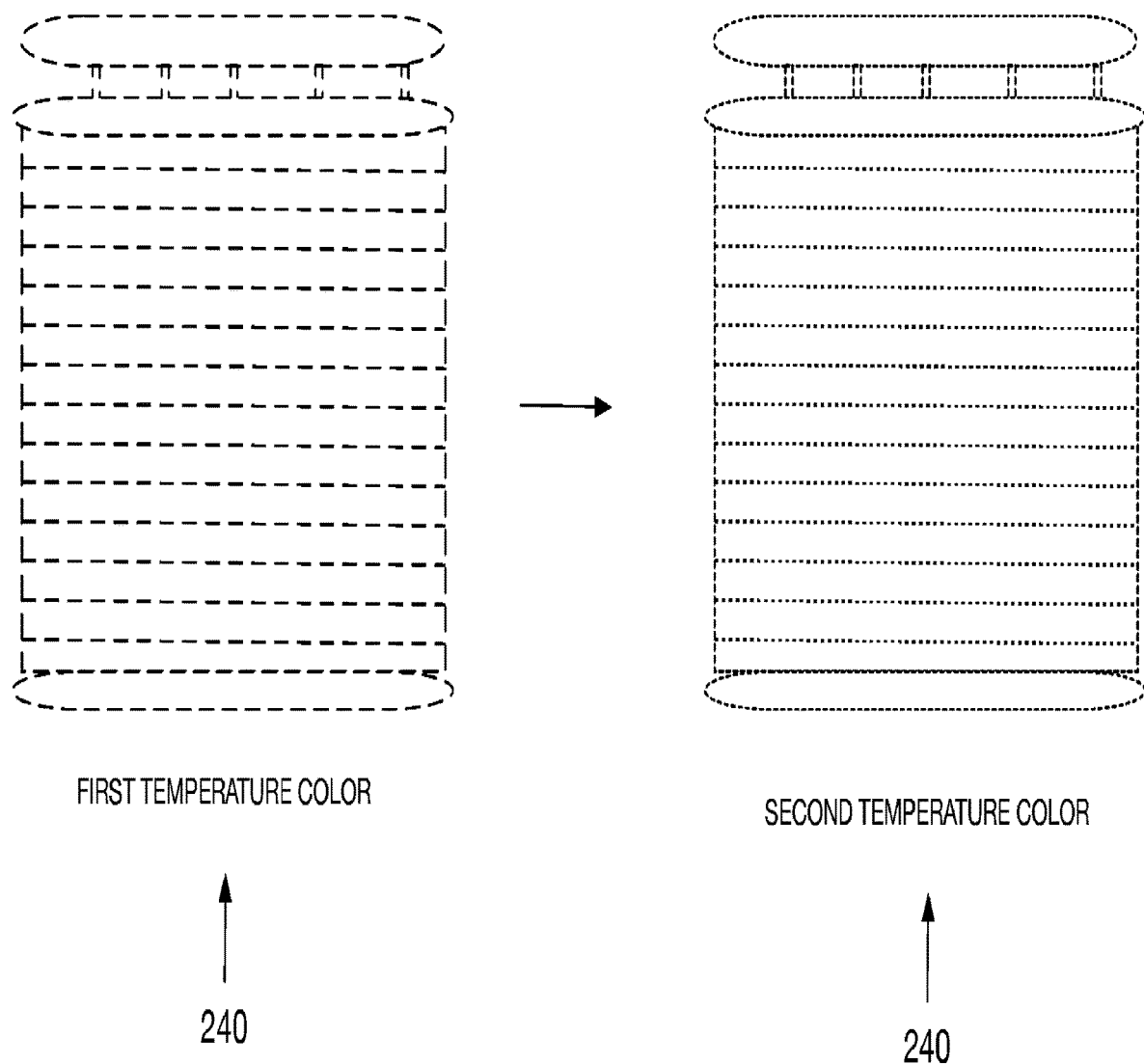
FIG. 18Q shows a shower partition which changes visibility according to the present disclosure.
Figure 18T:
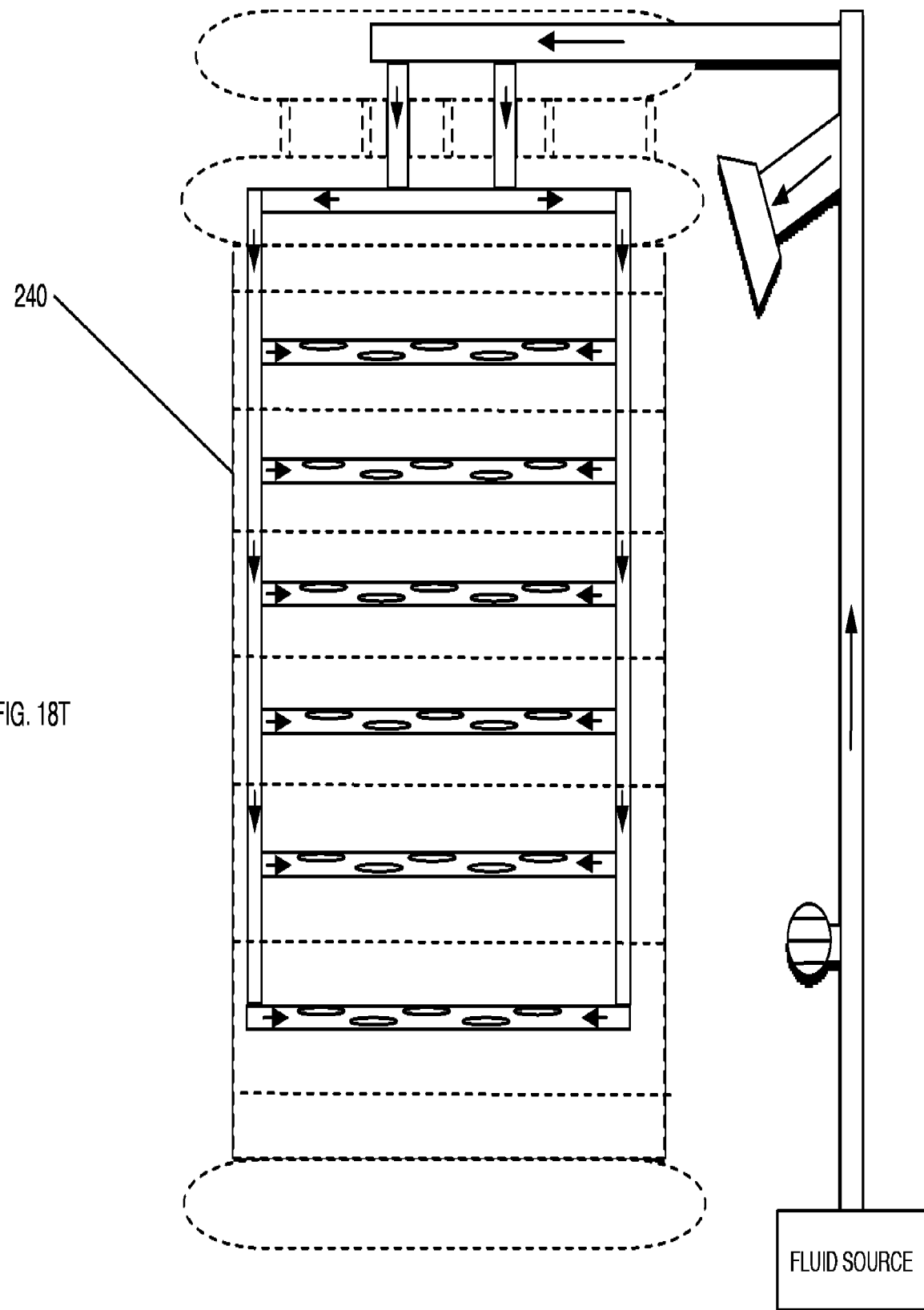

FIG. 18Q shows an example embodiment of a shower partition which changes visibility according to the present disclosure. The partition 240 is configured to visibly change an aspect, a parameter, or a characteristic of at least one of color, opaqueness, translucency, transparency, contrast, hue, pattern, reflectivity, shininess (matte/glossy), texture, porosity, or any other visual, graphical, or optical property based on a trigger or a condition, as disclosed herein, for a predetermined time period or indefinitely, as disclosed herein. In some embodiments, the partition 240 can change color based on a temperature change, such as from blue representing cold to red representing hot in any pattern or mixture of colors or images or text or symbols. In some embodiments, such temperature is a showerhead or shower hose water temperature. For example, the partition 240 comprises a shower curtain comprising a color-changing system comprising a color-changing indicator, which changes color depending on a present temperature in a showering area, such as a showerhead or shower hose water temperature. However, other conditions or triggers are possible, such as a tub water temperature or an ambient air temperature or steam temperature or humidity level or an outside weather condition or a presence of an unread communication or lack thereof, such as a voicemail, a chat, an email message, a text message, a social network message/post, a breaking news, or any other personal communication, as communicated as disclosed herein. The color-changing indicator can be a component of the shower curtain and arranged so as to be visible on a surface of the shower curtain, such as along surface 72 or 74 of cell 70 or pleat 80 or the bar 50 or the bar 60 or the rod 20. For example, in context of showerhead or shower hose water temperature, this positioning allows a person to easily identify if the present showerhead or shower hose water temperature in the showering area is too high or low, such as while getting ready to enter into a tub or a stall. Alternatively, this positioning can allow a person to easily identify a tub water temperature or an ambient air temperature or steam temperature or humidity level or an outside weather condition or a presence of an unread communication or lack thereof, such as a voicemail, a chat, an email message, a text message, a social network message/post, a breaking news, or any other personal communication. The color-changing indicator can include or be based on an electro-chemical, electro-mechanical, or electro-optical component configured to affect or cause a change, as disclosed herein. For example, the color-changing indicator can comprise an LED light source or a coloring agent or a dye. For example, the indicator changes from one color to another upon receiving an indication from a sensor of a temperature change, as disclosed herein. Alternatively, instead of changing from one color to another, other visual or audio indicators can occur, such as a sound output, for instance a tune or a song or a prerecorded phrase. In some embodiments, the shower curtain depicts two or more different colors which appear when a predetermined showerhead or shower hose or tub water temperature is reached. For example, a first color, which may be red, appears when the temperature in the shower rises to a degree above a predetermined temperature, which may be 105 Fahrenheit. Below this temperature, the color may be blue. The predetermined showerhead or shower hose or tub water temperature may be set depending on a person taking a shower. For example, for a child or someone pregnant, the temperature may be lower than for adult non-elderly male.

FIGS. 18R1, R2 show example embodiments of projectors projecting onto shower partitions according to the present disclosure. The partition 240 is used with an optical or illumination output device, such as a projector able to project an image or a moving image, such as slides, photos or videos, onto a surface, commonly a projection screen, such as the partition. The optical or illumination output device can be waterproof or water repellent or water resistant. The optical or illumination output device outputs or creates an image by shining a light through a transparent lens or projects the image directly, such as via a laser. For example, the optical or illumination output device can be an overhead projector or a digital projector or a handheld projector or an LED projector. The optical or illumination output device can be used to output photographic slideshows onto the partition during the shower or at other times. The optical or illumination output device can output augmented reality content.

In some embodiments, the partition 240 is equipped with a control panel for interfacing, whether in a wired or wireless manner, with an input or an output device, such as a sound output, light output, control input, or content input device, whether as part of the partition 240 or distinct therefrom. The control panel can be battery powered, such as a rechargeable battery, or powered via mains electricity. The devices may include a radio, an audio device, such as a music player, a television, a keyboard, mobile phone, personal digital assistant (PDA), a gaming machine, projector, a camera, a global positioning system personal device, a geolocator, a monitor, a fan, a home appliance, or any other device/system. The devices may be fixed to the partition 240, such as fastened, adhered, or mated, or may be selectively removable from the partition 240, such as hook-and-looped, suction-cupped, hooked, or magnetized. The devices may be surrounded or shielded by transparent covers attached to the partition 240 to surround the devices to thereby allow for waterproofing the devices, while making the devices at least visually accessible. The covers may be made of any material capable of withstanding water pressure and insulated to prevent electrical shock. The devices may be flush with the shower curtain or protrude inward or outward from the shower curtain. The devices can be disposed at specific intervals along the curtains, and can be moved from one location to another location along the curtain both before/after showering, or during showering. In some embodiments, the camera may include a facial or body part recognition logic, whether hardware or software, to automatically or manually recognize a user's face or other body portion, such as a torso, an arm, a skin, or others. In some embodiments, the camera may include a privacy logic, whether hardware or software, to automatically or manually make opaque, translucent, hide, discolor, blur, cover, superimpose, or any other technique to block an area of a human body, such as pre-selected or preset in advance. For example, the software may block anything from waist down, chest down, neck down, from chin down, or any other body area such that teleconferencing can occur during a shower, while maintaining the user's privacy. Alternatively, the camera can show the user without any body part or portion blockage, such as for monitoring elderly, ill, or children. In some embodiments, the facial or body part recognition logic or the privacy logic is not hosted in the camera, but rather hosted in another device, which can be remotely, such as on a server, a mobile device, a desktop, a laptop, a vehicle, or a terminal/workstation.

FIGS. 18S, T show example embodiments of shower partitions with fluid output systems according to the present disclosure. A fluid comprises at least one of a liquid, such as water, beverage, oil, or spirit, or a gas, such as air or fluorine. The partition 240 comprises tubing or hose, whether rigid or flexible, whether solid or perforated, whether internal or external to cells 70, pleats 80, bar 50, bar 60, and rod 20, extending horizontally/vertically/diagonally therealong, in any pattern, such as a plurality of stacked rectangles. The tubing or hose of the partition 240 may be flush with the partition 240 or protrude inward or outward from the partition 240. The tubing or hose of the partition 240 is fluidly communicably coupled, such as via threading or welding, to tubing or hose which feed a showerhead or shower hose or directly to the showerhead or shower hose. Therefore, when the showerhead or shower hose are outputting fluid, then the tubing or hose of the partition 240 can also output fluid, whether the partition is deployed or undeployed, such as expanded or contracted. When the tubing or hose of the partition 240 is perforated, then at least one of the openings can be of any or shape, whether closed or open, such as a circle, a square, a triangle, a pentagon, an octagon, an oval, a slit, a U-shape, a C-shape, an L-shape, or others. At least one area, such as a row or a column, of the tubing or hose of the partition 240 can be selectively open or closed, such as via a valve, such as a knob or a tab, which can be elastically engaged. In some embodiments, some of the tubing or hose of the partition 240 can be fluidly dependent on other tubing or hose of the partition 240. In some embodiments, some of the tubing or hose of the partition 240 can be fluidly independent of other tubing or hose of the partition 240. In some embodiments, the tubing or the hose of the partition 240 can be selectively detachable or permanently attached, whether via being unitary or integrated or via other coupling methods, such as adhering. In some embodiments, the tubing or the hose of the partition 240 can be outputting fluid independently of the showerhead or the hose outputting the fluid. For example, the tubing or the hose of the partition 240 can be outputting water while the showerhead or shower hose is not outputting water. In some embodiments, the tubing or the hose of the partition 240 can change visibility or comprise any functionality, as disclosed herein.

In some embodiments, the partition 240 comprises the shower curtain which includes a fluid collection, fluid direction, fluid dispersion, or fluid output device, which may include a hose or supply pipe or tubing, which can be insulated, which is configured or arranged to receive, direct, channel, collect, or redirect water directed to the showerhead or the shower hose. The hose or supply pipe or tubing may be securely or fluidly attached to, or integrated with, the shower curtain, such as via being unitary or an assembly, such as via fastening, welding, magnetizing, hook-and-looping, adhering, hooking, mating, or others. The hose or supply pipe or tubing may include a pump at lower portion which is adapted to facilitate the movement of the water from a lower portion of the curtain to an upper portion of the water. The hose or supply pipe or tubing may include a faucet or a plurality of faucet which are adapted to discharge water from the hose or supply pipe or tubing toward the inside of the shower.

In some embodiments, the hose or supply pipe or tubing of the partition 240 may include a plurality of elbows comprising fluid passages and connections which connect to the faucet-controlled tube or the faucet itself, and which are configured to allow a person to move and selectively position the faucet at a desired height and width along the shower curtain.

Figure 18U:
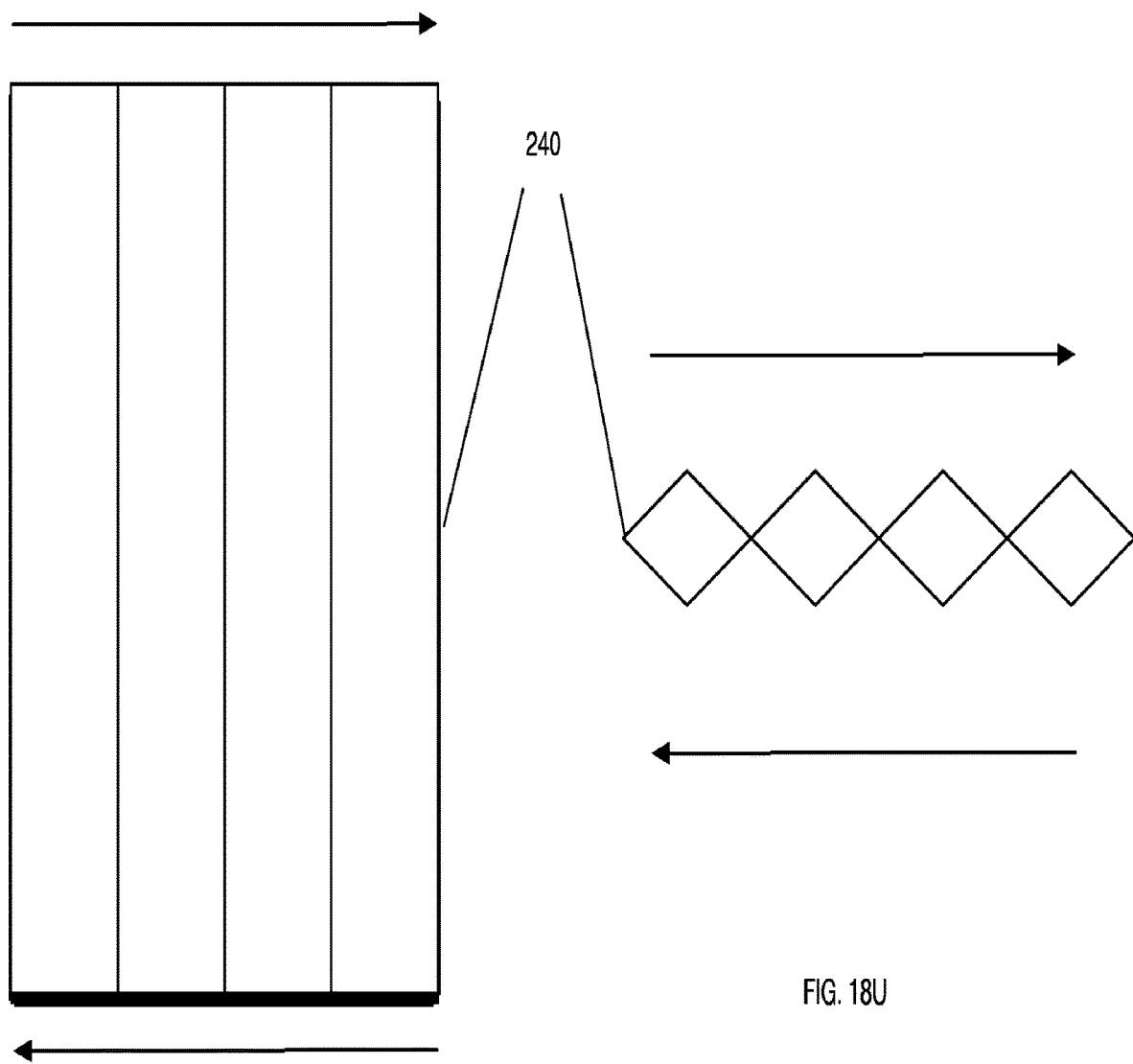
FIG. 18U shows an example embodiment of a shower partition comprising a plurality of vertically extending cells according to the present disclosure.

FIG. 18U shows an example embodiment of a shower partition comprising a plurality of vertically extending cells according to the present disclosure. As shown from a side (left) and from a top (right) of the partition 240, the partition 240 comprises a plurality of vertically extending cells 70, which collapse onto each other or expand, based on an application of a force, whether manual or motorized, such as a horizontal force onto an outermost cell 70 or bar 50 or bar 60, from any side. For example, the partition 240 can collapse from left to right or right to left or both toward a common point. The partition 240 can collapse and expand, along a horizontal plane, between an upper rail/track and a lower rail/track, with the partition 240 traveling therebetween. For example, the upper rail/track can comprise or be or is rod 20 and the lower rail/track can be an upper surface of a tub wall. In some embodiments, one of the upper rail/track or the lower rail/track is used, such as the partition 240 extending from a rail in vertical cantilevered manner. In some embodiments, no rails are used, but an outermost cell 70 or bar 50 or bar 60 is coupled to a wall or a vertically or diagonally extending surface, such as via fastening, adhering, magnetizing, hook-and-looping, mating, welding, or other manners. In such configuration, the partition 240 can also comprise a pivot shaft such that the partition 240 can pivot open or closed, like a door. Such pivoting can be elastic or not. In some embodiments, the partition 240 or any other partition as disclosed herein, can include a heating element or be coupled to a heating element such that one can dry him/herself in a shower pan/tub or outside thereof.

Figure 18V:
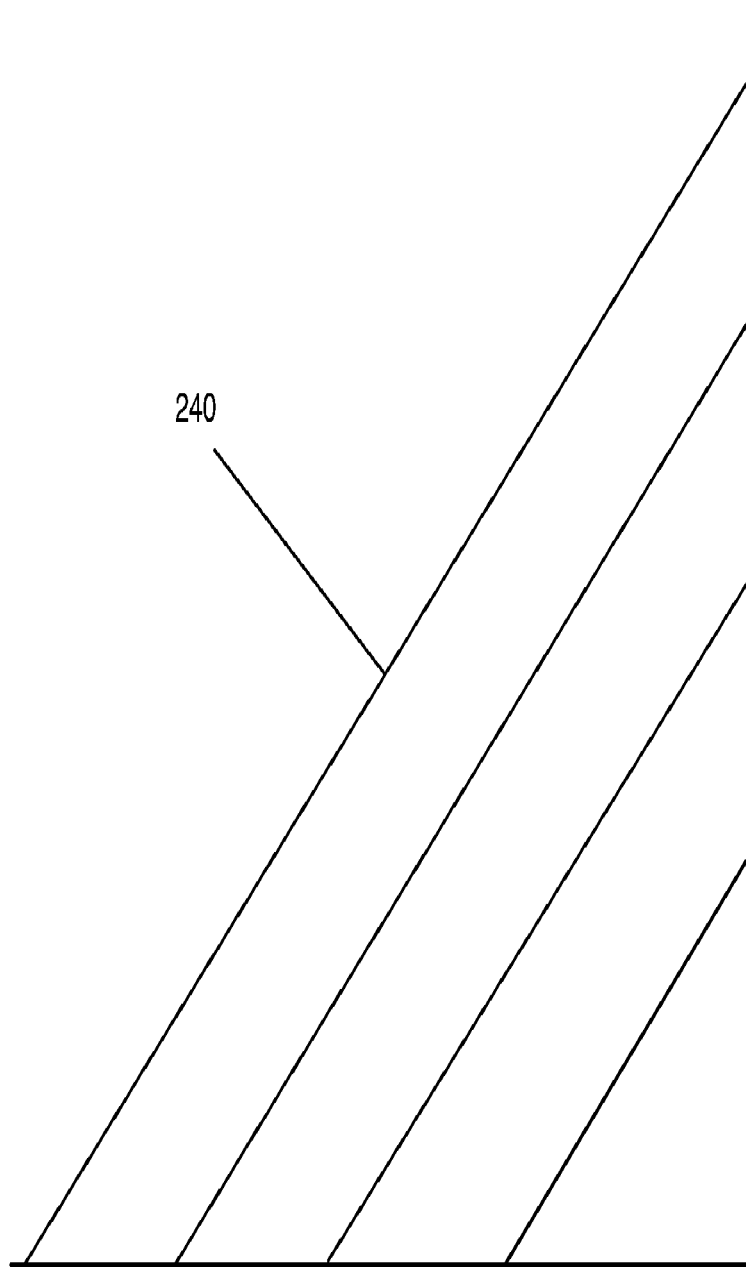
FIG. 18V shows an example embodiment of a shower partition comprising a plurality of diagonal cells according to the present disclosure.
Figure 19A:
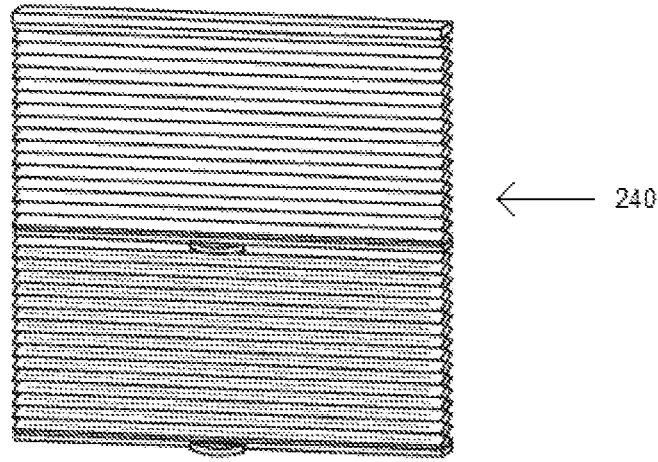
FIGS. 19A-19N show various embodiments of partitions, whether shower or non-shower, which can be used with any technology disclosed herein according to the present disclosure
Figure 19B:
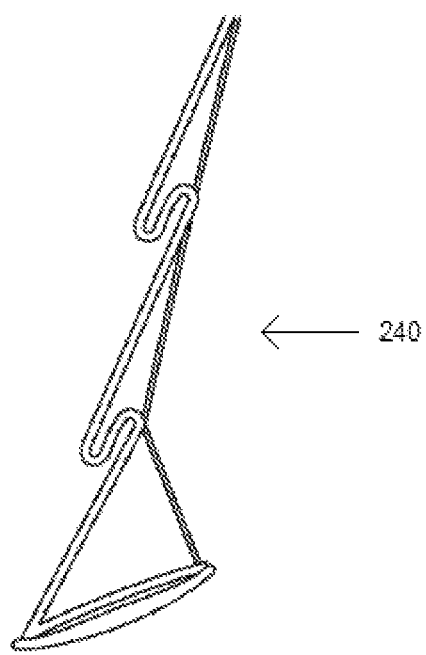
Figure 19C:
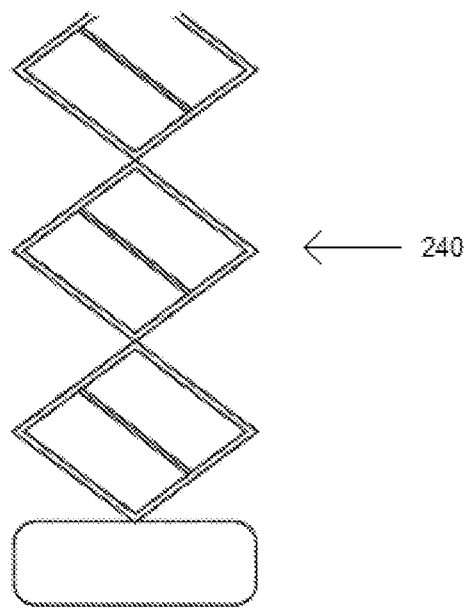
Figure 19D:
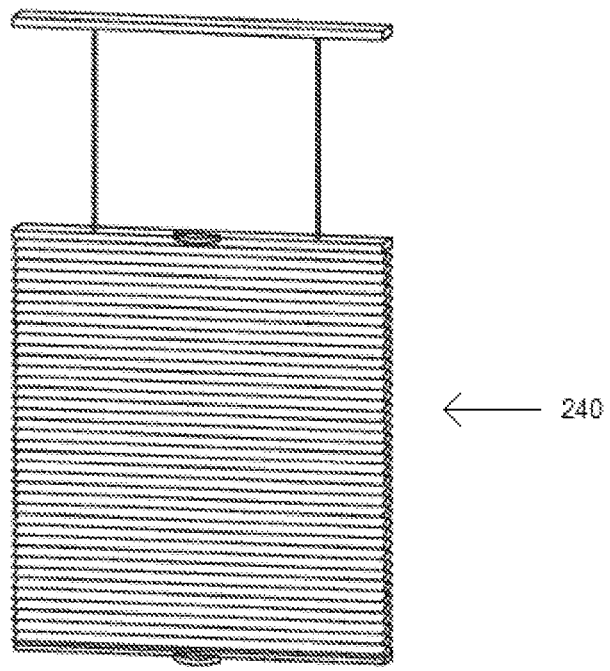
Figure 19E:
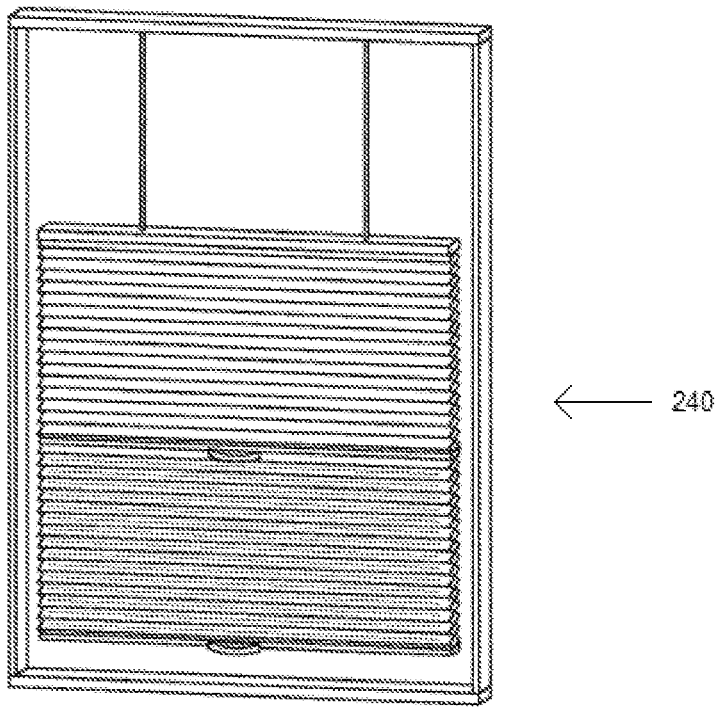
Figure 19F:
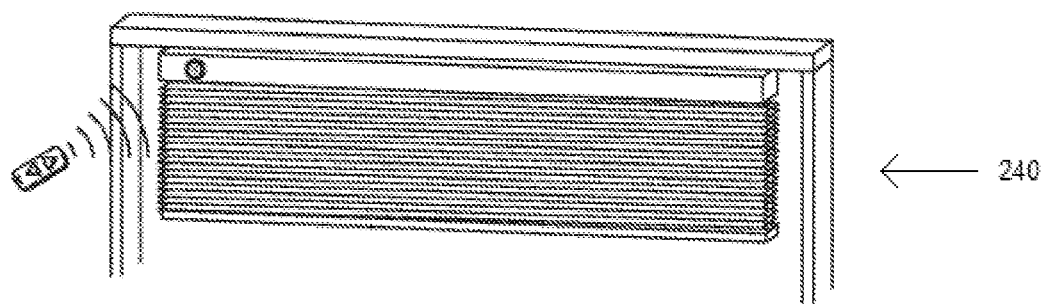
Figure 19G:
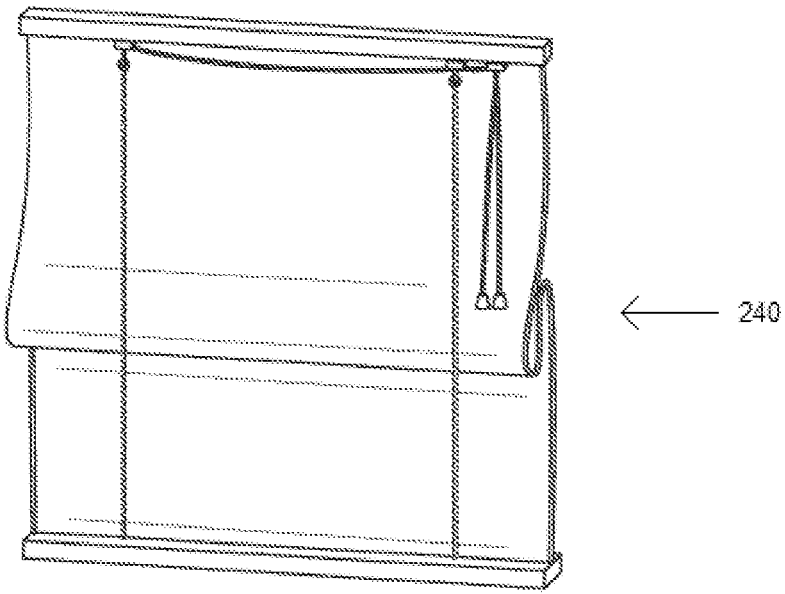
Figure 19H:
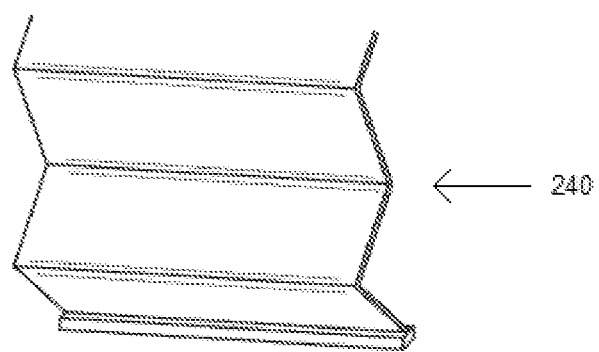
Figure 19I:
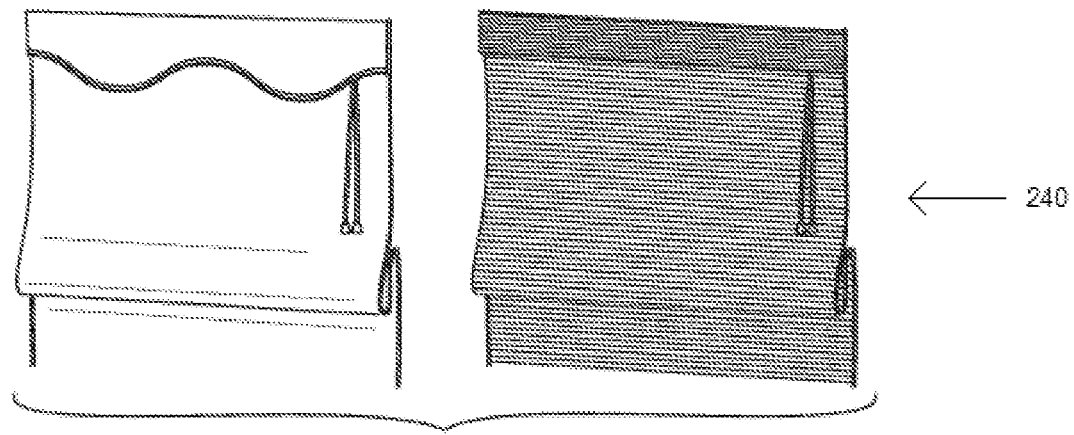
Figure 19J:
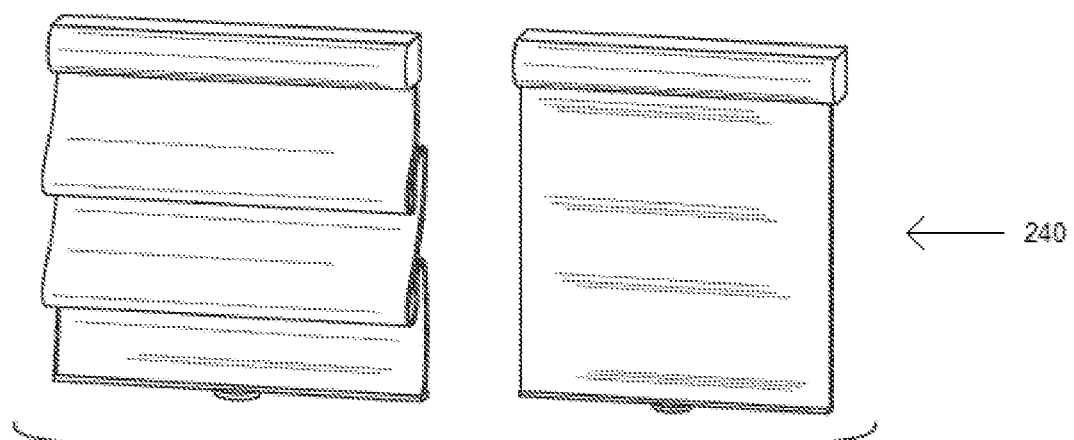
Figure 19K:
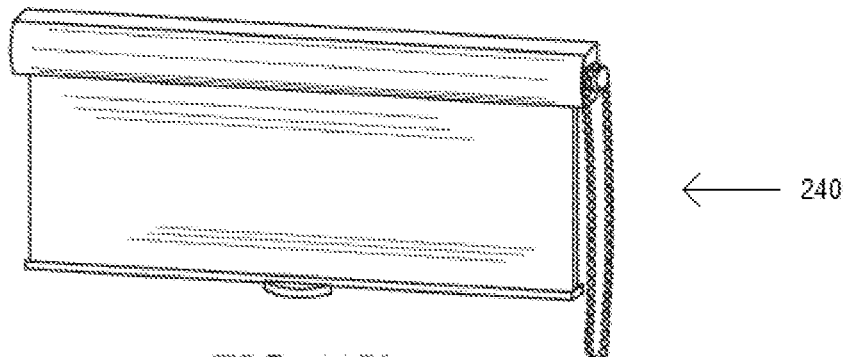
Figure 19L:
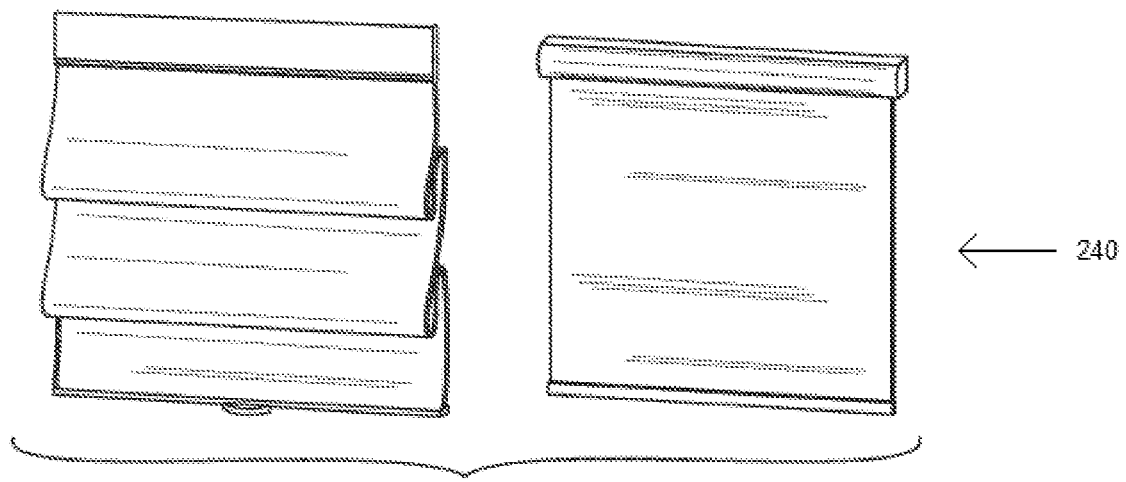
Figure 19M:
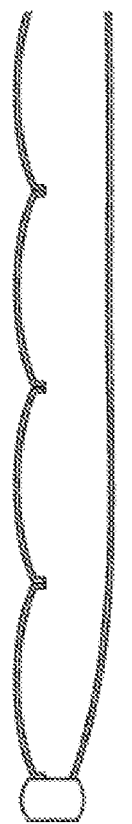
Figure 19N:
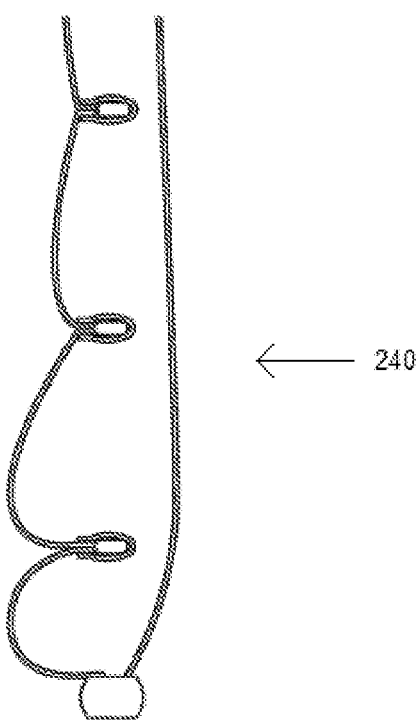

FIG. 18V shows an example embodiment of a shower partition comprising a plurality of diagonal cells according to the present disclosure. The partition 240 comprises a plurality of diagonally extending cells 70, which collapse onto each other or expand, based on an application of a force, whether manual or motorized, such as a diagonal force onto a lowermost cell 70 or bar 50 or bar 60. For example, the partition 240 can collapse from left to right or right to left or both toward a common point. The partition 240 can collapse and expand, along a diagonal plane, between an upper rail/track and a lower rail/track, with the partition 240 positioned therebetween. For example, the upper rail/track can comprise or be or is rod 20 and the lower rail/track can be an upper surface of a tub wall. In some embodiments, one of the upper rail/track or the lower rail/track is used, such as the partition 240 extending from a rail in vertical cantilevered manner. In some embodiments, the partition 240 comprises at least one of a door, a screen, a curtain, a roller, a window, a wall, a blind, a shade, or any other structure, whether rigid or flexible, of any material which partitions a shower area from a non-shower area, with the shower area containing a showerhead or shower hose. In some embodiments, a partition, such as a window blind or shade of any type, such as cellular, roller, pleated, slat, Persian, venetian, vertical, roman, exterior, aluminum, honeycomb, solar, sheer, wood, or others, whether horizontal, vertical, or diagonal, can employ any technology described herein in any combinatory manner for any purpose in any environment, as any other embodiments of any technology disclosed herein.

FIGS. 19A-19L show various embodiments of partitions, whether shower or non-shower, which can be used with any technology disclosed herein according to the present disclosure. For example, a window blind or shade can comprise a photovoltaic cell, a speaker, a sensor, or a touchscreen. For example, an environment can comprise home use, hotel use, hospital use, military use, hiking use, prison/jail/penal institution use, main entry door use, patio door use, garage door use, container use, vehicle use, or any other use. In some embodiments, the sensor can include a fire sensor, a heat sensor, a smoke sensor, a steam sensor, a carbon monoxide sensor, a poisonous or harmful gas sensor, or any other sensor. For example, a patio door can internally contain a blind, as disclosed herein, between a pair of glass panes, such as an outer pane and an inner pane, with the blind containing a photovoltaic cell and at least one of the glass panes containing a photovoltaic cell, which may be transparent or translucent. For example, a container, a medical curtain, a garage door, or a vehicle door can include a cellular structure, as disclosed herein. For example, a garage door, including a transparent, opaque, or translucent portion, which may be mode adjustable/selectable, whether plastic or glass, can be collapsible and expandable upon inclusion of a cellular structure, as disclosed herein, and can include a photovoltaic cell, an input device, or an output device, as disclosed herein. Such garage door can travel along or within a pair of elongated vertical posts/U-shaped brackets for containing the cellular structure therebetween, such as a pair of rails, while providing rain/snow/wind/animal/birds/bugs protection. For example, the garage door may include a breakage sensor, such as a low voltage, such as 3 volts, circuit breaker, if a breach of the cellular structure is identified. For example, a medical curtain can include a cellular structure or any other partition structure disclosed herein, including a transparent, opaque, or translucent portion, whether plastic or glass, which may be selectively, whether manually or automatically, mode adjustable, and can be collapsible and expandable and can include a photovoltaic cell, an input device or an output device, as disclosed herein, such as for use in hospital rooms, such as patient rooms or operating rooms. For example, the cellular structure or any other partition disclosed herein can be or include a one-way portion, which one can see through one side of the partition, but not from the other side, which may be used in schools, houses of worship, cubicles, restaurant table partitions, playgrounds, kitchens, refrigerator shelves/doors, interrogation rooms, or compartments, or others. For example, the cellular structure or any other partition disclosed herein can be or include a privacy screen. For example, a photovoltaic cell can be opaque, transparent, or translucent, which may allow for multi-layer or multi-pane photovoltaic energy generation, such as DC. For example, a photovoltaic cell may be planar, hemispherical/dome-shaped, conical, rollable, rigid, flexible, printable, or others, whether coupled/attached/mated/fastened/interlocked/printed as a cell or a coating in any combinatory manner. For example, the printing can be via an electrically functional ink, where the ink may include a magnetic particle, such as pulverized or dusted neodymium. For example, if a surface, as disclosed herein, including or supporting such ink is ruptured/broken such that a gap is formed in the surface, then the magnetic articles can attract to each other and close the gap for subsequent use of the surface. For example, a photovoltaic cell may generate a photovoltaic energy based on natural light, such as solar or moon, or artificial light, such as a lamp. For example, a photovoltaic cell may be coupled coupled/attached/mated/fastened/interlocked/printed to a wallpaper, which may be coupled to a partition disclosed herein. For example, a partition, as disclosed herein, can include a charging/docking station, such as the bar 50 or the bar 60 or any other parts thereof or system thereof, which may be powered via a photovoltaic cell and include an inverter, such as for converting DC into AC, and thereby providing a charge to a charging/docking port, such as USB. For example, a partition, as disclosed herein, can communicably/signally interface, whether wired or wirelessly, such as via a computing technology disclosed herein, such as via a Bluetooth, a LAN, or a WAN network, whether radio, optical, sound or other technology based, such as via Internet of Things (IOT), with a kitchen appliance, such as a stove, a microwave, a dishwasher, a refrigerator, a pot/kettle/skillet, or a utensil, or a laundry appliance, such a washing machine or a dryer, or an HVAC appliance/system, such as to raise or lower temperature/humidity or control an HVAC setting or humidifier or thermostat, or a plumbing appliance, such as a plumbing fixture, a valve, a pipe, a showerhead, or a tankless heater, or a furniture item, such as a table, a chair, a shelf, or a couch, or a personal hygiene device, whether manual or powered, such as a T-blade, a rotary or foil shaver, a manual toothbrush, a rotary or a reciprocating toothbrush, or a network appliance, whether wired or wireless, such as a modem, a router, or a range extender, or between any permutational combinations of any thereof, based on a set of criteria or parameters or values or thresholds, such as alphanumeric or binary, as received, whether wired or wirelessly, via a sensor or a transceiver of the or associated with the partition or via a sensor or a transceiver of the or associated with the kitchen appliance, the laundry appliance, the HVAC appliance/system, the plumbing appliance, the furniture item, the personal hygiene device, or the network appliance, or any other house-based items, including for daily living, whether indoor or outdoor based, such as a lawnmower, a snow thrower, a gas or charcoal grill, a light fixture, a weather station, or any others. For example, a partition, as disclosed herein, can include/host/be coupled to, such as via fastening, mating, adhering, magnetizing, or others, a controller, whether hardware or software, whether battery powered or mains powered, to operate/manage, such as via switching, the partition in at least two modes, such as on/off mode, transparent/non-transparent mode, collapse/expand mode, deploy/undeploy mode, or others, including those disclosed herein and including intermediate modes if the two modes are upper/lower bounds, where the controller can be manually or automatically updatable, whether locally or remotely, whether wired or wirelessly, where the controller can include a user interface, whether analog or digital, including touch-based/haptic, where the controller can be signally/communicably coupled, whether wired or wirelessly, to a fluid source, such as a faucet/controller thereof, showerhead/controller thereof, spigot/controller thereof, toilet/controller thereof, or others. For example, the controller of the partition can signally communicate, whether wired or wirelessly, whether locally or remotely, whether encrypted or unencrypted, with a mobile device, such as a tablet or smartphone. For example, when the fluid source, such as a showerhead, is outputting a fluid, such as water from a boiler, then the fluid source, such as via its controller, can signal, such as wirelessly, to the controller of the partition, such as a window blind or a shower curtain, to automatically deploy, such as expand, unroll, shield, or close, or when the fluid source ceases to output the fluid, then the fluid source can similarly signal to the controller of the partition to automatically undeploy, such as contract, roll, unshield, or open. For example, the controller can include/host/be coupled to a time switch/timer, whether hardware or software, whether power circuit built-in, wall outlet plugged, or partition built-in, whether mechanical, electromechanical, or electronic, which may switch any equipment, as disclosed herein, such as a partition/accessory/device, on, off, or both, at a preset time or times, after a preset interval, or cyclically, which may do other processing, such as seasonal logic, sunrise/sunset logic, astronomic (latitude/longitude) logic, or other logic, or have sensors, such as light sensors, motion sensors, temperature sensors, water/moisture sensors, motion sensors, air pressure sensors, smoke/heat/carbon monoxide sensors, or others. For example, the timer can deploy or undeploy a partition, as disclosed herein, or any other accessories or devices, as disclosed herein, including interoperability or interconnection, whether mechanical, electrical, or signal, therebetween. For example, the time switch/timer can be distinct from the controller. For example, a partition, as disclosed herein, can include a geolocation device, such as a global navigation system (GPS) chip, which may include a receiver, transmitter, or a transceiver. For example, the geolocation device can interface with the timer or the controller or any other device disclosed herein such that a partition or any other device, as disclosed herein, can be operated or managed via a geolocation, such as sunrise, sunset, or others. For example, the geolocation device can determine a geolocation thereof, such as in a vehicle, and output the geolocation via a partition, as disclosed herein, such as via the display, the speaker, or others, or output a geo-cultural output, such as an image or a sound, pattern based on the geolocation, such as via the display, the speaker, or others, or activate/deactivate the partition/accessory/device based on the geolocation, such as based on sunset, sunrise, or others. For example, such activation can include transforming a partition, such as a blind, a wall, or a window, from an opaque/translucent state to a transparent state. For example, such activation/deactivation can include operate/manage, such as via switching, the partition/accessory/device in at least two modes, such as on/off mode, transparent/non-transparent mode, collapse/expand mode, deploy/undeploy mode, or others, including intermediate modes if the two modes are upper/lower bounds. For example, a partition/accessory/device, as disclosed herein, can be mechanically, electrically, or signally, whether wired or wirelessly, coupled to a sensor, whether local or remote, whether analog or digital, whether mechanical, electrical, electromechanical, or digital, to detect/sense an open/closed window, wind, water, gas, snow, smoke, dirt, pollen, UV, sunrays, mosquitoes/bugs, humidity, air quality, temperature, or other sensible characteristics to control operation of the partition, such as via a controller thereof, or an internet of things (IOT) device, such as a thermostat, an HVAC system, a water boiler, or others. For example, a partition, as disclosed herein, can include an input device, as a camera, a microphone, a sensor, such as a heat or motion sensor, or others, which may allow the partition to function as a security device, such as a component of a home/building security system. For example, a partition, as disclosed herein, can be configured to interface, whether wired or wirelessly, with a ceiling fan, a window air conditioner, a speaker, or a display. For example, the ceiling fan/window air conditioner/speaker/display can be adjusted based on whether the partition is deployed or undeployed, such as in a contracted or expanded state, whether in a transparent or opaque state, such as based on an outdoor weather condition. Note that partition and non-partition devices, as disclosed herein, can inter-communicate with each other in IOT environment, whether wired or wirelessly, whether direct or indirect, whether encrypted or unencrypted, whether locally or remotely. Also, as disclosed herein, a method can include receiving a housing including a reflective mirror, a processor, and a microphone, where the housing is configured to couple to a wall, where the processor is coupled to the microphone, where the microphone is configured to receive a voice sound from a user positioned in an operational proximity to the reflective mirror and the microphone, where the processor is configured to process the voice sound from the microphone and send an instruction based on the voice sound to a device spaced apart from the housing and external to the housing such that the device can receive the instruction. The voice sound is a first voice sound, where the housing includes a light source, wherein the microphone is configured to receive a second voice sound from the user positioned in the operational proximity to the reflective mirror and the microphone, where the processor is configured to process the second voice sound from the microphone and control the light source based on the second voice sound. The light source is a first group of light sources arranged in a first line and a second group of light sources arranged in a second line, where the reflective mirror extends between the first line and the second line. The housing includes a bottom portion and a speaker, where the speaker is coupled to the processor, where the bottom portion includes a group of user input devices, where the group includes a first input device and a second user input device, where the first user input device is configured to control a sound level of the speaker, where the second user input device is configured to control a light level of the light source. The voice sound is a first voice sound, where the housing includes a speaker, where the microphone is configured to receive a second voice sound from the user positioned in the operational proximity to the reflective mirror and the microphone, where the processor is configured to process the second voice sound from the microphone and control the speaker based on the second voice sound. The voice sound is a first voice sound, where the housing includes a network receiver and a speaker, where the network receiver is coupled to the processor, where the speaker is coupled to the processor, where the microphone is configured to receive a second voice sound from the user positioned in the operational proximity to the reflective mirror and the microphone, where the processor is configured to process the second voice sound from the microphone, cause the network receiver to receive a music from a network appliance, and cause the speaker to output the music. Also, as disclosed herein, a method can include receiving a housing including a reflective mirror, a light source, a processor, and a microphone, where the housing is configured to couple to a wall, where the processor is coupled to the light source and the microphone, where the microphone is configured to receive a voice sound from a user positioned in an operational proximity to the reflective mirror and the microphone, where the processor is configured to process the voice sound from the microphone and control the light source based on the voice sound. The voice sound is a first voice sound, where the housing includes a speaker, where the speaker is coupled to the processor, where the microphone is configured to receive a second voice sound from the user positioned in the operational proximity to the reflective mirror and the microphone, where the processor is configured to process the second voice sound from the microphone and control the speaker based on the second voice sound. The housing includes a bottom portion, where the bottom portion includes a group of user input devices, where the group includes a first input device and a second user input device, where the first user input device is configured to control a sound level of the speaker, where the second user input device is configured to control a light level of the light source. The housing includes a network receiver, where the network receiver is coupled to the processor, where the microphone is configured to receive a third voice sound from the user positioned in the operational proximity to the reflective mirror and the microphone, where the processor is configured to process the third voice sound from the microphone, cause the network receiver to receive a music from a network appliance, and cause the speaker to output the music. The speaker is waterproof or water resistant. The light source is a first group of light sources arranged in a first line and a second group of light sources arranged in a second line, where the reflective mirror extends between the first line and the second line. The light source is a first light source, where the housing includes a second light source and a sensor, where the sensor is configured to sense the user within a preset distance therefrom and cause an activation of the second light source. Also, as disclosed herein, a method can include receiving a housing including a reflective mirror, a processor, a microphone, and a speaker, where the housing is configured to couple to a wall, where the processor is coupled to the microphone and the speaker, where the microphone is configured to receive a voice sound from a user positioned in an operational proximity to the reflective mirror and the microphone, where the processor is configured to process the voice sound from the microphone and control the speaker based on the voice sound. The voice sound is a first voice sound, where the housing includes a light source, where the microphone is configured to receive a second voice sound from the user positioned in the operational proximity to the reflective mirror and the microphone, where the processor is configured to process the second voice sound from the microphone and control the light source based on the second voice sound. The light source is a first group of light sources arranged in a first line and a second group of light sources arranged in a second line, where the reflective mirror extends between the first line and the second line. The housing includes a bottom portion, where the bottom portion includes a group of user input devices, where the group includes a first input device and a second user input device, where the first user input device is configured to control a sound level of the speaker, where the second user input device is configured to control a light level of the light source. The light source is a first light source, where the housing includes a second light source and a sensor, where the sensor is configured to sense the user within a preset distance therefrom and cause an activation of the second light source. The housing includes a network receiver, wherein the network receiver is coupled to the processor, where the microphone is configured to receive a second voice sound from the user positioned in the operational proximity to the reflective mirror and the microphone, where the processor is configured to process the second voice sound from the microphone, cause the network receiver to receive a music from a network appliance, and cause the speaker to output the music. The speaker is waterproof or water resistant.

FIGS. 20A-E show various embodiments of partitions in a context of a structure according to the present disclosure. A structure 250 includes a frame 252, whether metallic, wooden, plastic, rubber, or any other material, alloy, or composite, whether unitary or assembly, whether electrically/thermally conductive or not, whether internally solid or hollow, whether perforated or closed, whether threaded or unthreaded, whether weather resistant, water resistant, water repellent, water proof, fire resistant, bulletproof, or others, whether inflatable, flexible, elastic, or rigid, whether containing a thermal insulating foam or not, with a partition 254, as disclosed herein, coupled thereto. At least partially, the structure 250 can be used as a sukkah, a tent (camping, medical, military), a hut, a greenhouse, a garage door, a patio door, a bathroom toilet/urinal stall/privacy screen, or any other structure, whether permanent or temporary. As shown in a right portion of the frame 252 in FIG. 20a, the partition 254 is embedded/integrated/built-in into the frame 252 and fully encloses the right portion to create a wall, which may be airtight, watertight, thermally insulating, or others. As shown in a left portion of the frame 252 in FIG. 20a, the partition 254 is also embedded/integrated/built-in into the frame 252 and fully encloses the right portion to between two vertical ends, but open on both horizontal ends of the frame 252. As shown in FIG. 20b, the partition 254 is suspended from the frame 252, such as via rings or other technologies, and various ways the partition can enclose a respective frame portion. For example, the partition 254 can be any partition as disclosed herein, such as a window blind or shade of any type, such as cellular, roller, pleated, slat, whether Persian, venetian, vertical, roman, exterior, aluminum, honeycomb, solar, sheer, wood, or others, whether vertical, horizontal, or diagonal. Likewise, the partition 254 can include, be coated or equipped with a photovoltaic cell/surface, whether internally or externally. The photovoltaic surface or cell generates a direct current (DC) and, therefore, an inverter, such as for conversion of the DC into an alternating current (AC), may be locally hosted, such as via the partition 254 or devices as disclosed herein, or remotely hosted. The partition 254 can include any devices/ configured as disclosed herein, such as a display, a speaker, or others. The partition 254 can change states between opaque, translucent, or transparent, whether upon manual activation or automatically, as disclosed herein, such as via a time switch, a sensor, a controller, or others. The partition 254 can include a window therein, which may be slidably or pivotally open, or unopenable. The window can include glass or transparent or translucent plastic, whether a single pane, a double pane, a triple pane, or others, including an inert gas between at least two of the panes. The window can change states between opaque, translucent, or transparent, whether upon manual activation or automatically, as disclosed herein, such as via a time switch, a sensor, a controller, or others. The partition 254 and the window can share circuity or be interconnected or have different electrical interfaces. As any embodiments disclosed herein, including any of those incorporated herein by reference, any embodiments can be mixed and matched, in any permutational or combinatory manner.

FIG. 20c shows an H-shaped or I-shaped bracket which may host the frame 252 and the partition 254 in its internal bays, as exist between its legs. This bracket can span vertically/horizontally along the frame 252 or multiple brackets 252 may be positioned vertically/horizontally apart from each other, as needed. This bracket may be elongated. This bracket may be placed between the frame 252 and the partition 254 to create a track along which the partition 254 may deploy or undeploy, while forming a seal to minimize wind, water, bugs/animals entry/exit. This bracket may be coupled, such as via attaching, mating, magnetizing, adhering, fastening, looping, hooking, suctioning, or others, to the frame 252 or the partition 254. For example, if the bracket is coupled to the frame 252 between the legs of the bracket on one side of the bracket, then the partition 254 travels between the legs of the bracket on the other side of the bracket. FIG. 20d shows the bracket having a cavity in a bridge between the legs such that the bracket can be mounted onto the frame 252, whether fixedly, clampingly/ C-shape/clamshell, rotatably, threadbly, gravitationally, or others, and then two partitions 254 can travel along such bracket, on each side of the bracket. Note that although the cavity is shown as circular, any closed or semi-closed shape can be used, including any polygonal, such as a square, a rectangle, a triangle, a pentagon, an octagon, a hexagon, or others, such as oval, elliptical, ovoid, or others. This bracket can also be U-shaped, such as for corner-user. FIG. 20e shows the bracket from a side view, with the bridge positioned between the two legs, and the bridge and the two legs each having a different hatching. Note Aspects of the present disclosure may be embodied as a system, a method, and/or a computer program product. Accordingly, some implementations of the present disclosure may be embodied in an entirely hardware embodiment, an entirely software embodiment (including firmware, resident software, micro-code, and so forth) and/or an embodiment combining software and hardware aspects that may all generally be referred to herein as a "circuit," "module" or "system." Furthermore, some implementations of the present disclosure may take the form of a computer program product embodied in at least one computer readable medium having computer readable program code embodied thereon. Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present disclosure, a computer readable storage medium may be any tangible medium that can contain, or store a program for use by or in connection with an instruction execution system, apparatus, and/or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by and/or in connection with an instruction execution system, an apparatus and/or a device. Program code embodied on a computer readable medium may be transmitted using any appropriate medium, including but not limited to wireless, wired, optical fiber cable, radio frequency, and so forth, or any suitable combination of the foregoing. Computer program code for carrying out operations for aspects of the present disclosure may be written in any combination of one or more programming languages, including an object-oriented programming language, such as Java, Smalltalk, C#, C++ or the like, and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The description of the present disclosure has been presented for purposes of illustration and description, but is not intended to be fully exhaustive and/or limited to the disclosure in the form disclosed. Many modifications and variations in techniques and structures will be apparent to those of ordinary skill in the art without departing from the scope and spirit of the disclosure as set forth in the claims that follow. Accordingly, such modifications and variations are contemplated as being a part of the present disclosure. The scope of the present disclosure is defined by the claims, which includes known equivalents and unforeseeable equivalents at the time of filing of the present disclosure.

What is claimed is:

1. A method comprising:
receiving a housing including a reflective mirror, a processor, and a microphone, wherein the housing is configured to couple to a wall, wherein the processor is coupled to the microphone, wherein the microphone is configured to receive a voice sound from a user positioned in an operational proximity to the reflective mirror and the microphone, wherein the processor is configured to process the voice sound from the microphone and send an instruction based on the voice sound to a device spaced apart from the housing and external to the housing such that the device can receive the instruction.

2. A method comprising:
receiving a housing including a reflective mirror, a light source, a processor, and a microphone, wherein the housing is configured to couple to a wall, wherein the processor is coupled to the light source and the microphone, wherein the microphone is configured to receive a voice sound from a user positioned in an operational proximity to the reflective mirror and the microphone, wherein the processor is configured to process the voice sound from the microphone and control the light source based on the voice sound.

3. A method comprising:
receiving a housing including a reflective mirror, a processor, a microphone, and a speaker, wherein the housing is configured to couple to a wall, wherein the processor is coupled to the microphone and the speaker, wherein the microphone is configured to receive a voice sound from a user positioned in an operational proximity to the reflective mirror and the microphone, wherein the processor is configured to process the voice sound from the microphone and control the speaker based on the voice sound.

4. The method of claim 1, wherein the voice sound is a first voice sound, wherein the housing includes a light source, wherein the microphone is configured to receive a second voice sound from the user positioned in the operational proximity to the reflective mirror and the microphone, wherein the processor is configured to process the second voice sound from the microphone and control the light source based on the second voice sound.

5. The method of claim 4, wherein the light source is a first group of light sources arranged in a first line and a second group of light sources arranged in a second line, wherein the reflective mirror extends between the first line and the second line.

6. The method of claim 4, wherein the housing includes a bottom portion and a speaker, wherein the speaker is coupled to the processor, wherein the bottom portion includes a group of user input devices, wherein the group includes a first input device and a second user input device, wherein the first user input device is configured to control a sound level of the speaker, wherein the second user input device is configured to control a light level of the light source.

7. The method of claim 1, wherein the voice sound is a first voice sound, wherein the housing includes a speaker, wherein the microphone is configured to receive a second voice sound from the user positioned in the operational proximity to the reflective mirror and the microphone, wherein the processor is configured to process the second voice sound from the microphone and control the speaker based on the second voice sound.

8. The method of claim 1, wherein the voice sound is a first voice sound, wherein the housing includes a network receiver and a speaker, wherein the network receiver is coupled to the processor, wherein the speaker is coupled to the processor, wherein the microphone is configured to receive a second voice sound from the user positioned in the operational proximity to the reflective mirror and the microphone, wherein the processor is configured to process the second voice sound from the microphone, cause the network receiver to receive a music from a network appliance, and cause the speaker to output the music.

9. The method of claim 2, wherein the voice sound is a first voice sound, wherein the housing includes a speaker, wherein the speaker is coupled to the processor, wherein the microphone is configured to receive a second voice sound from the user positioned in the operational proximity to the reflective mirror and the microphone, wherein the processor is configured to process the second voice sound from the microphone and control the speaker based on the second voice sound.

10. The method of claim 9, wherein the housing includes a bottom portion, wherein the bottom portion includes a group of user input devices, wherein the group includes a first input device and a second user input device, wherein the first user input device is configured to control a sound level of the speaker, wherein the second user input device is configured to control a light level of the light source.

11. The method of claim 9, wherein the housing includes a network receiver, wherein the network receiver is coupled to the processor, wherein the microphone is configured to receive a third voice sound from the user positioned in the operational proximity to the reflective mirror and the microphone, wherein the processor is configured to process the third voice sound from the microphone, cause the network receiver to receive a music from a network appliance, and cause the speaker to output the music.

12. The method of claim 9, wherein the speaker is waterproof or water resistant.

13. The method of claim 2, wherein the light source is a first group of light sources arranged in a first line and a second group of light sources arranged in a second line, wherein the reflective mirror extends between the first line and the second line.

14. The method of claim 2, wherein the light source is a first light source, wherein the housing includes a second light source and a sensor, wherein the sensor is configured to sense the user within a preset distance therefrom and cause an activation of the second light source.

15. The method of claim 3, wherein the voice sound is a first voice sound, wherein the housing includes a light source, wherein the microphone is configured to receive a second voice sound from the user positioned in the operational proximity to the reflective mirror and the microphone, wherein the processor is configured to process the second voice sound from the microphone and control the light source based on the second voice sound.

16. The method of 15, wherein the light source is a first group of light sources arranged in a first line and a second group of light sources arranged in a second line, wherein the reflective mirror extends between the first line and the second line.

17. The method of 15, wherein the housing includes a bottom portion, wherein the bottom portion includes a group of user input devices, wherein the group includes a first input device and a second user input device, wherein the first user input device is configured to control a sound level of the speaker, wherein the second user input device is configured to control a light level of the light source.

18. The method of 15, wherein the light source is a first light source, wherein the housing includes a second light source and a sensor, wherein the sensor is configured to sense the user within a preset distance therefrom and cause an activation of the second light source.

19. The method of 3, wherein the housing includes a network receiver, wherein the network receiver is coupled to the processor, wherein the microphone is configured to receive a second voice sound from the user positioned in the operational proximity to the reflective mirror and the microphone, wherein the processor is configured to process the second voice sound from the microphone, cause the network receiver to receive a music from a network appliance, and cause the speaker to output the music.

20. The method of 3, wherein the speaker is waterproof or water resistant.

* * * * *